(12) United States Patent
Schofield

(10) Patent No.: US 11,148,583 B2
(45) Date of Patent: Oct. 19, 2021

(54) VEHICULAR FORWARD VIEWING IMAGE CAPTURE SYSTEM

(71) Applicant: MAGNA ELECTRONICS INC., Auburn Hills, MI (US)

(72) Inventor: Kenneth Schofield, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/948,656

(22) Filed: Sep. 28, 2020

(65) Prior Publication Data

US 2021/0009029 A1 Jan. 14, 2021

Related U.S. Application Data

(63) Continuation of application No. 16/125,891, filed on Sep. 10, 2018, now Pat. No. 10,787,116, which is a
(Continued)

(51) Int. Cl.
*B60Q 1/14* (2006.01)
*G06K 9/00* (2006.01)
(Continued)

(52) U.S. Cl.
CPC ............ *B60Q 1/1423* (2013.01); *B60K 31/00* (2013.01); *F21S 41/60* (2018.01);
(Continued)

(58) Field of Classification Search
CPC ... B60K 31/00; B60Q 1/1423; G06K 9/00798
See application file for complete search history.

(56) References Cited

U.S. PATENT DOCUMENTS 1,472,509 A 10/1923 Bitter
2,074,251 A 3/1937 Braun
(Continued)

FOREIGN PATENT DOCUMENTS

AT 519193 A1 8/2011
BE 1008142 A7 1/1996
(Continued)

OTHER PUBLICATIONS

Xie et al., "Active and Intelligent Sensing of Road Obstacles: Application to The European Eureka-PROMETHEUS Project", Fourth International Conference on Computer Vision, IEEE, 1993, Abstract.
(Continued)

*Primary Examiner* — Robert J May
(74) *Attorney, Agent, or Firm* — Honigman LLP

(57) ABSTRACT

A vehicular forward viewing image capture system includes an accessory module configured for attachment at an in-cabin side of a windshield of a vehicle, whereby the imaging sensor views through the windshield forward of the equipped vehicle. With the accessory module attached at the in-cabin side of the windshield, and while the vehicle is traveling along a road, a control processes captured image data to determine (i) presence of an object of interest viewed by the imaging sensor and (ii) location and/or movement of the object of interest viewed by the imaging sensor. The control, responsive to the processing of captured image data and responsive to vehicle data received via a vehicle communication bus, at least in part provides at least one selected from the group consisting of (a) traffic sign recognition, (b) traffic light status detection, (c) adaptive cruise control and (d) pedestrian detection.

50 Claims, 10 Drawing Sheets

Related U.S. Application Data continuation of application No. 15/262,479, filed on Sep. 12, 2016, now Pat. No. 10,071,676, which is a continuation of application No. 14/164,682, filed on Jan. 27, 2014, now Pat. No. 9,440,535, which is a continuation of application No. 13/887,727, filed on May 6, 2013, now Pat. No. 8,636,393, which is a continuation of application No. 13/452,130, filed on Apr. 20, 2012, now Pat. No. 8,434,919, which is a continuation of application No. 13/173,039, filed on Jun. 30, 2011, now Pat. No. 8,162,518, which is a continuation of application No. 12/377,054, filed as application No. PCT/US2007/075702 on Aug. 10, 2007, now Pat. No. 7,972,045.

(60) Provisional application No. 60/845,381, filed on Sep. 18, 2006, provisional application No. 60/837,408, filed on Aug. 11, 2006.

(51) Int. Cl.
    *G06K 9/20*         (2006.01)
    *F21S 41/60*       (2018.01)
    *B60K 31/00*       (2006.01)
    *H04N 5/374*      (2011.01)

(52) U.S. Cl.
    CPC ..... *G06K 9/00798* (2013.01); *G06K 9/00825* (2013.01); *G06K 9/209* (2013.01); *H04N 5/374* (2013.01); *B60Q 2300/056* (2013.01); *B60Q 2300/112* (2013.01); *B60Q 2300/122* (2013.01); *B60Q 2300/126* (2013.01); *B60Q 2300/322* (2013.01); *B60Q 2300/41* (2013.01); *B60Q 2300/42* (2013.01)

(56) References Cited

U.S. PATENT DOCUMENTS

| | | |
|---|---|---|
| 2,148,119 A | 2/1939 | Grist |
| 2,240,843 A | 5/1941 | Gillespie |
| 2,317,400 A | 4/1943 | Paulus et al. |
| 2,331,144 A | 10/1943 | Sitter |
| 2,339,291 A | 1/1944 | Paulus et al. |
| 2,424,288 A | 7/1947 | Severy |
| 2,598,420 A | 5/1952 | Onksen, Jr. |
| 2,632,040 A | 3/1953 | Rabinow |
| 2,750,583 A | 6/1956 | McCullough |
| 2,762,932 A | 9/1956 | Falge et al. |
| 2,827,594 A | 3/1958 | Rabinow |
| 2,855,523 A | 10/1958 | Berger |
| 2,856,146 A | 10/1958 | Lehder |
| 2,863,064 A | 12/1958 | Rabinow |
| 2,892,094 A | 6/1959 | Lehovec |
| 2,907,920 A | 10/1959 | McIlvaine |
| 2,912,593 A | 11/1959 | Deuth |
| 2,934,676 A | 4/1960 | Miller et al. |
| 2,959,709 A | 11/1960 | Vanaman |
| 3,008,532 A | 11/1961 | Reed |
| 3,011,580 A | 12/1961 | Reid |
| 3,069,654 A | 12/1962 | Hough |
| 3,085,646 A | 4/1963 | Paifve |
| 3,158,835 A | 11/1964 | Hipkins |
| 3,172,496 A | 3/1965 | Rabinow |
| 3,179,845 A | 4/1965 | Kulwiec |
| 3,201,750 A | 8/1965 | Morin |
| 3,208,070 A | 9/1965 | Boicey |
| 3,249,761 A | 5/1966 | Baumanns |
| 3,271,577 A | 9/1966 | Miller et al. |
| 3,325,680 A | 6/1967 | Amacher |
| 3,367,616 A | 2/1968 | Bausch |
| 3,411,843 A | 11/1968 | Moller |
| 3,486,066 A | 12/1969 | Jones et al. |
| 3,515,472 A | 6/1970 | Schwitzgebel |
| 3,572,428 A | 3/1971 | Monaco |
| 3,623,671 A | 11/1971 | Hargroves |
| 3,673,560 A | 6/1972 | Barsh et al. |
| 3,680,951 A | 8/1972 | Jordan et al. |
| 3,689,695 A | 9/1972 | Rosenfield et al. |
| 3,708,668 A | 1/1973 | Tilley |
| 3,751,711 A | 8/1973 | Schick |
| 3,845,572 A | 11/1974 | McCanney |
| 3,876,940 A | 4/1975 | Wickord et al. |
| 3,971,065 A | 7/1976 | Bayer |
| 3,985,424 A | 10/1976 | Steinacher |
| 3,986,022 A | 10/1976 | Hyatt |
| 4,003,445 A | 1/1977 | De Bruine |
| 4,037,134 A | 7/1977 | Loper |
| 4,044,853 A | 8/1977 | Melke |
| 4,049,961 A | 9/1977 | Marcy |
| 4,058,796 A | 11/1977 | Oishi et al. |
| 4,093,364 A | 6/1978 | Miller |
| 4,127,778 A | 11/1978 | Leitz |
| 4,139,801 A | 2/1979 | Linares |
| 4,143,264 A | 3/1979 | Gilbert et al. |
| 4,176,728 A | 12/1979 | Otteblad et al. |
| 4,200,361 A | 4/1980 | Malvano et al. |
| 4,209,853 A | 6/1980 | Hyatt |
| 4,214,266 A | 7/1980 | Myers |
| 4,218,698 A | 8/1980 | Bart et al. |
| 4,236,099 A | 11/1980 | Rosenblum |
| 4,238,778 A | 12/1980 | Ohsumi |
| 4,243,196 A | 1/1981 | Toda et al. |
| 4,247,870 A | 1/1981 | Gabel et al. |
| 4,249,160 A | 2/1981 | Chilvers |
| 4,254,931 A | 3/1981 | Aikens et al. |
| 4,257,703 A | 3/1981 | Goodrich |
| 4,266,856 A | 5/1981 | Wainwright |
| 4,277,804 A | 7/1981 | Robison |
| 4,278,142 A | 7/1981 | Kono |
| 4,281,898 A | 8/1981 | Ochiai et al. |
| 4,288,814 A | 9/1981 | Talley et al. |
| RE30,835 E | 12/1981 | Giglia |
| 4,348,652 A | 9/1982 | Barnes et al. |
| 4,348,653 A | 9/1982 | Tsuzuki et al. |
| 4,355,271 A | 10/1982 | Noack |
| 4,357,558 A | 11/1982 | Massoni et al. |
| 4,357,594 A | 11/1982 | Ehrlich et al. |
| 4,381,888 A | 5/1983 | Momiyama |
| 4,389,537 A | 6/1983 | Tsunoda et al. |
| 4,389,639 A | 6/1983 | Torii et al. |
| 4,390,742 A | 6/1983 | Wideman |
| 4,390,895 A | 6/1983 | Sato et al. |
| 4,401,181 A | 8/1983 | Schwarz |
| 4,403,208 A | 9/1983 | Hodgson et al. |
| 4,420,238 A | 12/1983 | Felix |
| 4,431,896 A | 2/1984 | Lodetti |
| 4,441,125 A | 4/1984 | Parkinson |
| 4,443,057 A | 4/1984 | Bauer et al. |
| 4,460,831 A | 7/1984 | Oettinger et al. |
| 4,464,789 A | 8/1984 | Sternberg |
| 4,471,228 A | 9/1984 | Nishizawa et al. |
| 4,481,450 A | 11/1984 | Watanabe et al. |
| 4,483,011 A | 11/1984 | Brown |
| 4,485,402 A | 11/1984 | Searby |
| 4,491,390 A | 1/1985 | Tong-Shen |
| 4,495,589 A | 1/1985 | Hirzel |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer et al. |
| 4,532,550 A | 7/1985 | Bendell et al. |
| 4,538,181 A | 8/1985 | Taylor |
| 4,546,551 A | 10/1985 | Franks |
| 4,549,208 A | 10/1985 | Kamejima et al. |
| 4,564,833 A | 1/1986 | Seko et al. |
| 4,566,032 A | 1/1986 | Hirooka et al. |
| 4,571,082 A | 2/1986 | Downs |
| 4,572,619 A | 2/1986 | Reininger et al. |
| 4,580,875 A | 4/1986 | Bechtel et al. |
| 4,587,522 A | 5/1986 | Warren |
| 4,588,041 A | 5/1986 | Tsuchihashi |
| 4,599,544 A | 7/1986 | Martin |

(56) References Cited

U.S. PATENT DOCUMENTS

| | | |
|---|---|---|
| 4,600,913 A | 7/1986 | Caine |
| 4,601,053 A | 7/1986 | Grumet |
| 4,603,946 A | 8/1986 | Kato et al. |
| 4,614,415 A | 9/1986 | Hyatt |
| 4,620,141 A | 10/1986 | McCumber et al. |
| 4,623,222 A | 11/1986 | Itoh et al. |
| 4,625,329 A | 11/1986 | Ishikawa et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,645,320 A | 2/1987 | Muelling et al. |
| 4,645,975 A | 2/1987 | Meitzler et al. |
| 4,647,161 A | 3/1987 | Muller |
| 4,647,975 A | 3/1987 | Alston et al. |
| 4,653,316 A | 3/1987 | Fukuhara |
| 4,665,321 A | 5/1987 | Chang et al. |
| 4,669,825 A | 6/1987 | Itoh et al. |
| 4,671,614 A | 6/1987 | Catalano |
| 4,671,615 A | 6/1987 | Fukada et al. |
| 4,672,457 A | 6/1987 | Hyatt |
| 4,676,601 A | 6/1987 | Itoh et al. |
| 4,679,077 A | 7/1987 | Yuasa et al. |
| 4,681,431 A | 7/1987 | Sims et al. |
| 4,688,085 A | 8/1987 | Imaide |
| 4,690,508 A | 9/1987 | Jacob |
| 4,692,798 A | 9/1987 | Seko et al. |
| 4,693,788 A | 9/1987 | Berg et al. |
| 4,697,883 A | 10/1987 | Suzuki et al. |
| 4,699,484 A | 10/1987 | Howell et al. |
| 4,701,022 A | 10/1987 | Jacob |
| 4,701,613 A | 10/1987 | Watanabe et al. |
| 4,713,685 A | 12/1987 | Nishimura et al. |
| 4,717,830 A | 1/1988 | Botts |
| 4,727,290 A | 2/1988 | Smith et al. |
| 4,728,804 A | 3/1988 | Norsworthy |
| 4,731,669 A | 3/1988 | Hayashi et al. |
| 4,731,769 A | 3/1988 | Schaefer et al. |
| 4,741,603 A | 5/1988 | Miyagi et al. |
| 4,755,664 A | 7/1988 | Holmes et al. |
| 4,758,883 A | 7/1988 | Kawahara et al. |
| 4,768,135 A | 8/1988 | Kretschmer et al. |
| 4,772,942 A | 9/1988 | Tuck |
| 4,779,095 A | 10/1988 | Guerreri |
| 4,785,280 A | 11/1988 | Fubini et al. |
| 4,789,904 A | 12/1988 | Peterson |
| 4,793,690 A | 12/1988 | Gahan et al. |
| 4,799,267 A | 1/1989 | Kamejima et al. |
| 4,805,015 A | 2/1989 | Copeland |
| 4,816,828 A | 3/1989 | Feher |
| 4,817,948 A | 4/1989 | Simonelli |
| 4,820,933 A | 4/1989 | Hong et al. |
| 4,825,232 A | 4/1989 | Howdle |
| 4,833,469 A | 5/1989 | David |
| 4,833,534 A | 5/1989 | Paff et al. |
| 4,838,650 A | 6/1989 | Stewart et al. |
| 4,839,749 A | 6/1989 | Franklin |
| 4,841,348 A | 6/1989 | Shizukuishi et al. |
| 4,843,463 A | 6/1989 | Michetti |
| 4,847,489 A | 7/1989 | Dietrich |
| 4,847,772 A | 7/1989 | Michalopoulos et al. |
| 4,849,731 A | 7/1989 | Melocik |
| 4,855,822 A | 8/1989 | Narendra et al. |
| 4,859,031 A | 8/1989 | Berman et al. |
| 4,862,037 A | 8/1989 | Farber et al. |
| 4,863,130 A | 9/1989 | Marks, Jr. |
| 4,867,561 A | 9/1989 | Fujii et al. |
| 4,870,264 A | 9/1989 | Beha |
| 4,871,917 A | 10/1989 | O'Farrell et al. |
| 4,872,051 A | 10/1989 | Dye |
| 4,881,019 A | 11/1989 | Shiraishi et al. |
| 4,882,466 A | 11/1989 | Friel |
| 4,882,565 A | 11/1989 | Gallmeyer |
| 4,883,349 A | 11/1989 | Mittelhauser |
| 4,884,055 A | 11/1989 | Memmola |
| 4,886,960 A | 12/1989 | Molyneux et al. |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,899,296 A | 2/1990 | Khattak |
| 4,900,133 A | 2/1990 | Berman |
| 4,905,151 A | 2/1990 | Weiman et al. |
| 4,906,940 A | 3/1990 | Greene et al. |
| 4,907,870 A | 3/1990 | Brucker |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,346 A | 5/1990 | Yokoyama |
| 4,930,742 A | 6/1990 | Schofield et al. |
| 4,931,937 A | 6/1990 | Kakinami et al. |
| 4,936,533 A | 6/1990 | Adams et al. |
| 4,937,796 A | 6/1990 | Tendler |
| 4,948,246 A | 8/1990 | Shigematsu |
| 4,949,186 A | 8/1990 | Peterson |
| 4,953,305 A | 9/1990 | Van Lente et al. |
| 4,954,962 A | 9/1990 | Evans, Jr. et al. |
| 4,956,591 A | 9/1990 | Schierbeek et al. |
| 4,961,625 A | 10/1990 | Wood et al. |
| 4,963,788 A | 10/1990 | King et al. |
| 4,966,441 A | 10/1990 | Conner |
| 4,967,319 A | 10/1990 | Seko |
| 4,970,509 A | 11/1990 | Kissinger, Sr. |
| 4,970,589 A | 11/1990 | Hanson et al. |
| 4,970,653 A | 11/1990 | Kenue |
| 4,971,405 A * | 11/1990 | Hwang ............... B60Q 1/1423 315/77 |
| 4,971,430 A | 11/1990 | Lynas |
| 4,974,078 A | 11/1990 | Tsai |
| 4,975,703 A | 12/1990 | Delisle et al. |
| 4,985,847 A | 1/1991 | Shioya et al. |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,003,339 A | 3/1991 | Kikuchi et al. |
| 5,008,739 A | 4/1991 | D'Luna et al. |
| 5,008,946 A | 4/1991 | Ando |
| 5,012,082 A | 4/1991 | Watanabe |
| 5,012,092 A | 4/1991 | Kobayashi et al. |
| 5,012,335 A | 4/1991 | Cohodar |
| 5,016,977 A | 5/1991 | Baude et al. |
| 5,020,114 A | 5/1991 | Fujioka et al. |
| 5,027,001 A | 6/1991 | Torbert |
| 5,027,104 A | 6/1991 | Reid |
| 5,027,200 A | 6/1991 | Petrossian et al. |
| 5,031,101 A | 7/1991 | Kamimura et al. |
| 5,036,437 A | 7/1991 | Macks |
| 5,044,706 A | 9/1991 | Chen |
| 5,044,956 A | 9/1991 | Behensky et al. |
| 5,050,966 A | 9/1991 | Berman |
| 5,051,906 A | 9/1991 | Evans, Jr. et al. |
| 5,055,668 A | 10/1991 | French |
| 5,059,877 A | 10/1991 | Teder |
| 5,059,947 A | 10/1991 | Chen |
| 5,063,603 A | 11/1991 | Burt |
| 5,064,274 A | 11/1991 | Alten |
| 5,072,154 A | 12/1991 | Chen |
| 5,075,768 A | 12/1991 | Wirtz et al. |
| 5,080,207 A | 1/1992 | Horneffer |
| 5,080,309 A | 1/1992 | Ivins |
| 5,081,585 A | 1/1992 | Kurami et al. |
| 5,086,253 A | 2/1992 | Lawler |
| 5,086,510 A | 2/1992 | Guenther et al. |
| 5,087,969 A | 2/1992 | Kamada et al. |
| 5,096,287 A | 3/1992 | Kakinami et al. |
| 5,097,362 A | 3/1992 | Lynas |
| 5,100,093 A | 3/1992 | Rawlinson |
| 5,101,351 A | 3/1992 | Hattori |
| 5,111,289 A | 5/1992 | Lucas et al. |
| 5,113,721 A | 5/1992 | Polly |
| 5,115,398 A | 5/1992 | De Jong |

(56) References Cited

U.S. PATENT DOCUMENTS

| | | |
|---|---|---|
| 5,121,200 A | 6/1992 | Choi |
| 5,122,957 A | 6/1992 | Hattori |
| 5,124,549 A | 6/1992 | Michaels et al. |
| 5,128,769 A | 7/1992 | Arai et al. |
| 5,130,709 A | 7/1992 | Toyama et al. |
| 5,133,605 A | 7/1992 | Nakamura |
| 5,137,238 A | 8/1992 | Hutten |
| 5,139,327 A | 8/1992 | Tanaka |
| 5,144,685 A | 9/1992 | Nasar et al. |
| 5,146,340 A | 9/1992 | Dickerson et al. |
| 5,148,014 A | 9/1992 | Lynam et al. |
| 5,153,760 A | 10/1992 | Ahmed |
| 5,155,426 A | 10/1992 | Kurami |
| 5,155,775 A | 10/1992 | Brown |
| 5,159,557 A | 10/1992 | Ogawa |
| 5,160,780 A | 11/1992 | Ono et al. |
| 5,160,971 A | 11/1992 | Koshizawa |
| 5,161,632 A | 11/1992 | Asayama |
| 5,162,841 A | 11/1992 | Terashita |
| 5,162,861 A | 11/1992 | Tamburino et al. |
| 5,163,002 A | 11/1992 | Kurami |
| 5,165,108 A | 11/1992 | Asayama |
| 5,166,681 A | 11/1992 | Bottesch et al. |
| 5,168,355 A | 12/1992 | Asayama |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,173,881 A | 12/1992 | Sindle |
| 5,177,462 A | 1/1993 | Kajiwara |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,185,812 A | 2/1993 | Yamashita et al. |
| 5,187,383 A | 2/1993 | Taccetta et al. |
| 5,189,561 A | 2/1993 | Hong |
| 5,193,000 A | 3/1993 | Lipton et al. |
| 5,193,029 A | 3/1993 | Schofield et al. |
| 5,193,894 A | 3/1993 | Lietar et al. |
| 5,204,536 A | 4/1993 | Vardi |
| 5,204,778 A | 4/1993 | Bechtel |
| 5,208,701 A | 5/1993 | Maeda |
| 5,208,750 A | 5/1993 | Kurami et al. |
| 5,212,468 A | 5/1993 | Adell |
| 5,214,408 A | 5/1993 | Asayama |
| 5,216,408 A | 6/1993 | Shirakawa |
| 5,218,414 A | 6/1993 | Kajiwara |
| 5,220,508 A | 6/1993 | Ninomiya et al. |
| 5,223,814 A | 6/1993 | Suman |
| 5,223,907 A | 6/1993 | Asayama |
| 5,225,827 A | 7/1993 | Persson |
| 5,229,941 A | 7/1993 | Hattori |
| 5,230,400 A | 7/1993 | Kakinami et al. |
| 5,231,379 A | 7/1993 | Wood et al. |
| 5,233,527 A | 8/1993 | Shinnosuke |
| 5,234,070 A | 8/1993 | Noah et al. |
| 5,235,178 A | 8/1993 | Hegyi |
| 5,237,249 A | 8/1993 | Levers |
| 5,243,524 A | 9/1993 | Ishida et al. |
| 5,245,422 A | 9/1993 | Borcherts et al. |
| 5,246,193 A | 9/1993 | Faidley |
| 5,249,126 A | 9/1993 | Hattori |
| 5,249,128 A | 9/1993 | Markandey et al. |
| 5,249,157 A | 9/1993 | Taylor |
| 5,251,680 A | 10/1993 | Minezawa et al. |
| 5,253,050 A | 10/1993 | Karasudani |
| 5,253,109 A | 10/1993 | O'Farrell et al. |
| 5,265,172 A | 11/1993 | Markandey et al. |
| 5,266,873 A | 11/1993 | Arditi et al. |
| 5,267,160 A | 11/1993 | Ito et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,291,424 A | 3/1994 | Asayama et al. |
| 5,293,162 A | 3/1994 | Bachalo |
| 5,298,732 A | 3/1994 | Chen |
| 5,301,115 A | 4/1994 | Nouso |
| 5,302,956 A | 4/1994 | Asbury et al. |
| 5,304,980 A | 4/1994 | Maekawa |
| 5,305,012 A | 4/1994 | Faris |
| 5,307,136 A | 4/1994 | Saneyoshi |
| 5,307,419 A | 4/1994 | Tsujino et al. |
| 5,309,137 A | 5/1994 | Kajiwara |
| 5,313,072 A | 5/1994 | Vachss |
| 5,318,143 A | 6/1994 | Parker et al. |
| 5,321,556 A | 6/1994 | Joe |
| 5,325,096 A | 6/1994 | Pakett |
| 5,325,386 A | 6/1994 | Jewell et al. |
| 5,327,288 A | 7/1994 | Wellington et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,345,266 A | 9/1994 | Denyer |
| 5,347,456 A | 9/1994 | Zhang et al. |
| 5,351,044 A | 9/1994 | Mathur et al. |
| D351,370 S | 10/1994 | Lawlor et al. |
| 5,355,118 A | 10/1994 | Fukuhara |
| 5,359,666 A | 10/1994 | Nakayama et al. |
| 5,367,457 A | 11/1994 | Ishida |
| 5,369,590 A | 11/1994 | Karasudani |
| 5,371,535 A | 12/1994 | Takizawa |
| 5,373,911 A | 12/1994 | Yasui |
| 5,374,852 A | 12/1994 | Parkes |
| 5,379,196 A | 1/1995 | Kobayashi et al. |
| 5,379,353 A | 1/1995 | Hasegawa et al. |
| 5,381,338 A | 1/1995 | Wysocki et al. |
| 5,386,285 A | 1/1995 | Asayama |
| 5,388,048 A | 2/1995 | Yavnayi et al. |
| 5,394,333 A | 2/1995 | Kao |
| 5,398,041 A | 3/1995 | Hyatt |
| 5,406,395 A | 4/1995 | Wilson et al. |
| 5,406,414 A | 4/1995 | O'Farrell et al. |
| 5,408,330 A | 4/1995 | Squicciarini et al. |
| 5,408,346 A | 4/1995 | Trissel et al. |
| 5,410,346 A | 4/1995 | Saneyoshi et al. |
| 5,414,257 A | 5/1995 | Stanton |
| 5,414,439 A | 5/1995 | Groves et al. |
| 5,414,461 A | 5/1995 | Kishi et al. |
| 5,414,625 A | 5/1995 | Hattori |
| 5,416,313 A | 5/1995 | Larson et al. |
| 5,416,318 A | 5/1995 | Hegyi |
| 5,416,478 A | 5/1995 | Morinaga |
| 5,416,711 A | 5/1995 | Gran et al. |
| 5,424,952 A | 6/1995 | Asayama |
| 5,426,294 A | 6/1995 | Kobayashi et al. |
| 5,430,431 A | 7/1995 | Nelson |
| 5,430,450 A | 7/1995 | Holmes |
| 5,434,407 A | 7/1995 | Bauer et al. |
| 5,434,927 A | 7/1995 | Brady et al. |
| 5,436,839 A | 7/1995 | Dausch et al. |
| 5,440,428 A | 8/1995 | Hegg et al. |
| 5,444,478 A | 8/1995 | Lelong et al. |
| 5,448,180 A | 9/1995 | Kienzler et al. |
| 5,450,057 A | 9/1995 | Watanabe |
| 5,451,822 A | 9/1995 | Bechtel et al. |
| 5,457,493 A | 10/1995 | Leddy et al. |
| 5,459,660 A | 10/1995 | Berra |
| 5,461,357 A | 10/1995 | Yoshioka et al. |
| 5,461,361 A | 10/1995 | Moore |
| 5,465,079 A | 11/1995 | Bouchard et al. |
| 5,467,284 A | 11/1995 | Yoshioka et al. |
| 5,469,298 A | 11/1995 | Suman et al. |
| 5,471,515 A | 11/1995 | Fossum et al. |
| 5,473,515 A | 12/1995 | Liu |
| 5,475,366 A | 12/1995 | Van Lente et al. |
| 5,475,494 A | 12/1995 | Nishida et al. |
| 5,481,257 A | 1/1996 | Brubaker et al. |
| 5,482,133 A | 1/1996 | Iwata et al. |
| 5,483,060 A | 1/1996 | Sugiura et al. |
| 5,483,168 A | 1/1996 | Reid |

(56) References Cited

U.S. PATENT DOCUMENTS

| | | |
|---|---|---|
| 5,483,453 A | 1/1996 | Uemura et al. |
| 5,487,116 A | 1/1996 | Nakano et al. |
| 5,488,496 A | 1/1996 | Pine |
| 5,493,269 A | 2/1996 | Durley et al. |
| 5,493,392 A | 2/1996 | Blackmon et al. |
| 5,498,866 A | 3/1996 | Bendicks et al. |
| 5,500,766 A | 3/1996 | Stonecypher |
| 5,508,592 A | 4/1996 | Lapatovich et al. |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,330 A | 6/1996 | Baiden et al. |
| 5,530,420 A | 6/1996 | Tsuchiya et al. |
| 5,530,771 A | 6/1996 | Maekawa |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,545,960 A | 8/1996 | Ishikawa |
| 5,550,677 A | 8/1996 | Schofield et al. |
| 5,555,136 A | 9/1996 | Waldmann et al. |
| 5,555,312 A | 9/1996 | Shima et al. |
| 5,555,503 A | 9/1996 | Kyrtsos et al. |
| 5,555,555 A | 9/1996 | Sato et al. |
| 5,558,123 A | 9/1996 | Castel et al. |
| 5,559,695 A | 9/1996 | Daily |
| 5,562,336 A | 10/1996 | Gotou |
| 5,566,224 A | 10/1996 | ul Azam et al. |
| 5,568,027 A | 10/1996 | Teder |
| 5,568,316 A | 10/1996 | Schrenk et al. |
| 5,572,315 A | 11/1996 | Krell |
| 5,574,443 A | 11/1996 | Hsieh |
| 5,576,687 A | 11/1996 | Blank et al. |
| 5,581,464 A | 12/1996 | Woll et al. |
| 5,582,383 A | 12/1996 | Mertens et al. |
| 5,588,123 A | 12/1996 | Loibl |
| 5,594,222 A | 1/1997 | Caldwell |
| 5,596,319 A | 1/1997 | Spry |
| 5,596,382 A | 1/1997 | Bamford |
| 5,598,164 A | 1/1997 | Reppas et al. |
| 5,602,457 A | 2/1997 | Anderson et al. |
| 5,612,686 A | 3/1997 | Takano et al. |
| 5,612,883 A | 3/1997 | Shaffer et al. |
| 5,614,788 A | 3/1997 | Mullins |
| 5,614,885 A | 3/1997 | Van Lente et al. |
| 5,615,857 A | 4/1997 | Hook |
| 5,619,370 A | 4/1997 | Guinosso |
| 5,627,586 A | 5/1997 | Yamasaki |
| 5,633,944 A | 5/1997 | Guibert et al. |
| 5,634,709 A | 6/1997 | Iwama |
| 5,638,116 A | 6/1997 | Shimoura et al. |
| 5,642,299 A | 6/1997 | Hardin et al. |
| 5,646,612 A | 7/1997 | Byon |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,667,896 A | 9/1997 | Carter et al. |
| 5,668,663 A | 9/1997 | Varaprasad et al. |
| 5,670,935 A | 9/1997 | Schofield et al. |
| 5,673,019 A | 9/1997 | Dantoni |
| 5,675,489 A | 10/1997 | Pomerleau |
| 5,676,484 A | 10/1997 | Chamberlin et al. |
| 5,677,851 A | 10/1997 | Kingdon et al. |
| 5,677,979 A | 10/1997 | Squicciarini et al. |
| 5,680,263 A | 10/1997 | Zimmermann et al. |
| D388,107 S | 12/1997 | Huckins |
| 5,699,044 A | 12/1997 | Van Lente et al. |
| 5,699,057 A | 12/1997 | Ikeda et al. |
| 5,699,149 A | 12/1997 | Kuroda et al. |
| 5,706,355 A | 1/1998 | Raboisson et al. |
| 5,707,129 A | 1/1998 | Kobayashi |
| 5,708,410 A | 1/1998 | Blank et al. |
| 5,710,633 A | 1/1998 | Klappenbach et al. |
| 5,715,093 A | 2/1998 | Schierbeek et al. |
| 5,719,551 A | 2/1998 | Flick |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,764,139 A | 6/1998 | Nojima et al. |
| 5,765,116 A | 6/1998 | Wilson-Jones et al. |
| 5,765,940 A | 6/1998 | Levy et al. |
| 5,781,105 A | 7/1998 | Bitar et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,804,719 A | 9/1998 | Didelot et al. |
| 5,808,589 A | 9/1998 | Fergason |
| 5,811,888 A | 9/1998 | Hsieh |
| 5,820,097 A | 10/1998 | Spooner |
| 5,835,255 A | 11/1998 | Miles |
| 5,835,613 A | 11/1998 | Breed et al. |
| 5,835,614 A | 11/1998 | Aoyama et al. |
| 5,837,994 A | 11/1998 | Stam et al. |
| 5,841,126 A | 11/1998 | Fossum et al. |
| 5,844,505 A | 12/1998 | Van Ryzin |
| 5,844,682 A | 12/1998 | Kiyomoto et al. |
| 5,845,000 A | 12/1998 | Breed et al. |
| 5,847,755 A | 12/1998 | Wixson et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,193 A | 3/1999 | Karim |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |
| 5,890,083 A | 3/1999 | Franke et al. |
| 5,896,085 A | 4/1999 | Mori et al. |
| 5,899,956 A | 5/1999 | Chan |
| 5,904,725 A | 5/1999 | Iisaka et al. |
| 5,905,457 A | 5/1999 | Rashid |
| 5,912,534 A | 6/1999 | Benedict |
| 5,914,815 A | 6/1999 | Bos |
| 5,920,367 A | 7/1999 | Kajimoto et al. |
| 5,922,036 A | 7/1999 | Yasui et al. |
| 5,923,027 A | 7/1999 | Stam et al. |
| 5,929,784 A | 7/1999 | Kawaziri et al. |
| 5,929,786 A | 7/1999 | Schofield et al. |
| 5,938,320 A | 8/1999 | Crandall |
| 5,938,810 A | 8/1999 | De Vries, Jr. et al. |
| 5,940,120 A | 8/1999 | Frankhouse et al. |
| 5,942,853 A | 8/1999 | Piscart |
| 5,949,331 A | 9/1999 | Schofield et al. |
| 5,955,941 A | 9/1999 | Pruksch et al. |
| 5,956,181 A | 9/1999 | Lin |
| 5,959,367 A | 9/1999 | O'Farrell et al. |
| 5,959,555 A | 9/1999 | Furuta |
| 5,961,571 A | 10/1999 | Gorr et al. |
| 5,963,247 A | 10/1999 | Banitt |
| 5,964,822 A | 10/1999 | Alland et al. |
| 5,971,552 A | 10/1999 | O'Farrell et al. |
| 5,982,288 A | 11/1999 | Sawatari et al. |
| 5,986,796 A | 11/1999 | Miles |

(56) References Cited

U.S. PATENT DOCUMENTS

| | | |
|---|---|---|
| 5,990,469 A | 11/1999 | Bechtel et al. |
| 5,990,649 A | 11/1999 | Nagao et al. |
| 5,991,427 A | 11/1999 | Kakinami et al. |
| 6,001,486 A | 12/1999 | Varaprasad et al. |
| 6,009,336 A | 12/1999 | Harris et al. |
| 6,020,704 A | 2/2000 | Buschur |
| 6,028,537 A | 2/2000 | Suman et al. |
| 6,031,484 A | 2/2000 | Bullinger et al. |
| 6,037,860 A | 3/2000 | Zander et al. |
| 6,037,975 A | 3/2000 | Aoyama |
| 6,049,171 A | 4/2000 | Stam et al. |
| 6,052,124 A | 4/2000 | Stein et al. |
| 6,057,754 A | 5/2000 | Kinoshita et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,094,198 A | 7/2000 | Shashua |
| 6,097,023 A | 8/2000 | Schofield et al. |
| 6,097,024 A | 8/2000 | Stam et al. |
| 6,100,811 A | 8/2000 | Hsu et al. |
| 6,107,939 A | 8/2000 | Sorden |
| 6,116,743 A | 9/2000 | Hoek |
| 6,122,597 A | 9/2000 | Saneyoshi et al. |
| 6,124,647 A | 9/2000 | Marcus et al. |
| 6,124,886 A | 9/2000 | DeLine et al. |
| 6,139,172 A | 10/2000 | Bos et al. |
| 6,140,980 A | 10/2000 | Spitzer et al. |
| 6,144,022 A | 11/2000 | Tenenbaum et al. |
| 6,144,158 A | 11/2000 | Beam |
| 6,150,014 A | 11/2000 | Chu et al. |
| 6,150,930 A | 11/2000 | Cooper |
| 6,151,065 A | 11/2000 | Steed et al. |
| 6,151,539 A | 11/2000 | Bergholz et al. |
| 6,158,655 A | 12/2000 | DeVries, Jr. et al. |
| 6,166,628 A | 12/2000 | Andreas |
| 6,170,955 B1 | 1/2001 | Campbell et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,590 B1 | 1/2001 | Prevost et al. |
| 6,188,939 B1 | 2/2001 | Morgan et al. |
| 6,198,409 B1 | 3/2001 | Schofield et al. |
| 6,201,642 B1 | 3/2001 | Bos |
| 6,211,907 B1 | 4/2001 | Scaman et al. |
| 6,218,934 B1 | 4/2001 | Regan |
| 6,219,444 B1 | 4/2001 | Shashua et al. |
| 6,222,447 B1 | 4/2001 | Schofield et al. |
| 6,222,460 B1 | 4/2001 | DeLine et al. |
| 6,226,061 B1 | 5/2001 | Tagusa |
| 6,229,319 B1 | 5/2001 | Johnson |
| 6,243,003 B1 | 6/2001 | DeLine et al. |
| 6,247,819 B1 | 6/2001 | Turnbull et al. |
| 6,250,148 B1 | 6/2001 | Lynam |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,278,377 B1 | 8/2001 | DeLine et al. |
| 6,281,804 B1 | 8/2001 | Haller et al. |
| 6,285,393 B1 | 9/2001 | Shimoura et al. |
| 6,285,778 B1 | 9/2001 | Nakajima et al. |
| 6,291,905 B1 | 9/2001 | Drummond et al. |
| 6,291,906 B1 | 9/2001 | Marcus et al. |
| 6,292,752 B1 | 9/2001 | Franke et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,311,119 B2 | 10/2001 | Sawamoto et al. |
| 6,313,454 B1 | 11/2001 | Bos et al. |
| 6,315,421 B1 | 11/2001 | Apfelbeck et al. |
| 6,317,057 B1 | 11/2001 | Lee |
| 6,318,870 B1 | 11/2001 | Spooner et al. |
| 6,320,176 B1 | 11/2001 | Schofield et al. |
| 6,320,282 B1 | 11/2001 | Caldwell |
| 6,324,450 B1 | 11/2001 | Iwama |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,359,392 B1 | 3/2002 | He |
| 6,362,729 B1 | 3/2002 | Hellmann et al. |
| 6,366,213 B2 | 4/2002 | DeLine et al. |
| 6,366,236 B1 | 4/2002 | Farmer et al. |
| 6,370,329 B1 | 4/2002 | Teuchert |
| 6,388,565 B1 | 5/2002 | Bernhard et al. |
| 6,388,580 B1 | 5/2002 | Graham |
| 6,389,340 B1 | 5/2002 | Rayner |
| 6,392,218 B1 | 5/2002 | Kuehnle |
| 6,396,397 B1 | 5/2002 | Bos et al. |
| 6,396,408 B2 | 5/2002 | Drummond et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gulla et al. |
| 6,428,172 B1 | 8/2002 | Hutzel et al. |
| 6,429,594 B1 | 8/2002 | Stam et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,441,748 B1 | 8/2002 | Takagi et al. |
| 6,442,465 B2 | 8/2002 | Breed et al. |
| 6,445,287 B1 | 9/2002 | Schofield et al. |
| 6,445,809 B1 | 9/2002 | Sasaki et al. |
| 6,449,540 B1 | 9/2002 | Rayner |
| 6,452,148 B1 | 9/2002 | Bendicks et al. |
| 6,466,136 B2 | 10/2002 | DeLine et al. |
| 6,466,684 B1 | 10/2002 | Sasaki et al. |
| 6,469,739 B1 | 10/2002 | Bechtel et al. |
| 6,472,977 B1 | 10/2002 | Pochmuller |
| 6,472,979 B2 | 10/2002 | Schofield et al. |
| 6,477,260 B1 | 11/2002 | Shimomura |
| 6,477,464 B2 | 11/2002 | McCarthy et al. |
| 6,483,438 B2 | 11/2002 | DeLine et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,509,832 B1 | 1/2003 | Bauer et al. |
| 6,513,252 B1 | 2/2003 | Schierbeek |
| 6,515,378 B2 | 2/2003 | Drummond et al. |
| 6,516,272 B2 | 2/2003 | Lin |
| 6,516,664 B2 | 2/2003 | Lynam |
| 6,523,964 B2 | 2/2003 | Schofield et al. |
| 6,534,884 B2 | 3/2003 | Marcus et al. |
| 6,535,242 B1 | 3/2003 | Strumolo et al. |
| 6,539,306 B2 | 3/2003 | Turnbull |
| 6,540,193 B1 | 4/2003 | DeLine |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,577,334 B1 | 6/2003 | Kawai et al. |
| 6,578,017 B1 | 6/2003 | Ebersole et al. |
| 6,587,573 B1 | 7/2003 | Stam et al. |
| 6,587,968 B1 | 7/2003 | Leyva |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,593,960 B1 | 7/2003 | Sugimoto et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,614,579 B2 | 9/2003 | Roberts et al. |
| 6,617,564 B2 | 9/2003 | Ockerse et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |

(56) References Cited

U.S. PATENT DOCUMENTS

| | | |
|---|---|---|
| 6,650,455 B2 | 11/2003 | Miles |
| 6,653,614 B2 | 11/2003 | Stam et al. |
| 6,672,731 B2 | 1/2004 | Schnell et al. |
| 6,674,562 B1 | 1/2004 | Miles |
| 6,674,878 B2 | 1/2004 | Retterath et al. |
| 6,678,056 B2 | 1/2004 | Downs |
| 6,678,590 B1 | 1/2004 | Burchfiel |
| 6,678,614 B2 | 1/2004 | McCarthy et al. |
| 6,680,792 B2 | 1/2004 | Miles |
| 6,681,163 B2 | 1/2004 | Stam et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,524 B2 | 4/2004 | DeLine et al. |
| 6,717,610 B1 | 4/2004 | Bos et al. |
| 6,728,393 B2 | 4/2004 | Stam et al. |
| 6,728,623 B2 | 4/2004 | Takenaga et al. |
| 6,735,506 B2 | 5/2004 | Breed et al. |
| 6,738,088 B1 | 5/2004 | Uskolovsky et al. |
| 6,741,186 B2 | 5/2004 | Ross |
| 6,741,377 B2 | 5/2004 | Miles |
| 6,744,353 B2 | 6/2004 | Sjonell |
| 6,754,367 B1 | 6/2004 | Ito et al. |
| 6,757,109 B2 | 6/2004 | Bos |
| 6,762,867 B2 | 7/2004 | Lippert et al. |
| 6,764,210 B2 | 7/2004 | Akiyama |
| 6,765,480 B2 | 7/2004 | Tseng |
| 6,774,988 B2 | 8/2004 | Stam et al. |
| 6,784,828 B2 | 8/2004 | Delcheccolo et al. |
| 6,794,119 B2 | 9/2004 | Miles |
| 6,795,221 B1 | 9/2004 | Urey |
| 6,801,127 B2 | 10/2004 | Mizusawa et al. |
| 6,801,244 B2 | 10/2004 | Takeda et al. |
| 6,802,617 B2 | 10/2004 | Schofield et al. |
| 6,806,452 B2 | 10/2004 | Bos et al. |
| 6,807,287 B1 | 10/2004 | Hermans |
| 6,811,330 B1 | 11/2004 | Tozawa |
| 6,812,463 B2 | 11/2004 | Okada |
| 6,813,545 B2 | 11/2004 | Stromme |
| 6,819,231 B2 | 11/2004 | Berberich et al. |
| 6,819,779 B1 | 11/2004 | Nichani |
| 6,822,563 B2 | 11/2004 | Bos et al. |
| 6,823,241 B2 | 11/2004 | Shirato et al. |
| 6,823,261 B2 | 11/2004 | Sekiguchi |
| 6,824,281 B2 | 11/2004 | Schofield et al. |
| 6,831,261 B2 | 12/2004 | Schofield et al. |
| 6,838,980 B2 | 1/2005 | Gloger et al. |
| 6,842,189 B2 | 1/2005 | Park |
| 6,847,487 B2 | 1/2005 | Burgner |
| 6,850,629 B2 | 2/2005 | Jeon |
| 6,853,738 B1 | 2/2005 | Nishigaki et al. |
| 6,859,148 B2 | 2/2005 | Miller et al. |
| 6,861,809 B2 | 3/2005 | Stam |
| 6,864,930 B2 | 3/2005 | Matsushita et al. |
| 6,873,253 B2 | 3/2005 | Veziris |
| 6,882,287 B2 | 4/2005 | Schofield |
| 6,888,447 B2 | 5/2005 | Hori et al. |
| 6,889,161 B2 | 5/2005 | Winner et al. |
| 6,891,563 B2 | 5/2005 | Schofield et al. |
| 6,898,518 B2 | 5/2005 | Padmanabhan |
| 6,906,620 B2 | 6/2005 | Nakai et al. |
| 6,906,639 B2 | 6/2005 | Lemelson et al. |
| 6,909,753 B2 | 6/2005 | Meehan et al. |
| 6,914,521 B2 | 7/2005 | Rothkop |
| 6,928,180 B2 | 8/2005 | Stam et al. |
| 6,932,669 B2 | 8/2005 | Lee et al. |
| 6,933,837 B2 | 8/2005 | Gunderson et al. |
| 6,940,423 B2 | 9/2005 | Takagi et al. |
| 6,946,978 B2 | 9/2005 | Schofield |
| 6,950,035 B2 | 9/2005 | Tanaka et al. |
| 6,953,253 B2 | 10/2005 | Schofield et al. |
| 6,956,469 B2 | 10/2005 | Hirvonen et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,661 B1 | 11/2005 | Hattori et al. |
| 6,967,569 B2 | 11/2005 | Weber et al. |
| 6,968,736 B2 | 11/2005 | Lynam |
| 6,975,775 B2 | 12/2005 | Rykowski et al. |
| 6,980,092 B2 | 12/2005 | Turnbull et al. |
| 6,989,736 B2 | 1/2006 | Berberich et al. |
| 6,990,397 B2 | 1/2006 | Albou et al. |
| 6,995,687 B2 | 2/2006 | Lang et al. |
| 7,004,593 B2 | 2/2006 | Weller et al. |
| 7,004,606 B2 | 2/2006 | Schofield |
| 7,005,974 B2 | 2/2006 | McMahon et al. |
| 7,012,507 B2 | 3/2006 | DeLine et al. |
| 7,012,727 B2 | 3/2006 | Hutzel et al. |
| 7,023,331 B2 | 4/2006 | Kodama |
| 7,027,387 B2 | 4/2006 | Reinold et al. |
| 7,027,615 B2 | 4/2006 | Chen |
| 7,030,738 B2 | 4/2006 | Ishii |
| 7,030,775 B2 | 4/2006 | Sekiguchi |
| 7,030,778 B2 | 4/2006 | Ra |
| 7,038,577 B2 | 5/2006 | Pawlicki et al. |
| 7,046,448 B2 | 5/2006 | Burgner |
| 7,057,505 B2 | 6/2006 | Iwamoto |
| 7,057,681 B2 | 6/2006 | Hinata et al. |
| 7,062,300 B1 | 6/2006 | Kim |
| 7,065,432 B2 | 6/2006 | Moisel et al. |
| 7,068,289 B2 | 6/2006 | Satoh et al. |
| 7,068,844 B1 | 6/2006 | Javidi et al. |
| 7,085,633 B2 | 8/2006 | Nishira et al. |
| 7,085,637 B2 | 8/2006 | Breed et al. |
| 7,091,837 B2 | 8/2006 | Nakai et al. |
| 7,092,548 B2 | 8/2006 | Laumeyer et al. |
| 7,095,432 B2 | 8/2006 | Nakayama et al. |
| 7,106,213 B2 | 9/2006 | White |
| 7,110,021 B2 | 9/2006 | Nobori et al. |
| 7,110,156 B2 | 9/2006 | Lawlor et al. |
| 7,113,867 B1 | 9/2006 | Stein |
| 7,116,246 B2 | 10/2006 | Winter et al. |
| 7,121,028 B2 | 10/2006 | Shoen et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,171,027 B2 | 1/2007 | Satoh |
| 7,184,585 B2 | 2/2007 | Hamza et al. |
| 7,187,498 B2 | 3/2007 | Bengoechea et al. |
| 7,188,963 B2 | 3/2007 | Schofield et al. |
| 7,195,381 B2 | 3/2007 | Lynam et al. |
| 7,202,776 B2 | 4/2007 | Breed |
| 7,202,987 B2 | 4/2007 | Varaprasad et al. |
| 7,205,904 B2 | 4/2007 | Schofield |
| 7,221,363 B2 | 5/2007 | Roberts et al. |
| 7,224,324 B2 | 5/2007 | Quist et al. |
| 7,227,459 B2 | 6/2007 | Bos et al. |
| 7,227,611 B2 | 6/2007 | Hull et al. |
| 7,235,918 B2 | 6/2007 | McCullough et al. |
| 7,248,283 B2 | 7/2007 | Takagi et al. |
| 7,248,344 B2 | 7/2007 | Morcom |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,271,951 B2 | 9/2007 | Weber et al. |
| 7,304,661 B2 | 12/2007 | Ishikura |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,337,055 B2 | 2/2008 | Matsumoto et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,360,932 B2 | 4/2008 | Uken et al. |
| 7,362,883 B2 | 4/2008 | Otsuka et al. |
| 7,370,983 B2 | 5/2008 | DeWind et al. |
| 7,375,803 B1 | 5/2008 | Bamji |

(56) References Cited

U.S. PATENT DOCUMENTS

| | | |
|---|---|---|
| 7,380,948 B2 | 6/2008 | Schofield et al. |
| 7,388,182 B2 | 6/2008 | Schofield et al. |
| 7,402,786 B2 | 7/2008 | Schofield et al. |
| 7,403,659 B2 | 7/2008 | Das et al. |
| 7,420,756 B2 | 9/2008 | Lynam |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,429,998 B2 | 9/2008 | Kawauchi et al. |
| 7,432,248 B2 | 10/2008 | Roberts et al. |
| 7,432,967 B2 | 10/2008 | Bechtel et al. |
| 7,446,924 B2 | 11/2008 | Schofield et al. |
| 7,459,664 B2 | 12/2008 | Schofield et al. |
| 7,460,007 B2 | 12/2008 | Schofield et al. |
| 7,463,138 B2 | 12/2008 | Pawlicki et al. |
| 7,468,652 B2 | 12/2008 | DeLine et al. |
| 7,474,963 B2 | 1/2009 | Taylor et al. |
| 7,480,149 B2 | 1/2009 | DeWard et al. |
| 7,489,374 B2 | 2/2009 | Utsumi et al. |
| 7,495,719 B2 | 2/2009 | Adachi et al. |
| 7,525,604 B2 | 4/2009 | Xue |
| 7,526,103 B2 | 4/2009 | Schofield et al. |
| 7,533,998 B2 | 5/2009 | Schofield et al. |
| 7,541,743 B2 | 6/2009 | Salmeen et al. |
| 7,543,946 B2 | 6/2009 | Ockerse et al. |
| 7,545,429 B2 | 6/2009 | Travis |
| 7,548,291 B2 | 6/2009 | Lee et al. |
| 7,551,103 B2 | 6/2009 | Schofield |
| 7,561,181 B2 | 7/2009 | Schofield et al. |
| 7,565,006 B2 | 7/2009 | Stam et al. |
| 7,566,639 B2 | 7/2009 | Kohda |
| 7,566,851 B2 | 7/2009 | Stein et al. |
| 7,567,291 B2 | 7/2009 | Bechtel et al. |
| 7,605,856 B2 | 10/2009 | Imoto |
| 7,613,327 B2 | 11/2009 | Stam et al. |
| 7,616,781 B2 | 11/2009 | Schofield et al. |
| 7,619,508 B2 | 11/2009 | Lynam et al. |
| 7,629,996 B2 | 12/2009 | Rademacher et al. |
| 7,633,383 B2 | 12/2009 | Dunsmoir et al. |
| 7,639,149 B2 | 12/2009 | Katoh |
| 7,650,030 B2 | 1/2010 | Shan et al. |
| 7,653,215 B2 | 1/2010 | Stam |
| 7,655,894 B2 | 2/2010 | Schofield et al. |
| 7,663,798 B2 | 2/2010 | Tonar et al. |
| 7,676,087 B2 | 3/2010 | Dhua et al. |
| 7,679,498 B2 | 3/2010 | Pawlicki et al. |
| 7,683,326 B2 | 3/2010 | Stam et al. |
| 7,702,133 B2 | 4/2010 | Muramatsu et al. |
| 7,719,408 B2 | 5/2010 | DeWard et al. |
| 7,720,580 B2 | 5/2010 | Higgins-Luthman |
| 7,724,434 B2 | 5/2010 | Cross et al. |
| 7,731,403 B2 | 6/2010 | Lynam et al. |
| 7,742,864 B2 | 6/2010 | Sekiguchi |
| 7,786,898 B2 | 8/2010 | Stein et al. |
| 7,791,694 B2 | 9/2010 | Molsen et al. |
| 7,792,329 B2 | 9/2010 | Schofield et al. |
| 7,825,600 B2 | 11/2010 | Stam et al. |
| 7,842,154 B2 | 11/2010 | Lynam |
| 7,843,451 B2 | 11/2010 | Lafon |
| 7,854,514 B2 | 12/2010 | Conner et al. |
| 7,855,755 B2 | 12/2010 | Weller et al. |
| 7,855,778 B2 | 12/2010 | Yung et al. |
| 7,859,565 B2 | 12/2010 | Schofield et al. |
| 7,873,187 B2 | 1/2011 | Schofield et al. |
| 7,877,175 B2 | 1/2011 | Higgins-Luthman |
| 7,881,496 B2 | 2/2011 | Camilleri et al. |
| 7,903,324 B2 | 3/2011 | Kobayashi et al. |
| 7,903,335 B2 | 3/2011 | Nieuwkerk et al. |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,152 B2 | 5/2011 | Schofield et al. |
| 7,965,357 B2 | 6/2011 | Van De Witte et al. |
| 7,972,045 B2 | 7/2011 | Schofield |
| 7,991,522 B2 | 8/2011 | Higgins-Luthman |
| 7,994,462 B2 | 8/2011 | Schofield et al. |
| 7,995,067 B2 | 8/2011 | Navon |
| 8,004,392 B2 | 8/2011 | DeLine et al. |
| 8,017,898 B2 | 9/2011 | Lu et al. |
| 8,027,691 B2 | 9/2011 | Bernas et al. |
| 8,045,760 B2 | 10/2011 | Stam et al. |
| 8,063,759 B2 | 11/2011 | Bos et al. |
| 8,064,643 B2 | 11/2011 | Stein et al. |
| 8,082,101 B2 | 12/2011 | Stein et al. |
| 8,090,153 B2 | 1/2012 | Schofield et al. |
| 8,094,002 B2 | 1/2012 | Schofield et al. |
| 8,095,310 B2 | 1/2012 | Taylor et al. |
| 8,098,142 B2 | 1/2012 | Schofield et al. |
| 8,100,568 B2 | 1/2012 | DeLine et al. |
| 8,116,929 B2 | 2/2012 | Higgins-Luthman |
| 8,120,652 B2 | 2/2012 | Bechtel et al. |
| 8,162,518 B2 | 4/2012 | Schofield |
| 8,164,628 B2 | 4/2012 | Stein et al. |
| 8,179,437 B2 | 5/2012 | Schofield et al. |
| 8,184,159 B2 | 5/2012 | Luo |
| 8,203,440 B2 | 6/2012 | Schofield et al. |
| 8,203,443 B2 | 6/2012 | Bos et al. |
| 8,222,588 B2 | 7/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,288,711 B2 | 10/2012 | Heslin et al. |
| 8,289,142 B2 | 10/2012 | Pawlicki et al. |
| 8,289,430 B2 | 10/2012 | Bechtel et al. |
| 8,300,058 B2 | 10/2012 | Navon et al. |
| 8,305,471 B2 | 11/2012 | Bechtel et al. |
| 8,308,325 B2 | 11/2012 | Takayanagi et al. |
| 8,314,689 B2 | 11/2012 | Schofield et al. |
| 8,324,552 B2 | 12/2012 | Schofield et al. |
| 8,325,028 B2 | 12/2012 | Schofield et al. |
| 8,325,986 B2 | 12/2012 | Schofield et al. |
| 8,339,526 B2 | 12/2012 | Minikey, Jr. et al. |
| 8,350,683 B2 | 1/2013 | DeLine et al. |
| 8,362,883 B2 | 1/2013 | Hale et al. |
| 8,378,851 B2 | 2/2013 | Stein et al. |
| 8,386,114 B2 | 2/2013 | Higgins-Luthman |
| 8,405,726 B2 | 3/2013 | Schofield et al. |
| 8,414,137 B2 | 4/2013 | Quinn et al. |
| 8,434,919 B2 | 5/2013 | Schofield |
| 8,452,055 B2 | 5/2013 | Stein et al. |
| 8,481,910 B2 | 7/2013 | Schofield et al. |
| 8,481,916 B2 | 7/2013 | Heslin et al. |
| 8,492,698 B2 | 7/2013 | Schofield et al. |
| 8,508,593 B1 | 8/2013 | Schofield et al. |
| 8,513,590 B2 | 8/2013 | Heslin et al. |
| 8,531,278 B2 | 9/2013 | DeWard et al. |
| 8,531,279 B2 | 9/2013 | DeLine et al. |
| 8,534,887 B2 | 9/2013 | DeLine et al. |
| 8,538,205 B2 | 9/2013 | Sixsou et al. |
| 8,543,330 B2 | 9/2013 | Taylor et al. |
| 8,553,088 B2 | 10/2013 | Stein et al. |
| 8,593,521 B2 | 11/2013 | Schofield et al. |
| 8,599,001 B2 | 12/2013 | Schofield et al. |
| 8,629,768 B2 | 1/2014 | Bos et al. |
| 8,636,393 B2 | 1/2014 | Schofield |
| 8,637,801 B2 | 1/2014 | Schofield et al. |
| 8,643,724 B2 | 2/2014 | Schofield et al. |
| 8,656,221 B2 | 2/2014 | Sixsou et al. |
| 8,665,079 B2 | 3/2014 | Pawlicki et al. |
| 8,676,491 B2 | 3/2014 | Taylor et al. |
| 8,686,840 B2 | 4/2014 | Drummond et al. |
| 8,692,659 B2 | 4/2014 | Schofield et al. |
| 8,818,042 B2 | 8/2014 | Schofield et al. |
| 9,008,369 B2 | 4/2015 | Schofield et al. |
| 9,018,577 B2 | 4/2015 | Lu et al. |
| 9,171,217 B2 | 10/2015 | Pawlicki et al. |
| 9,191,634 B2 | 11/2015 | Schofield et al. |
| 9,428,192 B2 | 8/2016 | Schofield et al. |
| 9,440,535 B2 | 9/2016 | Schofield |
| 10,071,676 B2 | 9/2018 | Schofield |
| 10,787,116 B2 | 9/2020 | Schofield |
| 2001/0002451 A1 | 5/2001 | Breed |
| 2002/0003571 A1 | 1/2002 | Schofield et al. |
| 2002/0005778 A1 | 1/2002 | Breed et al. |

(56) References Cited

U.S. PATENT DOCUMENTS

| | | |
|---|---|---|
| 2002/0011611 A1 | 1/2002 | Huang et al. |
| 2002/0029103 A1 | 3/2002 | Breed et al. |
| 2002/0060522 A1 | 5/2002 | Stam et al. |
| 2002/0080235 A1 | 6/2002 | Jeon |
| 2002/0113873 A1 | 8/2002 | Williams |
| 2002/0116106 A1 | 8/2002 | Breed et al. |
| 2002/0126002 A1 | 9/2002 | Patchell |
| 2002/0126875 A1 | 9/2002 | Naoi et al. |
| 2002/0135468 A1 | 9/2002 | Bos et al. |
| 2003/0040864 A1 | 2/2003 | Stein |
| 2003/0070741 A1 | 4/2003 | Rosenberg et al. |
| 2003/0103142 A1 | 6/2003 | Hitomi et al. |
| 2003/0122930 A1 | 7/2003 | Schofield et al. |
| 2003/0125855 A1 | 7/2003 | Breed et al. |
| 2003/0128106 A1 | 7/2003 | Ross |
| 2003/0137586 A1 | 7/2003 | Lewellen |
| 2003/0191568 A1 | 10/2003 | Breed |
| 2003/0202683 A1 | 10/2003 | Ma et al. |
| 2003/0209893 A1 | 11/2003 | Breed et al. |
| 2003/0222982 A1 | 12/2003 | Hamdan et al. |
| 2004/0016870 A1 | 1/2004 | Pawlicki et al. |
| 2004/0021947 A1 | 2/2004 | Schofield et al. |
| 2004/0022416 A1 | 2/2004 | Lemelson et al. |
| 2004/0086153 A1 | 5/2004 | Tsai et al. |
| 2004/0096082 A1 | 5/2004 | Nakai et al. |
| 2004/0146184 A1 | 7/2004 | Hamza et al. |
| 2004/0148063 A1 | 7/2004 | Patchell |
| 2004/0164228 A1 | 8/2004 | Fogg et al. |
| 2004/0200948 A1 | 10/2004 | Bos et al. |
| 2005/0036325 A1 | 2/2005 | Furusawa et al. |
| 2005/0073853 A1 | 4/2005 | Stam |
| 2005/0131607 A1 | 6/2005 | Breed |
| 2005/0219852 A1 | 10/2005 | Stam et al. |
| 2005/0226490 A1 | 10/2005 | Phillips et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0095175 A1 | 5/2006 | deWaal et al. |
| 2006/0103727 A1 | 5/2006 | Tseng |
| 2006/0250224 A1 | 11/2006 | Steffel et al. |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0109406 A1 | 5/2007 | Schofield et al. |
| 2007/0115357 A1 | 5/2007 | Stein et al. |
| 2007/0120657 A1 | 5/2007 | Schofield et al. |
| 2007/0154063 A1 | 7/2007 | Breed |
| 2007/0154068 A1 | 7/2007 | Stein et al. |
| 2007/0193811 A1 | 8/2007 | Breed et al. |
| 2007/0221822 A1 | 9/2007 | Stein et al. |
| 2007/0229238 A1 | 10/2007 | Boyles et al. |
| 2007/0230792 A1 | 10/2007 | Shashua et al. |
| 2007/0242339 A1 | 10/2007 | Bradley |
| 2008/0036576 A1 | 2/2008 | Stein et al. |
| 2008/0043099 A1 | 2/2008 | Stein et al. |
| 2008/0137908 A1 | 6/2008 | Stein et al. |
| 2008/0147321 A1 | 6/2008 | Howard et al. |
| 2008/0231710 A1 | 9/2008 | Asari et al. |
| 2008/0234899 A1 | 9/2008 | Breed et al. |
| 2008/0239393 A1 | 10/2008 | Navon |
| 2008/0266396 A1 | 10/2008 | Stein |
| 2009/0052003 A1 | 2/2009 | Schofield et al. |
| 2009/0066065 A1 | 3/2009 | Breed et al. |
| 2009/0113509 A1 | 4/2009 | Tseng et al. |
| 2009/0143986 A1 | 6/2009 | Stein et al. |
| 2009/0182690 A1 | 7/2009 | Stein |
| 2009/0190015 A1 | 7/2009 | Bechtel et al. |
| 2009/0201137 A1 | 8/2009 | Weller et al. |
| 2009/0243824 A1 | 10/2009 | Peterson et al. |
| 2009/0256938 A1 | 10/2009 | Bechtel et al. |
| 2009/0300629 A1 | 12/2009 | Navon et al. |
| 2010/0125717 A1 | 5/2010 | Navon |
| 2010/0172547 A1 | 7/2010 | Akutsu |
| 2011/0018700 A1 | 1/2011 | Stein et al. |
| 2011/0219217 A1 | 9/2011 | Sixsou et al. |
| 2011/0280495 A1 | 11/2011 | Sixsou et al. |
| 2011/0307684 A1 | 12/2011 | Kreinin et al. |
| 2012/0002053 A1 | 1/2012 | Stein et al. |
| 2012/0045112 A1 | 2/2012 | Lundblad et al. |
| 2012/0056735 A1 | 3/2012 | Stein et al. |
| 2012/0069185 A1 | 3/2012 | Stein |
| 2012/0105639 A1 | 5/2012 | Stein et al. |
| 2012/0140076 A1 | 6/2012 | Rosenbaum et al. |
| 2012/0200707 A1 | 8/2012 | Stein et al. |
| 2012/0212593 A1 | 8/2012 | Na'aman et al. |
| 2012/0233841 A1 | 9/2012 | Stein |
| 2012/0314071 A1 | 12/2012 | Rosenbaum et al. |
| 2013/0135444 A1 | 5/2013 | Stein et al. |
| 2013/0141580 A1 | 6/2013 | Stein et al. |
| 2013/0147957 A1 | 6/2013 | Stein |
| 2013/0169536 A1 | 7/2013 | Wexler et al. |
| 2013/0271584 A1 | 10/2013 | Wexler et al. |
| 2013/0308828 A1 | 11/2013 | Stein et al. |
| 2014/0015976 A1 | 1/2014 | DeLine et al. |
| 2014/0033203 A1 | 1/2014 | Dogon et al. |
| 2014/0049648 A1 | 2/2014 | Stein et al. |
| 2014/0082307 A1 | 3/2014 | Kreinin et al. |
| 2014/0093132 A1 | 4/2014 | Stein et al. |
| 2014/0122551 A1 | 5/2014 | Dogon et al. |
| 2014/0125799 A1 | 5/2014 | Bos et al. |
| 2014/0156140 A1 | 6/2014 | Stein et al. |
| 2014/0160244 A1 | 6/2014 | Berberian et al. |
| 2014/0161323 A1 | 6/2014 | Livyatan et al. |
| 2014/0198184 A1 | 7/2014 | Stein et al. |

FOREIGN PATENT DOCUMENTS

| | | |
|---|---|---|
| CA | 1101522 A | 5/1981 |
| CA | 2392578 A1 | 5/2001 |
| CA | 2392652 A1 | 5/2001 |
| CH | 644315 A5 | 7/1984 |
| CN | 2074262 U | 4/1991 |
| CN | 2185701 Y | 12/1994 |
| CN | 1104741 A | 7/1995 |
| CN | 2204254 Y | 8/1995 |
| CN | 1194056 A | 9/1998 |
| CN | 1235913 A | 11/1999 |
| CN | 1383032 A | 12/2002 |
| CN | 102193852 A | 9/2011 |
| CN | 102542256 A | 7/2012 |
| DE | 1152627 B | 8/1963 |
| DE | 1182971 B | 12/1964 |
| DE | 1190413 B | 4/1965 |
| DE | 1196598 B | 7/1965 |
| DE | 1214174 B | 4/1966 |
| DE | 2064839 A1 | 7/1972 |
| DE | 3004247 A1 | 8/1981 |
| DE | 3040555 A1 | 5/1982 |
| DE | 3101855 A1 | 8/1982 |
| DE | 3240498 A1 | 5/1984 |
| DE | 3248511 A1 | 7/1984 |
| DE | 3433671 A1 | 3/1985 |
| DE | 3515116 A1 | 10/1986 |
| DE | 3528220 A1 | 2/1987 |
| DE | 3535588 A1 | 4/1987 |
| DE | 3601388 A1 | 7/1987 |
| DE | 3637165 A1 | 5/1988 |
| DE | 3636946 A1 | 6/1988 |
| DE | 3642196 A1 | 6/1988 |
| DE | 3734066 A1 | 4/1989 |
| DE | 3737395 A1 | 5/1989 |
| DE | 3838365 A1 | 6/1989 |
| DE | 3833022 A1 | 4/1990 |
| DE | 3839512 A1 | 5/1990 |
| DE | 3839513 A1 | 5/1990 |
| DE | 3937576 A1 | 5/1990 |
| DE | 3840425 A1 | 6/1990 |
| DE | 3844364 A1 | 7/1990 |
| DE | 9010196 U1 | 9/1990 |
| DE | 4015927 A1 | 11/1990 |
| DE | 3932216 A1 | 4/1991 |
| DE | 4007646 A1 | 9/1991 |

(56) References Cited

FOREIGN PATENT DOCUMENTS

| | | |
|---|---|---|
| DE | 4107965 A1 | 9/1991 |
| DE | 4111993 A1 | 10/1991 |
| DE | 4015959 A1 | 11/1991 |
| DE | 4116255 A1 | 12/1991 |
| DE | 4023952 A1 | 2/1992 |
| DE | 4130010 A1 | 3/1992 |
| DE | 4032927 A1 | 4/1992 |
| DE | 4133882 A1 | 4/1992 |
| DE | 4035956 A1 | 5/1992 |
| DE | 4122531 A1 | 1/1993 |
| DE | 4124654 A1 | 1/1993 |
| DE | 4137551 A1 | 3/1993 |
| DE | 4136427 A1 | 5/1993 |
| DE | 4300941 A1 | 7/1993 |
| DE | 4206142 A1 | 9/1993 |
| DE | 4214223 A1 | 11/1993 |
| DE | 4231137 A1 | 2/1994 |
| DE | 4328304 A1 | 3/1994 |
| DE | 4328902 A1 | 3/1994 |
| DE | 4332612 A1 | 4/1994 |
| DE | 4238599 A1 | 6/1994 |
| DE | 4337756 A1 | 6/1994 |
| DE | 4344485 A1 | 6/1994 |
| DE | 4304005 A1 | 8/1994 |
| DE | 4332836 C1 | 9/1994 |
| DE | 4407082 A1 | 9/1994 |
| DE | 4407757 A1 | 9/1994 |
| DE | 4411179 A1 | 10/1994 |
| DE | 4412669 A1 | 10/1994 |
| DE | 4418122 A1 | 12/1994 |
| DE | 4423966 A1 | 1/1995 |
| DE | 4336288 C1 | 3/1995 |
| DE | 4428069 A1 | 3/1995 |
| DE | 4434698 A1 | 3/1995 |
| DE | 4341409 A1 | 6/1995 |
| DE | 4446452 A1 | 6/1995 |
| DE | 69107283 T2 | 7/1995 |
| DE | 4403937 A1 | 8/1995 |
| DE | 19505487 A1 | 9/1995 |
| DE | 19518978 A1 | 11/1995 |
| DE | 069302975 T2 | 12/1996 |
| DE | 29703084 U1 | 4/1997 |
| DE | 29805142 U1 | 5/1998 |
| DE | 19755008 A1 | 7/1999 |
| DE | 19829162 A1 | 1/2000 |
| DE | 10237554 A1 | 3/2004 |
| DE | 000010251949 A1 | 5/2004 |
| DE | 4480341 B4 | 5/2005 |
| DE | 19530617 A1 | 2/2009 |
| EP | 0048492 A2 | 3/1982 |
| EP | 0049722 A1 | 4/1982 |
| EP | 0072406 A2 | 2/1983 |
| EP | 0169734 A2 | 1/1986 |
| EP | 0176615 A1 | 4/1986 |
| EP | 0202460 A2 | 11/1986 |
| EP | 0340735 A2 | 11/1989 |
| EP | 0341985 A2 | 11/1989 |
| EP | 0348691 A2 | 1/1990 |
| EP | 0353200 A2 | 1/1990 |
| EP | 0354561 A2 | 2/1990 |
| EP | 0360880 A1 | 4/1990 |
| EP | 0361914 A2 | 4/1990 |
| EP | 0387817 A2 | 9/1990 |
| EP | 0426503 A1 | 5/1991 |
| EP | 0433538 A2 | 6/1991 |
| EP | 0450553 A2 | 10/1991 |
| EP | 0454516 A1 | 10/1991 |
| EP | 0455524 A1 | 11/1991 |
| EP | 0459433 A1 | 12/1991 |
| EP | 473866 A2 | 3/1992 |
| EP | 0477986 A2 | 4/1992 |
| EP | 0479271 A2 | 4/1992 |
| EP | 0487100 A1 | 5/1992 |
| EP | 0487332 A2 | 5/1992 |
| EP | 0487465 A1 | 5/1992 |
| EP | 0492591 A1 | 7/1992 |
| EP | 0495508 A2 | 7/1992 |
| EP | 0496411 A2 | 7/1992 |
| EP | 0501345 A2 | 9/1992 |
| EP | 0505237 A1 | 9/1992 |
| EP | 0513476 A1 | 11/1992 |
| EP | 0514343 A2 | 11/1992 |
| EP | 0527665 A1 | 2/1993 |
| EP | 529346 A2 | 3/1993 |
| EP | 0532379 A1 | 3/1993 |
| EP | 0533508 A2 | 3/1993 |
| EP | 0550397 A1 | 7/1993 |
| EP | 0558027 A1 | 9/1993 |
| EP | 0564858 A2 | 10/1993 |
| EP | 0567059 A1 | 10/1993 |
| EP | 0582236 A1 | 2/1994 |
| EP | 0586857 A1 | 3/1994 |
| EP | 0588815 A1 | 3/1994 |
| EP | 0590588 A1 | 4/1994 |
| EP | 0591743 A1 | 4/1994 |
| EP | 0602962 A2 | 6/1994 |
| EP | 0605045 A1 | 7/1994 |
| EP | 0606586 A1 | 7/1994 |
| EP | 0617296 A1 | 9/1994 |
| EP | 0626654 A2 | 11/1994 |
| EP | 0640903 A1 | 3/1995 |
| EP | 0642950 A1 | 3/1995 |
| EP | 0654392 A1 | 5/1995 |
| EP | 0667708 A1 | 8/1995 |
| EP | 0677428 A1 | 10/1995 |
| EP | 0686865 A1 | 12/1995 |
| EP | 0687594 A1 | 12/1995 |
| EP | 0697641 A2 | 2/1996 |
| EP | 733252 A1 | 9/1996 |
| EP | 0756968 A1 | 2/1997 |
| EP | 0788947 A1 | 8/1997 |
| EP | 0830267 A2 | 3/1998 |
| EP | 0860325 A2 | 8/1998 |
| EP | 0874331 A2 | 10/1998 |
| EP | 0889801 A1 | 1/1999 |
| EP | 0893308 A2 | 1/1999 |
| EP | 0899157 A1 | 3/1999 |
| EP | 0913751 A1 | 5/1999 |
| EP | 0949818 A2 | 10/1999 |
| EP | 1022903 A2 | 7/2000 |
| EP | 1058220 A1 | 12/2000 |
| EP | 1065642 A2 | 1/2001 |
| EP | 1074430 A1 | 2/2001 |
| EP | 1115250 A1 | 7/2001 |
| EP | 1170173 A2 | 1/2002 |
| EP | 1236126 A1 | 9/2002 |
| EP | 1257971 A2 | 11/2002 |
| EP | 1359557 A1 | 11/2003 |
| EP | 1727089 A2 | 11/2006 |
| EP | 1741079 A1 | 1/2007 |
| EP | 1748644 A2 | 1/2007 |
| EP | 1754179 A1 | 2/2007 |
| EP | 1790541 A2 | 5/2007 |
| EP | 1806595 A1 | 7/2007 |
| EP | 1837803 A2 | 9/2007 |
| EP | 1887492 A1 | 2/2008 |
| EP | 1930863 A2 | 6/2008 |
| EP | 1978484 A1 | 10/2008 |
| EP | 2068269 A2 | 6/2009 |
| EP | 2101258 A1 | 9/2009 |
| EP | 2131278 A1 | 12/2009 |
| EP | 2150437 A1 | 2/2010 |
| EP | 2172873 A2 | 4/2010 |
| EP | 2187316 A1 | 5/2010 |
| EP | 2365441 A1 | 9/2011 |
| EP | 2377094 A1 | 10/2011 |
| EP | 2383679 A1 | 11/2011 |
| EP | 2383713 A1 | 11/2011 |
| EP | 2395472 A1 | 12/2011 |
| EP | 2431917 A1 | 3/2012 |
| EP | 2448251 A2 | 5/2012 |
| EP | 2463843 A2 | 6/2012 |
| EP | 2602741 A2 | 6/2013 |
| EP | 2605185 A2 | 6/2013 |

(56) References Cited

FOREIGN PATENT DOCUMENTS

| | | | |
|---|---|---|---|
| EP | 2629242 A1 | 8/2013 |
| EP | 2674323 A1 | 12/2013 |
| EP | 2690548 A1 | 1/2014 |
| EP | 2709020 A1 | 3/2014 |
| EP | 2728462 A2 | 5/2014 |
| ES | 2250218 T3 | 4/2006 |
| FR | 2610401 A1 | 8/1988 |
| FR | 2641237 A1 | 7/1990 |
| FR | 2646383 A1 | 11/1990 |
| FR | 2674201 A1 | 9/1992 |
| FR | 2674354 A1 | 9/1992 |
| FR | 2687000 A1 | 8/1993 |
| FR | 2706211 A1 | 12/1994 |
| FR | 2721872 A1 | 1/1996 |
| GB | 914827 A | 1/1963 |
| GB | 1000265 A | 8/1965 |
| GB | 1008411 A | 10/1965 |
| GB | 1054064 A | 1/1967 |
| GB | 1098608 A | 1/1968 |
| GB | 1098610 A | 1/1968 |
| GB | 1106339 A | 3/1968 |
| GB | 1178416 A | 1/1970 |
| GB | 1197710 A | 7/1970 |
| GB | 2210835 A | 6/1989 |
| GB | 2233530 A | 1/1991 |
| GB | 2255649 A | 11/1992 |
| GB | 2261339 A | 5/1993 |
| GB | 2262829 A | 6/1993 |
| GB | 9310728 | 7/1993 |
| GB | 2267341 A | 12/1993 |
| GB | 2271139 A | 4/1994 |
| GB | 2275452 A | 8/1994 |
| GB | 2280810 A | 2/1995 |
| GB | 2289332 A | 11/1995 |
| IE | 970014 A1 | 7/1998 |
| JP | S5539843 A | 3/1980 |
| JP | 55156901 | 12/1980 |
| JP | S5685110 A | 7/1981 |
| JP | S5871230 A | 4/1983 |
| JP | 58110334 | 6/1983 |
| JP | 58122421 | 7/1983 |
| JP | 59114139 | 7/1984 |
| JP | 59127200 | 7/1984 |
| JP | S6047737 A | 3/1985 |
| JP | 6080953 | 5/1985 |
| JP | S6078312 A | 5/1985 |
| JP | S60206746 A | 10/1985 |
| JP | 60240545 | 11/1985 |
| JP | S60219133 A | 11/1985 |
| JP | S60255537 A | 12/1985 |
| JP | S6141929 A | 2/1986 |
| JP | S6185238 A | 4/1986 |
| JP | S61105245 A | 5/1986 |
| JP | S61191937 A | 8/1986 |
| JP | 6079889 | 10/1986 |
| JP | 61-260217 | 11/1986 |
| JP | S61285151 A | 12/1986 |
| JP | S61285152 A | 12/1986 |
| JP | 62001652 | 1/1987 |
| JP | S6221010 A | 1/1987 |
| JP | S6226141 A | 2/1987 |
| JP | 62080143 | 4/1987 |
| JP | S6216073 | 4/1987 |
| JP | 6272245 | 5/1987 |
| JP | S62115600 A | 5/1987 |
| JP | 62131837 | 6/1987 |
| JP | S62253543 A | 11/1987 |
| JP | S62253546 A | 11/1987 |
| JP | S62287164 A | 12/1987 |
| JP | 63811446 | 1/1988 |
| JP | 63258236 | 10/1988 |
| JP | 63258237 | 10/1988 |
| JP | 63192788 B2 | 12/1988 |
| JP | 6414700 | 1/1989 |
| JP | 01123587 | 5/1989 |
| JP | H1168538 A | 7/1989 |
| JP | 01242917 | 9/1989 |
| JP | H01233129 A | 9/1989 |
| JP | H01265400 A | 10/1989 |
| JP | H01275237 A | 11/1989 |
| JP | H0268237 A | 3/1990 |
| JP | 02190978 | 7/1990 |
| JP | H236417 | 8/1990 |
| JP | H02212232 A | 8/1990 |
| JP | H2117935 A | 9/1990 |
| JP | H0314739 A | 1/1991 |
| JP | H0374231 A | 3/1991 |
| JP | 03099952 | 4/1991 |
| JP | 03266739 | 5/1991 |
| JP | H03246413 A | 11/1991 |
| JP | 03282707 | 12/1991 |
| JP | 03282709 | 12/1991 |
| JP | 03286399 | 12/1991 |
| JP | H03273953 A | 12/1991 |
| JP | H042909 A | 1/1992 |
| JP | H0410200 A | 1/1992 |
| JP | 04114587 | 4/1992 |
| JP | 04127280 | 4/1992 |
| JP | 04137014 | 5/1992 |
| JP | H04137112 A | 5/1992 |
| JP | H04194827 A | 7/1992 |
| JP | 04239400 | 8/1992 |
| JP | 04242391 | 8/1992 |
| JP | H04238219 A | 8/1992 |
| JP | 04250786 | 9/1992 |
| JP | 04291405 | 10/1992 |
| JP | H04303047 A | 10/1992 |
| JP | H0516722 A | 1/1993 |
| JP | H0538977 A | 2/1993 |
| JP | 0577657 | 3/1993 |
| JP | 05050883 | 3/1993 |
| JP | H05137144 A | 6/1993 |
| JP | H05155287 A | 6/1993 |
| JP | 05189694 | 7/1993 |
| JP | H05172638 A | 7/1993 |
| JP | 05-213113 | 8/1993 |
| JP | H05201298 A | 8/1993 |
| JP | 05244596 | 9/1993 |
| JP | H05229383 A | 9/1993 |
| JP | 05298594 | 11/1993 |
| JP | 05313736 | 11/1993 |
| JP | H05297141 A | 11/1993 |
| JP | 06048247 | 2/1994 |
| JP | H0640286 A | 2/1994 |
| JP | 06076200 | 3/1994 |
| JP | H0672234 A | 3/1994 |
| JP | 06107035 | 4/1994 |
| JP | 06113215 | 4/1994 |
| JP | 06117924 | 4/1994 |
| JP | 06150198 | 5/1994 |
| JP | H06162398 A | 6/1994 |
| JP | H06174845 A | 6/1994 |
| JP | H06191344 A | 7/1994 |
| JP | 06215291 | 8/1994 |
| JP | 6227318 B2 | 8/1994 |
| JP | 06230115 | 8/1994 |
| JP | H06229739 A | 8/1994 |
| JP | H06229759 A | 8/1994 |
| JP | 06247246 | 9/1994 |
| JP | 6266825 B1 | 9/1994 |
| JP | 06267304 | 9/1994 |
| JP | 06270733 | 9/1994 |
| JP | 06274626 | 9/1994 |
| JP | 06276524 | 9/1994 |
| JP | H06262963 A | 9/1994 |
| JP | H06267303 A | 9/1994 |
| JP | H06275104 A | 9/1994 |
| JP | 06295601 | 10/1994 |
| JP | H06289138 A | 10/1994 |
| JP | H06293236 A | 10/1994 |
| JP | 05093981 | 11/1994 |
| JP | 06310740 | 11/1994 |
| JP | 06321007 | 11/1994 |
| JP | H06321010 A | 11/1994 |

(56) References Cited

FOREIGN PATENT DOCUMENTS

| | | |
|---|---|---|
| JP | H06324144 A | 11/1994 |
| JP | 06337938 | 12/1994 |
| JP | 06341821 | 12/1994 |
| JP | H06332370 A | 12/1994 |
| JP | 07002021 | 1/1995 |
| JP | 07004170 | 1/1995 |
| JP | 07025286 | 1/1995 |
| JP | H072022 A | 1/1995 |
| JP | 732936 | 2/1995 |
| JP | 07032935 | 2/1995 |
| JP | 07047878 | 2/1995 |
| JP | 07052706 | 2/1995 |
| JP | H0737180 A | 2/1995 |
| JP | H0740782 A | 2/1995 |
| JP | H0746460 A | 2/1995 |
| JP | 07069125 | 3/1995 |
| JP | 07078240 | 3/1995 |
| JP | H0764632 A | 3/1995 |
| JP | H0771916 A | 3/1995 |
| JP | H07057200 A | 3/1995 |
| JP | H07078258 A | 3/1995 |
| JP | 07105496 | 4/1995 |
| JP | H07101291 A | 4/1995 |
| JP | H07105487 A | 4/1995 |
| JP | H07108873 A | 4/1995 |
| JP | H07108874 A | 4/1995 |
| JP | 07125571 | 5/1995 |
| JP | 07137574 | 5/1995 |
| JP | H07125570 A | 5/1995 |
| JP | H730149 | 6/1995 |
| JP | H07141588 A | 6/1995 |
| JP | H07144577 A | 6/1995 |
| JP | 07186818 | 7/1995 |
| JP | 07192192 | 7/1995 |
| JP | 06000927 | 8/1995 |
| JP | 07242147 | 9/1995 |
| JP | H07239714 A | 9/1995 |
| JP | H07249128 A | 9/1995 |
| JP | H07280563 A | 10/1995 |
| JP | H07315122 A | 12/1995 |
| JP | H0840138 A | 2/1996 |
| JP | H0840140 A | 2/1996 |
| JP | H0843082 A | 2/1996 |
| JP | H0844999 A | 2/1996 |
| JP | H0850697 A | 2/1996 |
| JP | H08138036 A | 5/1996 |
| JP | 08166221 | 6/1996 |
| JP | 08235484 | 9/1996 |
| JP | H08320997 A | 12/1996 |
| JP | 02630604 | 4/1997 |
| JP | H0991596 A | 4/1997 |
| JP | 09330415 | 12/1997 |
| JP | 10038562 | 2/1998 |
| JP | 10063985 | 3/1998 |
| JP | H1090188 A | 4/1998 |
| JP | 10134183 | 5/1998 |
| JP | 10171966 | 6/1998 |
| JP | H10222792 A | 8/1998 |
| JP | 10261189 | 9/1998 |
| JP | H1123305 A | 1/1999 |
| JP | 11069211 | 3/1999 |
| JP | 11078737 | 3/1999 |
| JP | H1178693 A | 3/1999 |
| JP | H1178717 A | 3/1999 |
| JP | 11250228 | 9/1999 |
| JP | H11259634 A | 9/1999 |
| JP | 11345392 | 12/1999 |
| JP | 2000016352 A | 1/2000 |
| JP | 2000085474 A | 3/2000 |
| JP | 2000113374 A | 4/2000 |
| JP | 2000127849 A | 5/2000 |
| JP | 2000207575 A | 7/2000 |
| JP | 2000215299 A | 8/2000 |
| JP | 2000305136 A | 11/2000 |
| JP | 2000311289 A | 11/2000 |
| JP | 2001001832 A | 1/2001 |
| JP | 2001092970 A | 4/2001 |
| JP | 2001180401 A | 7/2001 |
| JP | 2001188988 A | 7/2001 |
| JP | 2001297397 A | 10/2001 |
| JP | 2001351107 A | 12/2001 |
| JP | 2002022439 A | 1/2002 |
| JP | 2002046506 A | 2/2002 |
| JP | 200274339 A | 3/2002 |
| JP | 2002079895 A | 3/2002 |
| JP | 2002084533 A | 3/2002 |
| JP | 2002099908 A | 4/2002 |
| JP | 2002109699 A | 4/2002 |
| JP | 2002175534 A | 6/2002 |
| JP | 2002211428 A | 7/2002 |
| JP | 2002341432 A | 11/2002 |
| JP | 2003030665 A | 1/2003 |
| JP | 200376987 A | 3/2003 |
| JP | 2003083742 A | 3/2003 |
| JP | 3395289 B2 | 4/2003 |
| JP | 2003123058 A | 4/2003 |
| JP | 2003150938 A | 5/2003 |
| JP | 2003168197 A | 6/2003 |
| JP | 2003178397 A | 6/2003 |
| JP | 2003217099 A | 7/2003 |
| JP | 2003248895 A | 9/2003 |
| JP | 2003259361 A | 9/2003 |
| JP | 2003281700 A | 10/2003 |
| JP | 20041658 A | 1/2004 |
| JP | 2004032460 A | 1/2004 |
| JP | 2004146904 A | 5/2004 |
| JP | 2004336613 A | 11/2004 |
| JP | 2004355139 A | 12/2004 |
| JP | 2005182158 A | 7/2005 |
| KR | 200088351000 | 3/1995 |
| KR | 1020010018981 | 10/2002 |
| KR | 1004124340000 | 3/2004 |
| SE | 336535 B | 7/1971 |
| WO | 1988009023 | 11/1988 |
| WO | 1990004528 | 5/1990 |
| WO | 1993000647 | 1/1993 |
| WO | 1993004556 | 3/1993 |
| WO | 1993010550 | 5/1993 |
| WO | 1993011631 | 6/1993 |
| WO | 1993021596 | 10/1993 |
| WO | 1994019212 A2 | 9/1994 |
| WO | 1995018979 | 7/1995 |
| WO | 1995023082 A1 | 8/1995 |
| WO | 1996002817 | 2/1996 |
| WO | 1996015921 | 5/1996 |
| WO | 1996018275 A1 | 6/1996 |
| WO | 199621581 | 7/1996 |
| WO | 1986005147 | 9/1996 |
| WO | 1996034365 | 10/1996 |
| WO | 1996038319 A2 | 12/1996 |
| WO | 1997001246 A1 | 1/1997 |
| WO | 1997029926 | 8/1997 |
| WO | 1997035743 | 10/1997 |
| WO | 1997048134 A1 | 12/1997 |
| WO | 1998010246 | 3/1998 |
| WO | 1998014974 A1 | 4/1998 |
| WO | 1999023828 | 5/1999 |
| WO | 1999043242 A1 | 9/1999 |
| WO | 1999059100 | 11/1999 |
| WO | 2000015462 A1 | 3/2000 |
| WO | 2001026332 A2 | 4/2001 |
| WO | 2001039018 A1 | 5/2001 |
| WO | 2001039120 A2 | 5/2001 |
| WO | 2001064481 A2 | 9/2001 |
| WO | 2001070538 A2 | 9/2001 |
| WO | 2001077763 A1 | 10/2001 |
| WO | 2001080068 A1 | 10/2001 |
| WO | 2001080353 A1 | 10/2001 |
| WO | 2002071487 A1 | 9/2002 |
| WO | 2003065084 A1 | 8/2003 |
| WO | 2003093857 A2 | 11/2003 |
| WO | 2004004320 A1 | 1/2004 |
| WO | 2004005073 A2 | 1/2004 |
| WO | 2005098751 A1 | 10/2005 |

(56) References Cited

FOREIGN PATENT DOCUMENTS

| | | | |
|---|---|---|---|
| WO | 2005098782 A1 | 10/2005 | |
| WO | 2008134715 A1 | 11/2008 | |
| WO | 2013121357 A1 | 8/2013 | |

OTHER PUBLICATIONS

Xu et al., "3 DOF modular eye for smart car" School of Mechanical & Production Engineering Nanyang Technologies University, Intelligent Transportation Systems, 1999. Proc, Oct. 5-8, 1999, pp. 501-505.
Xu et al., "Cast shadow detection in video segmentation", Pattern Recognition Letters, vol. 26, Nov. 4, 2003.
Yadid-Pecht et al., "Wide Intrascene Dynamic Range CMOS APS Using Dual Sampling," IEEE Transactions on Electron Devices, vol. 44, No. 10, Oct. 1997.
Yamada et al., "Wide Dynamic Range Vision Sensor for Vehicles," 1994 Vehicle Navigation & Information Systems Conference Proceedings, pp. 405-408, 1994.
Yazigi, "Technology: Promethean Plans for Next Generation of Cars", The New York Times, Sep. 13, 1992.
Yee, "Portable Camera Mount", Feb. 1986, Abstract.
Yeh et al., "Image-Based Dynamic Measurement for Vehicle Steering Control", Proceedings of the Intelligent Vehicles 94 Symposium, 1994, Abstract.
Yerazunis et al., "An inexpensive, all solid-state video and data recorder for accident reconstruction" Mitsubishi Technical Report TR-99-29 (presented at the 1999 SAE International Congress and Exposition, Detroit, MI, Mar. 3, 1999.), Apr. 24, 1999.
Yoneyama et al., "Moving cast shadow elimination for robust vehicle extraction based on 2D joint vehicle/shadow models", Proceeding of IEEE International Conference on Advanced Video and Signal Based Surveillance, 2003.
Yoneyama et al., "Robust vehicle and traffic information extraction for highway surveillance", EURASIP Journal on Applied Signal Processing, pp. 2305-2321, 2005.
Young et al., "Cantata: Visual Programming Environment for the Khoros System, ACM SIGGRAPH Computer Graphics-Special focus: modular visualization environments (MVEs)", vol. 29, issue 2, Mar. 16, 1995.
Young et al., "Improved Obstacle Detection by Sensor Fusion", IEEE Colloquium on "Prometheus and Drive", Oct. 15, 1992, Abstract.
Yu et al., "Vehicles Recognition By Video Camera" 1995.
Yu, "Road tracking, lane segmentation and obstacle recognition by mathematical morphology," Intelligent Vehicles '92 Symposium, Proceedings of the IEEE 1992 Conference, p. 166-172.
Yuji et al., "Accidents and Near-Misses Analysis by Using Video Drive-Recorders in a Fleet Test", Proceedings of the 17th International Technical Conference on the Enhanced Safety of Vehicles (ESV) Conference, Jun. 4-7, 2001 Amsterdam, TheNetherlands.
National Highway Traffic Safety Administration, Washington, DC. HS 809 20, Jun. 2001.
Zheng et al., "An Adaptive System for Traffic Sign Recognition," IEEE Proceedings of the Intelligent Vehicles '94 Symposium, pp. 165-170 (Oct. 1994).
Zidek, "Lane Position Tracking", Aerospace and Electronics Conference, National Proceedings of the IEEE 1994, Abstract.
Zigman, "Light Filters to Improve Vision", Optometry and Vision Science, vol. 69, No. 4, pp. 325-328, Apr. 15, 1992.
IPR Proceeding IPR2015-00950 filed Mar. 27, 2015 on U.S. Pat. No. 8,636,393.
Najm, "Comparison of alternative crash-avoidance sensor technologies", Jan. 6, 1995, Abstract.
Nashman et al., "Real-time Visual Processing for Autonomous Driving," in Proceedings of the IEEE Intelligent Vehicles, vol. 93, Jun. 1993, pp. 14-16.
Nathan, Digital Video Data Handling, NASA JPL Tech Report 32-877, Pasadena, CA, Jan. 5, 1966.
National Museum of Scotland archives regarding VVL's imputer photos.
Navon, "SoC IP Qualification & Emulation Environment", Dec. 8-9, 2004.
Nguyen et al., "Obstacle detection using bi-spectrum CCD camera and image processing", Proceedings of the Intelligent Vehicles '92 Symposium, Jun. 29-Jul. 1, 1992, p. 42-50.
Nixon et al., "128.times.128 CMOS Photodiode-Type Active Pixel Sensor With On-Chip Timing, Control and Signal Chain Electronics" 1995.
Nixon et al., "256.times.256 CMOS Active Pixel Sensor Camera-on-a-Chip," IEEE Journal of Solid-State Circuits, vol. 31, No. 12, Paper FA 11.1, 1996.
No Hands Across America Journal, web page at http://www.cs.cmu.edu/.about.tjochem/nhaa/Journal.html.
No Hands Across American Official Press Release web page at http://www.cs.cmu.edu/.about.tjochem/nhaa/official_press_release.html.
Nolan, "Survey of Electronic Displays", SAE Paper No. 750364, published Feb. 1, 1975.
Oldenburg, "Comments on the Autronic Eye", 2002.
Ortega et al., "An Interactive, Reconfigurable Display System for Automotive Instrumentation", SAE Paper No. 860173, published Mar. 1, 1986.
Otsuka, "Flat Dot Matrix Display Module for Vehicle Instrumentation", SAE Paper No. 871288, published Nov. 8, 1987.
Pacaud et al., "Ground Speed Sensing," Lucas International Symposium, Paris, France 1989.
Paetzold, "Interpretation of visually sensed urban environment for a self-driving car" Ruhr-Universitat Bochum, Dissertation, Sep. 2000.
Page et al., "Advanced technologies for collision avoidance," Eureka on Campus (Summer 1992).
Paradiso et al., "Wide-Range Precision Alignment for the Gem Muon System," Oct. 1993.
Paradiso, "Application of miniature cameras in video straightness monitor systems", Draper Laboratory, Jun. 1994.
Paradiso, "Electronics for precision alignment of the Gem Muon System", Proceedings of the 1994 LeCroy Electronics For Future Colliders Conference, May 1994.
Parent, "Automatic Driving for Small Public Urban Vehicles," Intelligent Vehicles Symposium, Tokyo, Jul. 14-16, 1993.
Parker (ed.), McGraw-Hill Dictionary of Scientific and Technical Terms Fifth Edition (1993).
Parnell, "Reconfigurable Vehicle". No. 2002-01-0144. SAE Technical Paper, 2002. Xilinx WPI 53, Nov. 19, 2001.
Pelco Fixed Focal Length Lenses Product Specification, Apr. 1996.
Peng et al., "Experimental Automatic Lateral Control System for an Automobile," California Partners for Advanced Transit and Highways (PATH), Jan. 1, 1992.
Peng, "Vehicle Lateral Control for Highway Automation," Ph.D. Thesis—University of California Berkeley, 1992.
Philips Components, PCA82C200, Stand-alone CAN-controller, Jan. 22, 1991.
Philomin et al., "Pedestrain Tracking from a Moving Vehicle", Proceedings of the IEEE, Intelligent Vehicles Symposium, IV, 2000.
Photographs evidencing a Watec WAT-660D camera and photographs evidencing the mounting bracket used for attaching the WatecWAT-660D, the model of camera which was used as the forward facing camera on Navlab 6.
Piccioli et al., "Robust road sign detection and recognition from image sequences", 1994.
Pollard, "Evaluation of the Vehicle Radar Safety Systems' Rashid Radar Safety Brake Collision Warning System", U.S. Dept. of Transportation, National Highway Traffic Safety Administration, Feb. 29, 1988.
Pomerleau, "Alvinn: An Autonomous Land Vehicle in a Neural Network", Technical Report AIP-77 Department of Psychology, Carnegie Mellon University, Mar. 13, 1990.
Pomerleau, "RALPH: Rapidly Adapting Lateral Position Handler", The Robotics Institute, Carnegie Mellon University, Pittsburgh, PA, pp. 506-511., 1995.

(56) References Cited

OTHER PUBLICATIONS

Pomerleau et al., "Run-Off-Road Collision Avoidance Countermeasures Using IVHS Countermeasures TASK 3-vol. 1", U.S. Dept. of Transportation, National Highway Traffic Safety Administration, Final Report, Aug. 23, 1995.
Pomerleau et al., "Rapidly Adapting Machine Vision for Automated Vehicle Steering", pp. 19-27, Apr. 30, 1996.
Pomerleau, "Run-Off-Road Collision Avoidance Using Ivhs Countermeasures", Robotics Institute, Task 6 Interim Report, Sep. 10, 1996.
Porter et al., "Compositing Digital Images," Computer Graphics (Proc. Siggraph), vol. 18, No. 3, pp. 253-259, Jul. 1984.
Prasad, "Performance of Selected Event Data Recorders", National Highway Traffic Safety Administration. Washington, DC, Sep. 2001.
Prati et al., "Detecting moving shadows: algorithms and evaluation", IEEE Transactions on Pattern Analysis and Machine Intelligence, vol. 25, Jul. 1, 2003.
Pratt, "Digital Image Processing, Passage-ED.3", John Wiley & Sons, US, Jan. 1, 2001, pp. 657-659, XP002529771.
Priese et al., "New Results on Traffic Sign Recognition", IEEE Proceedings of the Intelligent Vehicles 1994 Symposium.
Priese et al., "Traffic Sign Recognition Based on Color Image", Universitat Koblenz-Landau, 1993, pp. 95-100.
Proceedings of the 1992 International Conference on Industrial Electronics, Control, Instrumentation, and Automation, 1992. Power Electronics and Motion Control, Date of Conference Nov. 9-13, 1992.
Proceedings of the Intelligent Vehicles Symposium, 1992-present.
Proceedings of the Intelligent Vehicles Symposium, Tokyo, Jul. 14-16, 1993.
Pynn et al., "Automatic identification of cracks in road surfaces" 7th International Conference on Image Processing and Its Application, CP465, Jan. 1999, pp. 671-675, Abstract.
Raboisson et al., "Obstacle Detection in Highway Environment by Colour CCD Camera and Image Processing Prototype Installed in a Vehicle", Proceedings of the IEEE Intelligent Symposium 1994.
Radatz, "The IEEE Standard Dictionary of Electrical and Electronics Terms," Sixth Edition, Standards Coordinating Committee 10, Terms and Definitions, 1996.
Raglan Tribe Video-1994; 1994; Raglan Tribe; "Robot Car Raglan Tribe" http://www.youtube.com/watch?v=AlLZhcnpXYI.
Ramesh et al., "Real-Time Video Surveillance and Monitoring for Automotive Applications", SAE Technical Paper 2000-01-0347, Mar. 6, 2000, Abstract.
"Generation of Vision Technology," published by VLSI Vision Limited, pub. date unknown.
"All-seeing screens for tomorrow's cars", Southend Evening Echo, Oct. 4, 1991.
"CCD vs. CMOS," Teledyne DALSA Inc., accessed at https://www.teledynedalsa.com/imaging/knowledgecenter/appnotes/ccd-vs-cmos/.
"Final Report of the Working Group on Advanced Vehicle Control Systems (AVCS)" Mobility 2000, Mar. 1990.
"How an Image Intensifier Tube Works," PHOTONIS Group, accessed at http://www.nightvision.nl/faq-reader/how-does-an-image-intensifier-work.html.
"How does an image intensifier work?" accessed at; http://www.nightvision.nl/faq-reader/how-does-an-imageintensifier-work.html.
"Image intensified CCD high speed cameras," Stanford Computer Optics, Inc., accessed at http://www.stanfordcomputeroptics.com/technology/iccd-systemoverview.html.
"Magic Eye on safety", Western Daily Press, Oct. 10, 1991.
"On-screen technology aims at safer driving", Kent Evening Post Oct. 4, 1991.
"The Electromagnetic and Visible Spectra," Light Waves and Color—Lesson 2, accessed at http://www.physicsclassroom.com/class/light/Lesson-2/The-Electromagnetic-and-Visible-Spectra.

"Versatile LEDs Drive Machine vision in Automated Manufacture," http://www.digikey.ca/en/articles/techzone/2012/jan/versatileleds-drive-machine-vision-in-automated-manufacture.
"Vision Systems 101: An Introduction," Teledyne DALSA Inc., accessed at; https://www.teledynedalsa.com/imaging/products/visionsystems/vs101/.
3M, "Automotive Rear View Mirror Button Repair System", Automotive Engineered Systems Division, Jun. 1996.
Abshire et al., "Confession Session: Learning from Others Mistakes," 2011 IEEE International Symposium on Circuits and Systems (ISCAS), 2011.
Achler et al., "Vehicle Wheel Detector using 2D Filter Banks," IEEE Intelligent Vehicles Symposium of Jun. 2004.
Ackland et al., "Camera on a chip", Digest of Technical Papers of the 42nd Solid-State Circuits Conference (ISSCC), Paper TA 1.2, 1996.
Alley, "Algorithms for automatic guided vehicle navigation and guidance based on Linear Image Array sensor data", Masters or PhD. Thesis, Dec. 31, 1988.
Altan, "LaneTrak: a vision-based automatic vehicle steering system", Applications in Optical Science and Engineering. International Society for Optics and Photonics, 1993, Abstract.
Amidi, "Integrated Mobile Robot Control", M.S. Thesis, Carnegie Mellon University, May 1990.
An et al., "Aspects of Neural Networks in Intelligent Collision Avoidance Systems for Prometheus", JFIT 93, pp. 129-135, Mar. 1993.
Arain et al., "Action planning for the collision avoidance system using neural networks", Intelligent Vehicle Symposium, Tokyo, Japan, Jul. 1993.
Arain et al., "Application of Neural Networks for Traffic Scenario Identification", 4th Prometheus Workshop, University of Compiegne, Paris, France, pp. 102-111, Sep. 1990.
Ashley, "Smart Cars and Automated Highways", Mechanical Engineering 120.5 (1998): 58, Abstract.
Aufrere et al., "A model-driven approach for real-time road recognition", Machine Vision and Applications 13, 2001, pp. 95-107.
Auty et al., "Image acquisition system for traffic monitoring applications" IS&T/SPIE's Symposium on Electronic Imaging: Science & Technology. International Society for Optics and Photonics, Mar. 14, 1995.
Aw et al., "A 128.times.128 Pixel Standard-CMOS Image Sensor with Electronic Shutter," IEEE Journal of Solid-State Circuits, vol. 31, No. 12, Dec. 1996.
Ballard et al., "Computer Vision", 1982, p. 88-89, sect. 3.4.1.
Barron et al., "The role of electronic controls for future automotive mechatronic systems", IEEE/ASME Transactions on mechatronics 1.1, Mar. 1996, pp. 80-88.
Batavia et al., "Overtaking vehicle detection using implicit optical flow", Proceedings of the IEEE Transportation Systems Conference, Nov. 1997, pp. 729-734.
Batavia, "Driver-Adaptive Lane Departure Warning Systems", The Robotics Institute Carnegie Mellon University Pittsburgh, Pennsylvania, 15213, Sep. 20, 1999.
Bederson, "A miniature Space-Variant Active Vision System: Cortex-I", Masters or Ph.D. Thesis, Jun. 10, 1992.
Begault, "Head-Up Auditory Displays for Traffic Collision Avoidance System Advisories: A Preliminary Investigation", Human Factors, 35(4), Dec. 1993, pp. 707-717.
Behringer et al., "Simultaneous Estimation of Pitch Angle and Lane Width from the Video Image of a Marked Road," pp. 966-973, Sep. 12-16, 1994.
Behringer, "Road recognition from multifocal vision", Intelligent Vehicles' 94 Symposium, Proceedings of the. IEEE, 1994, Abstract.
Belt et al., "See-Through Turret Visualization Program", No. NATICK/TR-02/005. Honeywell Inc., Minn, MN Sensors and Guidance Products, 2002.
Bensrhair et al., "A cooperative approach to vision-based vehicle detection" Intelligent Transportation Systems, IEEE, 2001.
Bertozzi et al., "Obstacle and lane detection on ARGO", IEEE Transactions on Image Processing, 7(1):62-81, Jan. 1998, pp. 62-81.

(56) References Cited

OTHER PUBLICATIONS

Bertozzi et al., "Performance analysis of a low-cost solution to vision-based obstacle detection", Intelligent Transportation Systems, 1999. Proc., Oct. 5-8, 1999, pp. 350-355.
Bertozzi et al., "Vision-based intelligent vehicles: State of the art and perspectives" Robotics and Autonomous Systems, 32, 2000 pp. 1-16.
Bertozzi et al., "GOLD: a parallel real-time stereo vision system for generic obstacle and lane detection", IEEE transactions on image processing 7.1 (1998): 62-81.
Betke et al., "Real-time multiple vehicle detection and tracking from a moving vehicle", Machine Vision and Applications, 2000.
Beucher et al., "Road Segmentation and Obstacle Detection by a Fast Watershed Transformation", Intelligent Vehicles' 94 Symposium, Proceedings of the. IEEE, 1994.
Blomberg et al., "NightRider Thermal Imaging Camera and HUD Development Program for Collision Avoidance Applications", Raytheon Commercial Infrared and ELCAN-Texas Optical Technologies, 2000, Abstract.
Borenstein et al., "Where am I? Sensors and Method for Mobile Robot Positioning", University of Michigan, Apr. 1996, pp. 2, 125-128.
Bosch, "CAN Specification", Version 2.0, Sep. 1991.
Bow, "Pattern Recognition and Image Preprocessing (Signal Processing and Communications)", CRC Press, Jan. 15, 2002, pp. 557-559.
Brackstone et al., "Dynamic Behavioral Data Collection Using an Instrumented Vehicle", Transportation Research Record: Journal of the Transportation Research Board, vol. 1689, Paper 99-2535, 1999.
Brandt, "A CRT Display System for a Concept Vehicle", SAE Paper No. 890283, published Feb. 1, 1989.
Brauckmann et al., "Towards all around automatic visual obstacle sensing for cars", Intelligent Vehicles' 94 Symposium, Proceedings of the. IEEE, 1994.
Britell et al., "Collision avoidance through improved communication between tractor and trailer" Proceedings: International Technical Conference on the Enhanced Safety of Vehicles. vol. 1998. National Highway Traffic Safety Administration, 1998.
Broggi et al., "ARGO and the MilleMiglia in Automatico Tour", IEEE Intelligent Systems, Jan.-Feb. 1999, pp. 55-64.
Broggi et al., "Architectural Issues on Vision-based automatic vehicle guidance: The experience of the ARGO Project", Academic Press, 2000.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 14-17, 2004.
Broggi et al., "Vision-based Road Detection in Automotive Systems: A real-time expectation-driven approach", Journal of Artificial Intelligence Research, 1995.
Broggi, "Robust Real-time Lane and Road Detection in Critical Shadow Conditions", International Symposium on Computer Vision, IEEE, 1995, pp. 21-23.
Brown, "A Survey of Image Registration Techniques", vol. 24, ACM Computing Surveys, pp. 325-376, Dec. 4, 1992.
Brown, "Scene Segmentation and Definition for Autonomous Robotic Navigation Using Structured Light Processing", Doctoral Dissertation, University of Delaware, Army Science Conference Proceedings, Jun. 22-25, 1992, vol. 1, Dec. 31, 1988, pp. 189-203,Abstract.
Brunelli et al., "Template Matching: Matched Spatial Filters and Beyond," Pattern Recognition, vol. 30, No. 5, 1997.
Bucher et al., "Image processing and behavior planning for intelligent vehicles", IEEE Transactions on Industrial electronics 50.1 (2003): 62-75.
Burger et al., "Estimating 3-D Egomotion from Perspective Image Sequences", IEEE Transactions on Pattern Analysis and Machine Intelligence, vol. 12, No. 11, pp. 1040-1058, Nov. 1990.
Burt et al., "A Multiresolution Spline with Application to Image Mosaics", ACM Transactions on Graphics, vol. 2. No. 4, pp. 217-236, Oct. 1983.

Cardiles, "Implementation de la commande d'un vehicule electrique autonome grace a un capteur de distance et d'angle base sur une camera lineaire" IUP de Mathematiques Appliquees et Industrielles, May 8, 1998.
Carley et al., "Synthesis Tools for Mixed-Signal ICs: Progress on Frontend and Backend Strategies," Proceedings of the 33rd Design Automation Conference, 1996.
Cartledge, "Jaguar gives cat more lives", Birmingham Post, Oct. 10, 1991.
Cassiano et al., "Review of filtering methods in mobile vision from ground vehicles in low light conditions", Proc. SPIE 1613, Mobile Robots VI, 322, Feb. 14, 1992.
Chapuis et al., "Road Detection and Vehicles Tracking by Vision for an On-Board ACC System in the VELAC Vehicle", 2000.
Charkari et al., "A new approach for real time moving vehicle detection", Proceedings of the 1993 IEEE/RSJ International Conference on Intelligent Robots and Systems, Yokohama, JP, Jul. 26-30, 1993.
Chern et al., "The lane recognition and vehicle detection at night for a camera-assisted car on highway", Robotics and Automation, 2003. Proceedings. ICRA'03. IEEE International Conference on. vol. 2. IEEE, 2003, Abstract.
Chien et al., "Efficient moving object segmentation algorithm using background registration technique", IEEE Transactions on Circuits and Systems for Video Technology, vol. 12., No. 7, Jul. 2002.
Clune et al., "Implementation and performance of a complex vision system on a systolic array machine", Carnegie Mellon University, Jun. 15, 1987.
CMOS sensor page of University of Edinburgh, 2015.
Coghill, "Digital Imaging Technology 101", Albert Theuwissen, Dalsa Corp, 2003.
Coifman et al., "A real-time computer vision system for vehicle tracking and traffic surveillance", Transportation Research Part C 6, pp. 271-288, 1998.
Corsi, "Reconfigurable Displays Used as Primary Automotive Instrumentation", SAE Paper No. 890282, published Feb. 1, 1989.
Crisman et al., "Color Vision for Road Following", Robotics Institute at Carnegie Mellon University, Proceedings of SPIE Conference on Mobile Robots Nov. 11, 1988, pp. 1-10, Oct. 12, 1988.
Crisman et al., "UNSCARF, A Color Vision System for the Detection of Unstructured Roads" IEEE Paper 1991.
Crisman et al., "Vision and Navigation—The Carnegie Mellon Navlab" Carnegie Mellon University, edited by Charles E. Thorpe, 1990.
Crisman, "SCARF: Color vision system that tracks roads and intersections", IEEE, 1993.
Crossland, "Beyond Enforcement: In-Car Video Keeps Officers On The Streets", Traffic technology international. Annual review, 1998, Abstract.
Cucchiara et al., "Vehicle Detection under Day and Night Illumination", Proceedings of 3rd International ICSC Symposium on Intelligent Industrial Automation (IIA 99), 1999.
Cucchiara et al., "Detecting moving objects, ghosts, and shadows in video streams", IEEE Transactions on Pattern Analysis and Machine Intelligence, vol. 25, No. 10, 2003.
Cucchiara et al., "Improving Shadow Suppression in Moving Object Detection with HSV Color Information", Proceeding of IEEE International Conference on Intelligent Transportation Systems, 2001.
Curry et al., "The Lancashire telemedicine ambulance", Journal of Telemedicine and telecare 4.4 (1998): 231-238, Dec. 1, 1998, Abstract.
Dagan et al., "Forward collision warning with a single camera", IEEE Intelligent Vehicles Symposium, 2004.
Dally et al., "Digital Systems Engineering", The University of Cambridge, United Kingdom, 1998.
Davis et al., "Road Boundary Detection for Autonomous Vehicle Navigation", Optical Engineering, vol. 25, No. 3, Mar. 1986, pp. 409-414.
Davis, "Vision-Based Navigation for Autonomous Ground Vehicles" Defense Advanced Research Projects Agency, Jul. 18, 1988.
De la Escalera et al., "Neural traffic sign recognition for autonomous vehicles" IEEE, 1994.

(56) References Cited

OTHER PUBLICATIONS

De la Escalera et al., "Traffic sign recognition and analysis for intelligent vehicles", Division of Systems Engineering and Automation, Madrid, Spain, 2003.
Decision-Motions-Bd. R. 125(a), issued Aug. 29, 2006 in connection with Interference No. 105,325, which involved U.S. Appl. No. 09/441,341, filed Nov. 16, 1999 by Schofield et al. and U.S. Pat. No. 5,837,994, issued to Stam et al.
DeFauw, "A System for Small Target Detection, Tracking, and Classification, Intelligent Transportation System", Intelligent Transportation Systems, 1999. Proceedings. 1999 IEEE/IEEJ/JSAI International Conference on. IEEE, 1999, Abstract.
Denes et al., "Assessment of driver vision enhancement technologies," Proceedings of SPIE: Collusion Avoidance and Automated Traffic Management Sensors, vol. 2592, Oct. 1995.
DeNuto et al., "LIN Bus and its Potential for use in Distributed Multiplex Applications", SAE Technical Paper 2001-01-0072, Mar. 5-8, 2001.
Denyer et al., "On-Chip CMOS Sensors for VLSI Imaging Systems", Dept. of Elect. Engineering, University of Edinburgh, pp. 4b1.1-4b1.5, 1991.
Derutin et al., "Real-time collision avoidance at road-crossings on board the Prometheus-ProLab 2 vehicle", Intelligent Vehicles' 94 Symposium, Proceedings of the. IEEE, 1994, Abstract.
Devlin, "The Eyellipse and Considerations in the Driver's Forward Field of View," Society of Automotive Engineers, Inc., Detroit, MI, Jan. 8-12, 1968.
Dickinson et al., "CMOS Digital Camera with Parallel Analog-to-Digital Conversion Architecture", Apr. 1995.
Dickmanns et al., "A Curvature-based Scheme for Improving Road Vehicle Guidance by Computer Vision," University of Bundeswehr Munchen, 1986.
Dickmanns et al., "Recursive 3-D road and relative ego-state recognition," IEEE Transactions on Pattern Analysis and Machine Intelligence, vol. 14, No. 2, Feb. 1992.
Dickmanns et al.; "An integrated spatio-temporal approach to automatic visual guidance of autonomous vehicles," IEEE Transactions on Systems, Man, and Cybernetics, vol. 20, No. 6, Nov./Dec. 1990.
Dickmanns, "Vehicles Capable of Dynamic Vision", Aug. 23, 1997.
Dickmanns, "4-D dynamic vision for intelligent motion control", Universitat der Bundeswehr Munich, 1991.
Dickmanns et al., "The seeing passenger car 'VaMoRs-P'", Oct. 24, 1994.
Dingus et al., "TRAVTEK Evaluation Task C3-Camera Car Study" Final Report/ 9-92 to 5-94. Jun. 1995.
Donnelly Panoramic Vision.TM. on Renault Talisman Concept Car at Frankfort Motor Show, PR Newswire, Frankfort, Germany Sep. 10, 2001.
Doudoumopoulos et al., "CMOS Active Pixel Sensor Technology for High Performance Machine Vision Applications," SME Applied Machine Vision '96—Emerging Smart Vision Sensors, Jun. 1996.
Draves, "A Video Graphics Controller for Reconfigurable Automotive Displays", No. 970193. SAE Technical Paper Feb. 24, 1997, Abstract.
Dubrovin et al., "Application of real-time lighting simulation for intelligent front-lighting studies", 2000 pp. 333-343.
Dubuisson-Jolly, "Vehicle segmentation and classification using deformable templates", IEEE Transactions on Pattern Analysis and Machine Intelligence, Mar. 1996.
Easton, "Jaguar Adapts Pilot's Night Sights for safer driving", The Times, Sep. 28, 1991.
Eaton, "Video Incident Capture System", Technical Memorandum, OIC General Enforcement Branch, Sep. 1991.
Eaton, "An RS-170 Camera for the Military Environment", Proc. SPIE 0979, Airborne Reconnaissance XII, Feb. 23, 1989, Abstract.
Eid et al., "A 256.times.256 CMOS Active Pixel Image Sensor," Proceedings of SPIE: Charge-Coupled Devices and Solid State Optical Sensors V, vol. 2415, 1995.
Elwell et al., "Near Infrared Spectroscopy," accessed at http://www.ucl.ac.uk/medphys/research/borl/intro/nirs, Jan. 6, 1999.
Ernst et al., "Camera calibration for lane and obstacle detection" Intelligent Transportation Systems, 1999 pp. 356-361.
Fancher et al. "Intelligent Cruise Control Field Operational Test (Final Report)", Final Report, vol. I: Technical Report, May 1998.
Fancher et al., "Fostering Development, Evaluation, and Deployment of Forward Crash Avoidance Systems (FOCAS)" Annual Research Report DOT HS 808 437, May 1995.
Ferryman et al., "Visual Surveillance for Moving Vehicles", SECURE Project, 2000.
Fletcher, "CMOS light-sensor process makes possible low-cost smart machine-vision systems" Penton Media, Inc. et al., 1993.
Forsyth, "A System for Finding Changes in Colour", Oxford University, Jul. 23, 1987.
Fossum, "Active Pixel Sensors: Are CCD's dinosaurs?" Proceedings of SPIE, Charge-Coupled Devices and Solid-State Optical Sensors III, vol. 1900, 1993.
Fossum, "CMOS Active Pixel Sensor (APS) Technology for Multimedia Image Capture," 1997 Multimedia Technology & Applications Conference (MTAC97), 1997.
Fossum, "Low power camera-on-a-chip using CMOS active pixel sensor technology", 1995 Symposium on Low Power Electronics, San Jose, CA, Oct. 9-10, 1995.
Fowler et al., "A CMOS Area Image Sensor With Pixel-Level A/D Conversion," Digest of Technical Papers of the 41st Solid-State Circuits Conference (ISSCC), 2001.
Franke et al., "Autonomous driving approaches downtown", IEEE Intelligent Systems, vol. 13, Nr. 6, 1999.
French et al., "A comparison of IVHS progress in the United States, Europe, and Japan", IVHA America, Dec. 31, 1993.
Fujimori, "CMOS Passive Pixel Imager Design Techniques", Massachusetts Institute of Technology, Ph.D. Dissertation for Electrical Engineering and Computer Science, Feb. 2002.
Fung et al., "Effective moving cast shadow detection for monocular color image sequences", The 11th International Conference on Image Analysis and Processing Proceedings, Palermo, Italy, Sep. 26-28, 2001,p. 404-409.
Gat et al., "A Monocular Vision Advance Warning System for the Automotive Aftermarket", Aftermarket SAE World Congress & Exhibition, No. 2005-01-1470. SAE Technical Paper, Jan. 1, 2005.
Gavrila et al., "Real-Time Vision for Intelligent Vehicles" IEEE Instrumentation & Measurement Magazine, Jun. 2001, pp. 22-27.
Gavrila, et al., "Real-time object detection for "smart" vehicles", 1999.
Geary et al., "Passive Optical Lane Position Monitor" Idea Project Final Report Contract ITS-24, Jan. 15, 1996.
Gehrig, "Design, simulation, and implementation of a vision-based vehicle-following system" Doctoral Dissertation, Jul. 31, 2000.
GEM Muon Review Meeting--SSCL Abstract; GEM TN-03-433, Jun. 30, 1993.
Goesch et al., "The First Head Up Display Introduced by General Motors", SAE Paper No. 890288, published Feb. 1, 1989.
Goldbeck et al., "Lane detection and tracking by video sensors" Intelligent Transportation Systems, 1999. Proc., Oct. 5-8, 1999.
Graefe et al., "Dynamic Vision for Precise Depth Measurement and Robot Control", Computer Vision for Industry, Jun. 1993.
Graefe, "Vision for Intelligent Road Vehicles", Universitat de Bundeswehr Muchen, 1993, pp. 135-140.
Greene et al., "Creating Raster Omnimax Images from Multiple Perspective Views Using the Elliptical Weighted Average Filter", IEEE Computer Graphics and Applications, vol. 6, No. 6, pp. 21-27, Jun. 1986.
Gruss et al., "Integrated sensor and range-finding analog signal processor", IEEE Journal of Solid-State Circuits, vol. 26, No. 3, Mar. 1991.
Gumkowski et al., "Reconfigurable Automotive Display System", SAE Paper No. 930456 to Gumkowski, published Mar. 1, 1993.
Hall, "Why I Dislike auto-Dimming Rearview Mirrors," accessed at http://blog.consumerguide.com/why-i-dislike-autodimming-rearview-mirrors/-, Dec. 21, 2012.

(56) References Cited

OTHER PUBLICATIONS

Hamit, "360-Degree Interactivity: New Video and Still Cameras Provide a Global Roaming Viewpoint", Advanced Imaging, Mar. 1997, p. 50.
Haritaoglu et al., "W4: Real-Time Surveillance of People and Their Activities", IEEE Transactions Patter Analysis and Machine Intelligence, vol. 22, No. 8, Aug. 2000.
Hebert et al., "3-D Vision Techniques for Autonomous Vehicles", Defense Advanced Research Projects Agency, Carnegie Mellon University, Feb. 1, 1988.
Hebert et al., "Local Perception for Mobile Robot Navigation in Natural Terrain: Two Approaches", The Robotics Institute, Carnegie Mellon University, Abstract; Workshop on Computer Vision for Space Applications, Antibes, Sep. 22, 24, 1993, pp. 24-31.
Hebert, "Intelligent unmanned ground vehicles: autonomous navigation research", Carnegie Mellon (Kluwer Academic Publishers), Boston, 1997, Excerpt.
Herbert et al., "3-D Vision Techniques for Autonomous Vehicles", Technical Report, Carnegie Mellon University, Aug. 1988.
Hess et al., "A Control Theoretic Model of Driver Steering Behavior," IEEE Control Systems Magazine, vol. 10, No. 5, Aug. 1990, pp. 3-8.
Shashua et al., "Join Tensors: on 3D-to-3D Alignment of Dynamic Sets", International Conference on Pattern Recognition (ICPR), Jan. 2000, Barcelona, Spain, pp. 99-102.
Shashua et al., "Kernel Feature Selection with Side Data using a Spectral Approach", Proc. of the European Conference on Computer Vision (ECCV), May 2004, Prague, Czech Republic.
Shashua et al., "Kernel Principal Angles for Classification Machines with Applications to Image Sequence Interpretation", IEEE Conference on Computer Vision and Pattern Recognition (CVPR), Jun. 2003, Madison.
Shashua et al., "Latent Model Clustering and Applications to Visual Recognition", International Conference on Computer Vision (ICCV), Rio, Brazil, Oct. 2007.
Shashua et al., "Learning over Sets using Kernel Principal Angles", Journal of Machine Learning Research, 2003, pp. 913-931.
Shashua et al., "Linear Image Coding for Regression and Classification using the Tensor-rank Principle", IEEE Conference on Computer Vision and Pattern Recognition (CVPR), Dec. 2001, Hawaii, pp. 42-49, Abstract.
Shashua et al., "Manifold Pursuit: A New Approach to Appearance Based Recognition", International Conference on Pattern Recognition (ICPR), Aug. 2002, Quebec, Canada.
Shashua et al., "Multi-frame Infinitesimal Motion Model for the Reconstruction of (Dynamic) Scenes with Multiple Linearly Moving Objects", International Conference on Computer Vision (ICCV), Jul. 2001,, Vancouver, Canada, pp. 592-599.
Shashua et al., "Multiple View Geometry of Non-planar Algebraic Curves", International Conference on Computer Vision (ICCV), Vancouver, Canada, Jul. 2001, pp. 181-189.
Shashua et al., "Structural Saliency: the Detection of Globally Salient Structures Using a Locally Connected Network", International Conference on Computer Vision (ICCV), Tarpon Springs, Florida, pp. 321-327, Jul. 1988.
Shashua et al., "The Study of 3D-from-2D using Elimination", International Conference on Computer Vision (ICCV), Jun. 1995, Boston, MA, pp. 473-479.
Shashua et al., "Multiple-view Geometry and Photometry, In Recent Progress in Computer Vision", Springer-Verlag, LNCS series, Invited papers of ACCV'95, Singapore Dec. 1995, 225-240, Abstract.
Shashua et al., "Multiple-view geometry of general algebraic curves", International Journal of Computer Vision (IJCV), 2004.
Shashua et al., "Multi-way Clustering Using Super-symmetric Non-negative Tensor Factorization", Proc. of the European Conference on Computer Vision (ECCV), Graz, Austria, May 2006.
Shashua et al., "Nonnegative Sparse PCA", Advances in Neural Information Processing Systems (NIPS), Vancouver, Canada, Dec. 2006.
Shashua et al., "Non-Negative Tensor Factorization with Applications to Statistics and Computer Vision", International Conference on Machine Learning (ICML), Bonn, Germany, Aug. 2005.
Shashua et al., "Norm-Product Belief Propagation: Primal-Dual Message-Passing for Approximate Inference", IEEE Trans. on Information Theory, Jun. 28, 2010.
Shashua et al., "Novel View Synthesis in Tensor Space", IEEE Conference on Computer Vision and Pattern Recognition (CVPR), Jun. 1997, pp. 1034-1040.
Shashua et al., "Off-road Path Following using Region Classification and Geometric Projection Constraints", IEEE Conference on Computer Vision and Pattern Recognition (CVPR), Jun. 2006, NY.
Shashua et al., "Omni-Rig Sensors: What Can be Done With a Non-Rigid Vision Platform?", Workshop on Applications of Computer Vision (W ACV), pp. 174-179, Princeton, Oct. 1998, pp. 174-179.
Shashua et al., "Omni-rig: Linear Self-recalibration of a Rig with Varying Internal and External Parameters," International Conference on Computer Vision (ICCV), Jul. 2001, Vancouver, Canada, pp. 135-141.
Shashua et al., "On calibration and reconstruction from planar curves", European Conference on Computer Vision (ECCV), pp. 256-270, Jun. 2000, Dublin, Ireland, pp. 256-270.
Shashua et al., "On Geometric and Algebraic Aspects of 3D Affine and Projective Structures from Perspective 2D Views", In Applications of Invariance in Computer Vision, Springer-Verlag LNCS No. 825, 1994, 127-143.
Shashua et al., "On Photometric Issues in 3D Visual Recognition from a Single 2D Image", International Journal of Computer Vision (IJCV), 21(1/2), 1997 pp. 99-122.
Shashua et al., "On Projection Matrices $P.\sup.k - P.\sup.2$, k=3, 6, and their Applications in Computer Vision", International Journal of Computer Vision (IJCV), 2002, pp. 53-67.
Shashua et al., "On the Reprojection of 3D and 2D Scenes Without Explicit Model Selection", European Conference on Computer Vision (ECCV), Jun. 2000, Dublin, Ireland, pp. 468-482.
Shashua et al., "On the Structure and Properties of the Quadrifocal Tensor", European Conference on Computer Vision (ECCV), Jun. 2000, Dublin, Ireland, pp. 354-368.
Shashua et al., "On the Synthesis of Dynamic Scenes from Reference Views", IEEE Conference on Computer Vision and Pattern Recognition (CVPR), Jun. 2000, pp. 133-139.
Shashua et al., "pLSA for Sparse Arrays With Tsallis Pseudo-Additive, Divergence: Noise Robustness and Algorithm", International Conference on Computer Vision (ICCV), Rio, Brazil, Oct. 2007.
Shashua et al., "Principal Component Analysis Over Continuous Subspaces and Intersection of Half-spaces", European Conference on Computer Vision (ECCV), May 2002, Copenhagen, Denmark, pp. 133-147.
Shashua et al., "Probabilistic Graph and Hypergraph Matching", Conf. on Computer Vision and Pattern Recognition (CVPR), Jun. 2008, Anchorage, Alaska.
Shashua et al., "Projective Structure from Uncalibrated Images: Structure from Motion and Recognition", IEEE Transactions on Pattern Analysis and Machine Intelligence (P AMI), (vol. 16(8), 1994, pp. 778-790.
Shashua et al., "Q-warping: Direct Computation of Quadratic Reference Surfaces", IEEE Transactions on Pattern Analysis and Machine Intelligence (P AMI), vol. 23(8), 2001, pp. 920-925.
Shashua et al., "Relative Affine Structure: Canonical Model for 3D from 2D Geometry and Applications," IEEE, Transactions on Pattern Analysis and Machine Intelligence (P AMI) vol. 18(9), pp. 873-883, Jun. 1994.
Shashua et al., "Relative Affine Structure: Theory and Application for 3D Reconstruction From Perspective Views," IEEE Conference on Computer Vision and Pattern Recognition (CVPR), Seattle, Washington, pp. 483-489, Jun. 1994.
Shashua et al., "Revisiting Single-view Shape Tensors: Theory and Applications," EP Conference on Computer Vision (ECCV), Copenhagen, DK, pp. 256-270, May 2002.

(56) References Cited

OTHER PUBLICATIONS

Shashua et al., "Robust Recovery of Camera Rotation from Three Frames," IEEE Conference on Computer Vision and Pattern Recognition (CVPR), San Francisco, CA, pp. 796-802, Jun. 1996.
Shashua et al., "Shape Tensors for Efficient and Learnable Indexing", Proceedings of the workshop on Scene Representations, Jun. 1995, Cambridge, MA, pp. 58-65.
Shashua et al., "ShareBoost: Efficient Multiclass Learning with Feature Sharing, Neural Information and Processing Systems (NIPS)", Dec. 2011.
Shashua et al., "Sparse Image Coding using a 3D Non-negative Tensor Factorization", International Conference on Computer Vision (ICCV), Beijing, China, Oct. 2005.
Shashua et al., "Taxonomy of Large Margin Principle Algorithms for Ordinal Regression Problems", Advances in Neural Information Processing Systems (NIPS), Vancouver, Canada, Dec. 2002.
Shashua et al., "Tensor Embedding of the Fundamental Matrix", Kluwer Academic Publishers, Boston, MA, 1998.
Shashua et al., "The Quadric Reference Surface: Applications in Registering Views of Complex 3D Objects", European Conference on Computer Vision (ECCV), May 1994, Stockholm, Sweden, pp. 407-416.
Shashua et al., "The Quadric Reference Surface: Theory and Applications", 1994.
Shashua et al., "The Rank 4 Constraint in Multiple (.gtoreq.3) View Geometry", European Conference on Computer Vision (ECCV), Apr. 1996, Cambridge, United Kingdom, pp. 196-206.
Shashua et al., "The Semi-Explicit Shape Model for Multi-object Detection and Classification", Proc. of the European Conference on Computer Vision (ECCV), Crete, Greece, pp. 336-349, Sep. 2010.
Shashua et al., "Threading Fundamental Matrices", IEEE Transactions on Pattern Analysis and Machine Intelligence (PAMI), vol. 23(1), Jan. 2001, pp. 73-77.
Shashua et al., "Threading Kernel functions: on Bridging the Gap between Representations and Algorithms", Advances in Neural Information Processing Systems (NIPS), Vancouver, Canada, Dec. 2004.
Shashua et al., "Time-varying Shape Tensors for Scenes with Multiply Moving Points", IEEE Conference on Computer Vision and Pattern, pp. 623-630, Dec. 2001, Hawaii.
Shashua et al., "Trajectory Triangulation over Conic Sections", International Conference on Computer Vision (ICCV), Greece, 1999, pp. 330-337.
Lasky et al., "Automated Highway Systems (AHS) Classification by Vehicle and Infrastructure", AHMT Research Report, Jan. 25, 1994.
Leachtenauer, "Resolution requirements and the Johnson criteria revisited," Proceedings of SPIE, Infrared Imaging Systems: Design, Analysis, Modeling and Testing XIV, vol. 5076, 2003.
LeBlanc et al., "CAPC: A Road-Departure Prevention System", IEEE, Dec. 1996, pp. 61-71.
Lee et al., "Automatic recognition of a car license plate using color image processing", IEEE, Nov. 16, 1994.
Lee, "How to Select a Heat Sink", Electronics Cooling Magazine, Jun. 1, 1995.
Leen et al., "Digital networks in the automotive vehicle", Dec. 1999.
Lezin, "Video Gear In Police Cruisers Gets Mixed Reviews Critics Say It Violates Privacy Rights and Inhibits Officers From Doing Their Jobs Well", Mar. 17, 1997.
Linkwitz, "High Precision Navigation: Integration of Navigational and Geodetic Methods," Springer-Verlag, Jul. 5, 1989, Excerpt.
Lisowski et al., "Specification of a small electric vehicle: modular and distributed approach," IEEE 1997, pp. 919-924.
Litkouhi et al., "Estimator and Controller Design for LaneTrak, a Vision-Based Automatic Vehicle Steering System," Proceedings of the 32nd Conference on Decision and Control, San Antonio, Texas, Dec. 1993, pp. 1868-1873.
Litwiller, "CCD vs. CMOS: Facts and Fiction," Photonics Spectra, Jan. 2001.
Liu Xianghong, "Development of a vision-based object detection and recognition system for intelligent vehicle", 2000.
Lockwood, "Design of an obstacle avoidance system for automated guided vehicles", Doctoral thesis, University of Huddersfield, Oct. 1991.
Lowenau et al., "Adaptive light control a new light concept controlled by vehicle dynamics and navigation", SAE Technical Paper Series, Feb. 23-26, 1998.
Lu et al., "On-chip Automatic Exposure Control Technique, Solid-State Circuits Conference", ESSCIRC '91. Proceedings-17th European (vol. 1) Abst. Sep. 11-13, 1991.
Lucas Demonstrates Intelligent Cruise Control, Detroit Feb. 27, 1995 available at; http://www.thefreelibrary.com/LUCAS+DEMONSTRATES+INTELLIGENT+CUISE+CONTROL=a016602459.
Luebbers et al., "Video-image-based neural network guidance system with adaptive view-angles for autonomous vehicles", Applications of Artificial Neural Networks II. International Society for Optics and Photonics, 1991, Abstract.
Lumia, "Mobile system for measuring retroreflectance of traffic signs", Optics, Illumination, and Image Sensing for Machine Vision, Mar. 1, 1991, Abstract.
Mackey et al., "Digital Eye-Witness Systems", Transportation Recording: 2000 and Beyond, May 3-5, 1999, 271-284.
Malik et al., "A Machine Vision Based System for Guiding Lane-change Maneuvers", California Path Program, Institute of Transportation Studies, University of California, Berkeley, Sep. 1995.
Manigel et al., "Computer control of an autonomous road vehicle by computer vision" —Industrial Electronics, Control and Instrumentation, Proceedings. IECON '91, 1991 International Conference on, p. 19-24 vol. 1, 1991.
Manigel et al., "Vehicle control by computer vision," Industrial Electronics, IEEE Transactions on, vol. 39, Issue 3, 181-188, Jun. 1992.
Martel-Brisson et al., "Moving cast shadow detection from a Gaussian mixture shadow model", Proceeding of IEEE Computer Society Conference on Computer Vision and Pattern Recognition, vol. 2, 2005.
Masaki, "Vision-based vehicle guidance", Industrial Electronics, Control, Instrumentation, and Automation, 1992. Power Electronics and Motion Control, Proceedings of the 1992 International Conference on. IEEE, 1992.
Mason et al., "The Golem Group I UCLA Autonomous Ground Vehicle in the DARPA Grand Challenge", Jun. 12, 2006.
Matthews, "Visual Collision Avoidance," Oct. 1994, University of Southampton, PhD submission.
Maurer, et al., "VaMoRs-P: an advanced platform for visual autonomous road vehicle guidance", 1995.
Maurer, "Flexible Automatisierung von StraBenfahrzeugen mit Rechnersehen" Universitat der Buneswehr Milnchen Dissertation, Jul. 27, 2000.
MC68331 User's Manual, Freescale Semiconductor, Inc., 1994.
McKenna et al., "Tracking Groups of People", Computer Vision and Image Understanding, vol. 80, p. 42-56, 2000.
McTamaney, "Mobile Robots Real-Time Intelligent Control", FMC Corporation, Winter 1987.
Mei Chen et al., "AURORA: A Vision-Based Roadway Departure Warning System, The Robotics Institute", Carnegie Mellon University, published, Aug. 5-9, 1995.
Mendis et al., "A 128.times.128 CMOS active pixel image sensor for highly integrated imaging systems", Dec. 8, 1993.
Mendis et al., "CMOS Active Pixel Image Sensor," IEEE Transactions on Electron Devices, vol. 41, No. 3, Mar. 1994.
Metzler, "Computer Vision Applied to Vehicle Operation", Paper from Society of Automotive Engineers, Inc., 1988.
Mikic et al., "Moving shadow and object detection in traffic scenes", Proceeding of IEEE International Conference on Pattern Recognition, vol. 1, 2000.
Miller, "Evaluation of vision systems for teleoperated land vehicles," IEEE Control Systems Magazine, Jun. 28, 1988.
Mimuro et al., "Functions and Devices of Mitsubishi Active Safety ASV" Proceedings of the 1996 IEEE Intelligent Vehicles Symposium, Sep. 19-20, 1996, Abstract.

(56) References Cited

OTHER PUBLICATIONS

Mironer et al., "Examination of Single Vehicle Roadway Departure Crashes and Potential IVHS Countermeasures," U.S. Department of Transportation, Aug. 1994.
Miura et al., "Towards Vision-Based Intelligent Navigator: Its Concept and Prototype", IEEE Transactions on Intelligent Transportation Systems, Jun. 2002.
Miura et al., "Towards intelligent navigator that can provide timely advice on safe and efficient driving" Intelligent Transportation Systems Proceedings, Oct. 5-8, 1999, pp. 981-986.
Mobileye N.V. Introduces EyeQ.TM. Vision System-On-A-Chip High Performance, Low Cost Breakthrough for Driver Assistance Systems, Detroit, Michigan, Mar. 8, 2004.
Moini, "Vision Chips or Seeing Silicon," Third Revision, Mar. 1997.
Moravec, "Obstacle Avoidance and Navigation in the Real World by a Seeing Robot Rover", Computer Science Department, Stanford University, Ph.D. Thesis, Sep. 1980.
Morgan et al., "Road edge tracking for robot road following: a real-time implementation," vol. 8, No. 3, Aug. 1990.
Mori et al., "Shadow and Rhythm as Sign patterns of Obstacle Detection", Industrial Electronics, 1993. Conference Proceedings, ISIE'93-Budapest, IEEE International Symposium on. IEEE, 1993, Abstract.
Morris, "E-Z-Pass and transmit using electronic toll tags for traffic monitoring" National Traffic Data Acquisition Conference, PDF pp. 54-63, 1996, 289-298, Abstract.
Motorola Installation Guide, MVE162, Embedded Controller.
Muirhead, "Developments in CMOS Camera Technology," The Institution of Electrical Engineers, Dec. 5, 1994.
Nadimi et al., "Physical models for moving shadow and object detection in video", IEEE Transactions on Pattern Analysis and Machine Intelligence, vol. 26, No. 8, Aug. 2004.
Thomanek et al., "Multiple object recognition and scene interpretation for autonomous road vehicle guidance" Oct. 1994.
Thomas, "Real-time vision guided navigation", Engineering Applications of Artificial Intelligence, Jan. 31, 1991, Abstract.
Thongkamwitoon et al., "An adaptive real-time background subtraction and moving shadows detection", Proceeding of IEEE International Conference on Multimedia and Expo. vol. 2, 2004.
Thorpe et al., "Perception for Outdoor Navigation First Year Report", Defense Advanced Research Projects Agency, Carnegie Mellong University, Dec. 31, 1990.
Thorpe, "Vision and Navigation for the Carnegie-Mellon Navlab", IEEE Transactions on Pattern Analysis and Machine Intelligence, vol. 10, No. 3, May 1998.
Thorpe, "1988 Year End Report for Road Following at Carnegie Mellon", Carnegie Mellon University, May 31, 1989.
Thorpe et al., "Toward autonomous driving: the CMU Navlab. I. Perception", IEEE Paper, Aug. 1991.
Thorpe et al., "The 1997 Automated Highway Free Agent Demonstration", 1997 pp. 496-501, 1997.
Tokimaru et al., "CMOS Rear-View TV System with CCD Camera", National Technical Report vol. 34, No. 3, pp. 329-336, Jun. 1988 (Japan).
Toth et al., "Detection of moving shadows using mean shift clustering and a significance test", Proceeding of IEEE International Conference on Pattern Recognition, vol. 4, 2004.
Toyota Motor Corporation, "Present and future of safety technology development at Toyota." 2004.
Trainor et al., "Architectural Synthesis of Digital Signal Processing Algorithms Using 'IRIS'", Journal of VLSI Signal Processing Systems for Signal, Image and Video Technology, vol. 16, No. 1, 1997.
Tremblay et al., "High resolution smart image sensor with integrated parallel analog processing for multiresolution edge extraction", Robotics and Autonomous Systems 11, pp. 231-242, with abstract, 1993.
Tribe et al., "Collision Avoidance," Advances, Issue No. 4, May 1990.
Tribe et al., "Collision Avoidance," Lucas International Symposium, Paris, France, 1989.
Tribe et al., "Collision Warning," Autotech '93, Seminar 9, NEC Birmingham, UK, Nov. 1993.
Tribe, "Intelligent Autonomous Systems for Cars, Advanced Robotics and; Intelligent Machines," Peter Peregrinus, Nov. 1994.
Trivdei et al., "Distributed Video Networks for Incident Detection and Management", Computer Vision and Robotics Research Laboratory, 2000.
Tsugawa et al., "An automobile with artificial intelligence," in Proc. Sixth IJCAI, 1979.
Tsugawa et al., "Vision-based vehicle in japan; machine vision systems and driving control systems", IEEE Transactions on Industrial Electronics, vol. 41, No. 4, Aug. 1994.
Tsutsumi et al., "Vehicle Distance Interval Control Technology" Mitsubishi Electric Advance, Technical Reports, vol. 78, pp. 10-12, Mar. 1997.
Turk et al., "VITS—A Vision System for Autonomous Land Vehicle Navigation," IEEE Transactions on Pattern Analysis and Machine Intelligence, vol. 10, No. 3, May 3, 1988.
Tzomakas and von Seelen, "Vehicle Detection in Traffic Scenes Using Shadows," Internal report, Institut Fur Neuroinformatik Bochum, Internal Report 98-06.
Ulmer, "VITA II—active collision avoidance in real traffic" Proceedings of the Intelligent Vehicles '94 Symposium, Oct. 24-26, 1994, Abstract.
Valeo Infos News, "Valeo's revolutionary Lane Departure Warning System makes debut on Nissan Infiniti vehicles", 04.08 found at http://www.valeo.com/cwscontent/www.valeo.com/medias/fichiers/journaliste- s/en/CP/ldws_uk.pdf, Mar. 31, 2004.
Van Leeuwen et al., "Motion Estimation with a Mobile Camera for Traffic Applications", IEEE, US, vol. 1, pp. 58-63, Oct. 3, 2000.
Van Leeuwen et al., "Motion Interpretation for In-Car Vision Systems", IEEE, US, vol. 1, , p. 135-140, Sep. 30, 2002.
Van Leeuwen et al., "Real-Time Vehicle Trackin in Image Sequences", IEEE, US, vol. 3, pp. 2049-2054, XP010547308, May 21, 2001.
Van Leeuwen et al., "Requirements for Motion Estimation in Image Sequences for Traffic Applications", IEEE, pp. 354-359, XP002529773, 2000.
Van Leeuwen et al., "Requirements for Motion Estimation in Image Sequences for Traffic Applications", IEEE, US, vol. 1, 145-150, XP010340272, May 24, 1999.
Vellacott, "CMOS in Camera," IEE Review, pp. 111-114, May 1994.
Vlacic et al., "Intelligent Vehicle Technologies, Theory and Applications", Society of Automotive Engineers Inc., edited by SAE International, 2001.
Vosselman et al., "Road traceing by profile matching and Kalman filtering", Faculty of Geodetic Engineering, 1995.
Wallace et al., "Progress in Robot Road-Following," Proceedings of the 1986 IEEE International Conference on Robotics and Automation, vol. 3, pp. 1615-1621, 1986.
Wan et al., "A New Edge Detector for Obstacle Detection with a Linear Stereo Vision System", Proceedings of the Intelligent Vehicles '95 Symposium, Abstract.
Wang et al., "CMOS Video Cameras", article, 4 pages, University of Edinburgh, UK, 1991.
Wang et al., "A probabilistic method for foreground and shadow segmentation", Proceeding of IEEE International Conference on Image Processing, Pattern Recognition, vol. 3, Oct. 2, 2003.
Wang, "Camera Calibration by Vanishing Lines for 3-D Computer Vision", IEEE Transactions on Pattern Analysis and Machine Intelligence, vol. 13, No. 4, Apr. 15, 1991.
Watec WAT-660D data sheet, found at http://www.wateccameras.com/products.php?prod_id=214.
Web page at http://www.glassrack.net/potrsp1919192.html?utm_source=googlepepla&utm_me-dium=adwords&id=116297830341.
Webpage: http://parts.royaloakschevy.com/showAssembly.aspx?makeName=pontiac&modelYear=1990&modelName=trans-sport&ukey_assembly=5888560&ukey_category=53643&assembly=921201mu10-009mu10-009.

(56) References Cited

OTHER PUBLICATIONS

Weisser et al., "Autonomous driving on vehicle test tracks: Overview, implementation and vehicle diagnosis" Intelligent Transportation Systems, pp. 62-67, Oct. 5-8, 1999, Abstract.
Wierwille et al., "Research on Vehicle-Based Driver Status/Performance Monitoring, Part III" Final Report, Sep. 1996.
Wilson, "Technology: A little camera with big ideas—The latest smart vision system," Financial Times, Jun. 17, 1993.
Wolberg, Digital Image Warping, IEEE Computer Society Press, 1990.
Wolberg, "A Two-Pass Mesh Warping Implementation of Morphing," Dr. Dobb's Journal, No. 202, Jul. 1993.
Wordenweber, "Driver assistance through lighting." ESV: 17th International Technical Conference on the Enhanced Safety of Vehicles. Report. No. 476. 2001.
Wright, "Take your hands off that car!", Edn. vol. 42, No. 26, Dec. 18, 1997, Abstract.
Wuller et al., "The usage of digital cameras as luminance meters", Proc. SPIE 6502, Digital Photography III, 65020U, Feb. 20, 2007; doi:1031117/12.703205.
Wyatt et al., "Analog VLSI systems for Image Acquisition and Fast Early Vision Processing", International Journal of Computer Vision, 8:3, pp. 217-223, 1992.
Shashua et al., "Trajectory Triangulation: 3D Reconstruction of Moving Points from a Monocular Image Sequence", IEEE Transactions on Pattern Analysis and Machine Intelligence (PAMI), vol. 22(4), 2000, pp. 348-357.
Shashua et al., "Trilinear Tensor: The Fundamental Construct of Multiple-view Geometry and its Applications", International Workshop on Algebraic Frames for the Perception Action Cycle (AFPAC97), Kiel Germany, Sep. 8-9, 1997. Proceedings appeared inSpringer-Verlag, LNCS series, 1997, 190-206.
Shashua et al., "Trilinearity in Visual Recognition by Alignment", European Conference on Computer Vision (ECCV), May 1994, Stockholm, Sweden, pp. 479-484.
Shashua et al., "Projective Depth: A Geometric Invariant for 3D Reconstruction From Two Perspective/Orthographic Views and for Visual Recognition," International Conference on Computer Vision (ICCV), May 1993, Berlin, Germany, pp. 583-590.
Shashua et al., "The Quotient Image: Class Based Recognition and Synthesis Under Varying Illumination Conditions", IEEE Conference on Computer Vision and Pattern Recognition (CVPR), Jun. 1999, pp. 566-573.
Shashua et al., "The Quotient Image: Class Based Re-rendering and Recognition With Varying Illuminations", IEEE Transactions on Pattern Analysis and Machine Intelligence (PAMI), vol. 23(2), 2001, pp. 129-139.
Shashua et al., "Pedestrian Detection for Driving Assistance, Systems: Single-Frame Classification and System Level, Performance", IEEE Intelligent Vehicles Symposium, Jan. 1, 2004.
Shashua, "On the Relationship Between the Support Vector Machine for classification and Sparsified Fisher's Linear Discriminant," Neural Processing Letters, 1999, 9(2): 129-139.
Shimizu et al., "A moving image processing system for personal vehicle system", Nov. 9, 1992, Abstract.
Shirai, "Robot Vision", Future Generation Computer Systems, 1985.
Shladover et al., "Automatic Vehicle Control Developments in the PATH Program," IEEE Transaction on Vehicular Technology, vol. 40, No. 1, Feb. 1991, pp. 114-130.
Shladover, "Research and Development Needs for Advanced Vehicle Control Systems," Micro, IEEE, vol. 13, No. 1, Feb. 1993, pp. 11-19.
Shladover, "Highway Electrification and Automation," California Partners for Advanced Transit and Highways (PATH), Jan. 1, 1992.
Siala et al., "Moving shadow detection with support vector domain description in the color ratios space", Proceeding of IEEE International Conference on Pattern Recognition, vol. 4, 2004.
Siegle, "Autonomous Driving on a Road Network," Proceedings of the Intelligent Vehicles '92 Symposium Detroit, Michigan, ISBN 0-7803-0747-X; Jun. 29-Jul. 1, 1992.
Smith et al., "An Automotive Instrument Panel Employing Liquid Crystal Displays", SAE Paper No. 770274, published Feb. 1, 1977.
Smith et al., "Optical sensors for automotive applications", May 11, 1992.
Smith et al., "Vision sensing for intelligent vehicle and highway systems", Proceedings of the 1994 IEEE International Conference on Multisensor Fusion and Integration for Intelligent Systems, Las Vegas, NV, Oct. 5, 1994.
Soatto et al., "The Golem Group/University of California at Los Angeles Autonomous Ground Vehicle in the DARPA Grand Challenge", Journal of Field Robotics 23(8), 2006, pp. 527-553.
Solder et al., "Visual Detection of Distant Objects", Intelligent Robots and Systems' 93, IROS'93. Proceedings of the 1993 IEEE/RSJ International Conference on vol. 2. IEEE, 1993, Abstract.
Sole et al., "Solid or not solid: vision for radar target validation", IEEE Intelligent Vehicles Symposium, 2004.
Sony Operating Manual CCD Color Video Camera Model: DXC-151A, 1993.
Sony Specifications Single Chip CCD Color Video Camera DXC-151A.
Sparks et al., "Multi-Sensor Modules with Data Bus Communication Capability" SAE Technical Paper 1999-01-1277, Mar. 1, 1999, doi: 10.4271/1999-01-1277, http://papers.sae.org/1999-01-1277/, Abstract.
Sridhar, "Multirate and event-driven Kalman filters for helicopter flight", IEEE Control Systems, Aug. 15, 1993.
Standard J2284/3, "High-Speed CAN (HSC) for Vehicle Applications at 500 Kbps," issued May 30, 2001.
Stauder et al., "Detection of moving cast shadows for object segmentation", IEEE Transactions on Multimedia, vol. 1, No. 1, Mar. 1999.
Stein et al., "A Computer Vision System on a Chip: a case study from the automotive domain", IEEE Computer Society Conference on Computer Vision and Pattern Recognition, 2005.
Stein et al., "Challenges and solutions for Bundling Multiple DAS Applications on a Single Hardware Platform", Procs. VISION 2008.
Stein et al., "Direct Methods for Estimation of Structure and Motion from three views", A.I. Memo No. 1594, MA Inst. of Tech., Nov. 1996.
Stein et al., "Internal Camera Calibration using Rotation and Geometric Shapes", Submitted to the Dept. of Electrical Engineering and Computer Science at MA Inst. of Tech., Masters Thesis, M.I.T., Feb. 1993.
Stein et al., "Model-based brightness constraints: on direct estimation of structure and motion," IEEE Transactions on Pattern Analysis and Machine Intelligence, vol. 22, Issue 9, Sep. 2000.
Stein et al., "Stereo-assist: Top-down stereo for driver assistance systems", IEEE Intelligent Vehicles Symposium, 2010.
Stein et al., "Vision-based ACC with a single camera: bounds on range and range rate accuracy", IEEE Intelligent Vehicles Symposium, 2003.
Stein et al., "A robust method for computing vehicle ego-motion", Proceedings of the IEEE Intelligent Vehicles Symposium, 2000.
Stein, "Accurate Internal Camera Calibration using Rotation, with Analysis of Sources of Error", Computer Vision, Proceedings Fifth International Conference on. IEEE, 1995.
Stein, "Geometric and photometric constraints: motion and structure from three views", Mass. Inst. of Tech., Doctoral Dissertation, 1998.
Stein, "Lens Distortion Calibration Using Point Correspondences", A.I. Memo No. 1595, M.I.T. Artificial Intelligence Laboratory, Nov. 1996.
Stein, "Tracking from multiple view points: Self-calibration of space and time", IEEE Computer Society Conference on Computer Vision and Pattern Recognition, Jun. 1999.
Stein et al., "Monitoring Activities from Multiple Video Streams: Establishing a Common Coordinate Frame," A.I. Memo No. 1655, M.I.T. Artificial Intelligence Laboratory, Apr. 1999.

(56) References Cited

OTHER PUBLICATIONS

Steiner et al., "Future applications or microsystem technologies in automotive safety systems" Advanced Microsystems for Automotive Applications '98, 1998, pp. 21-42.
Stengel et al., "Intelligent Guidance for Headway and Lane Control", Princeton University, Department of Mechanical and Aerospace Engineering, New Jersey, 1989.
Stickford, "Candid cameras come to Park", Grosse Pointe News, Mar. 7, 1996.
Stiller et al., "Multisensor obstacle detection and tracking", Image and Vision Computing 18, Elsevier, 2000, pp. 389-396.
Sukthankar, "RACCOON: a Real-time Autonomous Car Chaser Operating Optimally at Night", Oct. 1992.
Sun et al., "On-road vehicle detection using optical sensors: a review", 2004.
Sun et al., "A Real-time Precrash Vehicle Detection System", 2002.
Szeliski, Image Mosaicing for Tele-Reality Applications, DEC Cambridge Research Laboratory, CRL 94/2, May 1994.
Taktak et al., "Vehicle detection at night using image processing and pattern recognition", Centre de Recherche en Automatique de Nancy, 1994.
Taylor, "CCD and CMOS Imaging Array Technologies: Technology Review," Xerox Research Centre Europe, Technical Report EPC-1998-106, 1998.
Ran et al., "Development of Vision-based Vehicle Detection and Recognition System for Intelligent Vehicles", Department of Civil and Environmental Engineering, University of Wisconsin at Madison, 1999 TRB Annual Meeting, Nov. 16, 1998.
Raphael et al., "Development of a Camera-Based Forward Collision Alert System", SAE International, Apr. 12, 2011.
Rayner et al., "I-Witness Black Box Recorder" Intelligent Transportation Systems Program, Final Report for ITS-IDEA Project 84, Nov. 2001.
Redmill, "The OSU Autonomous Vehicle", 1997.
Regensburger et al., "Visual Recognition of Obstacles on Roads", Intelligent Robots and Systems, Elsevier, 1994.
Reichardt, "Kontinuierliche Verhaltenssteuerung eines autonomen Fahrzeugs in dynamischer Umgebung" Universitat Kaisserslautern Dissertation, Transation: Continuous behavior control of an autonomous vehicle in a dynamic environment, Jan. 1996.
Reid, "Vision-based guidance of an agriculture tractor", IEEE Control Systems Magazine, Apr. 30, 1987, Abstract.
Reisman et al., "Crowd Detection in Video Sequences", IEEE, Intelligent Vehicles Symposium, Jan. 1, 2004.
Reexamination Control No. 90/007,519, dated Jun. 9, 2005, Reexamination of U.S. Pat. No. 6,222,447, issued to Schofield et al.
Reexamination Control No. 90/011,478, dated Mar. 28, 2011, Reexamination of U.S. Pat. No. 6,222,447, issued to Schofield et al.
Reexamination Control No. 90/007,520, dated Jun. 9, 2005, Reexamination of U.S. Pat. No. 5,949,331, issued to Schofield et al.
Reexamination Control No. 90/011,477, dated Mar. 14, 2011, Reexamination of U.S. Pat. No. 5,949,331, issued to Schofield et al.
Ritter et al., "Traffic sign recognition using colour information", Math, Computing, Modelling, vol. 22, No. 4-7, pp. 149-161, Oct. 1995.
Ritter, "Traffic Sign Recognition in Color Image Sequences", Institute for Information Technology, 1992, pp. 12-17.
Roberts, "Attentive Visual Tracking and Trajectory Estimation for Dynamic Scene Segmentation", University of Southampton, PhD submission, Dec. 1994.
Rombaut et al., "Dynamic data temporal multisensory fusion in the Prometheus ProLab2 demonstrator", IEEE Paper, 1994.
Ross, "A Practical Stereo Vision System", The Robotics Institute, Carnegie Mellon University, Aug. 25, 1993.
Rowell, "Applying Map Databases to Advanced Navigation and Driver Assistance Systems", The Journal of Navigation 54.03 (2001): 355-363.
Sahli et al., "A Kalman Filter-Based Update Scheme for Road Following," IAPR Workshop on Machine Vision Applications, pp. 5-9, Nov. 12-14, 1996.
Salvador et al., "Cast shadow segmentation using invariant color features", Computer Vision and Image Understanding, vol. 95, 2004.
Sanders, "Speed Racers: Study to monitor driver behavior to determine the role of speed in crashes", Georgia Research Tech News, Aug. 2002.
Sayer et al., "The Effect of Lead-Vehicle Size on Driver Following Behavior", University of Michigan Transportation Research Institute, 2000-15, Jun. 2000.
Schneiderman et al., "Visual Processing for Autonomous Driving," IEEE Workshop on Applications of Computer Vision, Palm Springs, CA, Nov. 30-Dec. 2, 1992.
Schonfeld et al., Compact Hardware Realization for Hough Based Extraction of Line Segments in Image Sequences for Vehicle Guidance, IEEE Paper, 1993, Abstract.
Schumann et al., "An Exploratory Simulator Study on the Use of Active Control Devices in Car Driving," No. IZF-1992-B-2. Institute for Perception RVO-TNO Soesterber (Netherlands), May 1992.
Schwarzinger et al., "Vision-based car-following: detection, tracking, and identification", Jul. 1, 1992.
Scott, "Video Image on a Chip", Popular Science, vol. 237, No. 3, Sep. 1991, pp. 50.
Seelen et al., "Image Processing for Driver Assistance", 1998.
Seger et al., "Vision Assistance in Scenes with Extreme Contrast," IEEE Micro, vol. 13, No. 1, Feb. 1993.
Shafer, "Automation and Calibration for Robot Vision Systems", National Science Foundation, Carnegie Mellon University Research Showcase, May 12, 1988.
Shashua et al., "Two-body Segmentation from Two Perspective Views", IEEE Conference on Computer Vision and Pattern Recognition (CVPR), Hawaii, pp. 263-270, Dec. 2001, Abstract.
Shashua et al., "Direct Estimation of Motion and Extended Scene Structure from a Moving Stereo Rig", IEEE Conference on Computer Vision and Pattern Recognition (CVPR), Jun. 1998, pp. 211-218.
Shashua et al., "Illumination and View Position in 3D Visual Recognition", Advances in Neural Information Processing Systems, Morgan Kauffman Publishers, CA 1992 (Proc. Of NIPS '91), pp. 404-411.
Shashua et al., "Image-Based View Synthesis by Combining Trilinear Tensors and Learning Techniques", ACM Conference on Virtual Reality and Systems (VRST), Sep. 1997, pp. 140-145.
Shashua et al., "Novel View Synthesis by Cascading Trilinear Tensors", IEEE Transactions on Visualization and Computer Graphics, vol. 4, No. 4, Oct.-Dec. 1998.
Shashua et al., "On Degeneracy of Linear Reconstruction from Three Views: Linear Line Complex and Applications", IEEE Transactions on Pattern Analysis and Machine Intelligence (PAMI), vol. 21 (3), 1999, pp. 244-251.
Shashua et al., "3D Reconstruction from Tangent-of-Sight", European Conference on Computer Vision (ECCV), Jun. 2000, Dublin, Ireland, pp. 220-234.
Shashua et al., "A Geometric Invariant for Visual Recognition and 3D Reconstruction From Two Perspective/Orthographic Views", Proceedings of the IEEE 2nd Qualitative Vision Workshop, Jun. 1993, New York, NY, pp. 107-117.
Shashua et al., "A Parallel Decomposition Solver for SVM: Distributed Dual Ascend using Fenchel Duality", Conf. on Computer Vision and Pattern Recognition (CVPR), Jun. 2008, Anchorage, Alaska.
Shashua et al., "A Unifying Approach to Hard and Probabilistic Clustering", International Conference on Computer Vision (ICCV), Beijing, China, Oct. 2005.
Shashua et al., "Affine 3-D Reconstruction from Two Projective Images of Independently Translating Planes", International Conference on Computer Vision (ICCV), Jul. 2001, Vancouver, Canada, pp. 238-244.
Shashua et al., "Algebraic Functions for Recognition", IEEE Transactions on Pattern Analysis and Machine Intelligence (PAMI) vol. 17(8), Jan. 1994 pp. 779-789.
Shashua et al., "Ambiguity from Reconstruction From Images of Six Points", International Conference on Computer Vision (ICCV), Jan. 1998, Bombay India, pp. 703-708.

(56) References Cited

OTHER PUBLICATIONS

Shashua et al., "Convergent Message-Passing Algorithms for reference over General Graphs with Convex Free Energies", Conf. on Uncertainty in AI (UAI), Helsinki, Jul. 2008.
Shashua et al., "Doubly Stochastic Normalization for Spectral Clustering", Advances in Neural Information Processing Systems (NIPS), Vancouver, Canada, Dec. 2006.
Shashua et al., "Duality of multi-point and multi-frame geometry: Fundamental shape matrices and tensors", European Conference on Computer Vision (ECCV), Apr. 1996, Cambridge United Kingdom, pp. 217-227.
Shashua et al., "Dynamic P.sup.n to P.sup.n Alignment", In Handbook of Computational Geometry for Pattern Recognition, Computer Vision. Neuro computing and Robotics. Eduardo Bayro-Corrochano (eds.), Springer-Verlag, 2004.
Shashua et al., "Feature Selection for Unsupervised and Supervised Inference: the Emergence of Sparsity in a Weight-based Approach", Journal of Machine Learning Research (JMLR), 6(11): 1885-1887, 2005, pp. 1885-1887.
Shashua et al., "Grouping Contours by Iterated Pairing Network", Advances in Neural Information Processing Systems 3, (Proc. of NIPS '90), Morgan Kaufmann Publishers, CA, 1991, pp. 335-341.
Shashua et al., "Homography Tensors: On Algebraic Entities That Represent Three Views of Static or Moving Planar Points", European Conference on Computer Vision (ECCV), Jun. 2000, Dublin, Ireland, pp. 163-177.
Hessburg et al., "An Experimental Study on Lateral Control of a Vehicle," California Partners for Advanced Transit and Highways (PATH), Jan. 1, 1991.
Hillebrand et al., "High speed camera system using a CMOS image sensor", IEEE Intelligent Vehicles Symposium., Oct. 3-5, 1999, pp. 656-661, Abstract.
Ho et al., "Automatic spacecraft docking using computer vision-based guidance and control techniques", Journal of Guidance, Control, and Dynamics, vol. 16, No. 2 Mar.-Apr. 1993.
Hock et al., "Intelligent Navigation for Autonomous Robots Using Dynamic Vision", XVIIth ISPRS Congress, pp. 900-915, Aug. 14, 1992.
Holst, "CCD Arrays, Cameras, and Displays", Second Edition, Bellingham, WA: SPIE Optical Engineering Press, 1998 pp. v-xxiii, 7-12, 45-101, and 176-179, excerpts.
Honda Worldwide, "Honda Announces a Full Model Change for the Inspire." Jun. 18, 2003.
Horprasert et al., "A Statistical Approach for Real-Time Robust Background Subtraction and Shadow Detection", Proceeding of IEEE International Conference on Computer vision FRAME- RATE Workshop, 1999.
Hsieh et al., "Shadow elimination for effective moving object detection by Gaussian shadow modeling", Image and Vision Computing, vol. 21, No. 6, 505-516, 2003.
Hsieh et al., "A shadow elimination method for vehicle analysis", Proceeding of IEEE International Conference on Pattern Recognition, vol. 4, 2004.
Hu et al., "Action-based Road Horizontal Shape Recognition", SBA Controle & Automacao, vol. 10, No. 2, May 1999.
Huertgen et al., "Vehicle Environment Sensing by Video Sensors", No. 1999-01- 0932. SAE Technical Paper, 1999, Abstract.
Huijsing, "Integrated smart sensors", Sensors and Actuators A, vol. 30, Issues 1-2, pp. 167-174, Jan. 1992.
Hutber et al., "Multi-sensor multi-target tracking strategies for events that become invisible" BMVC '95 Proc. of the 6th British conference on Machine vision, V2, 1995, pp. 463-472.
IEEE 100—The Authoritative Dictionary of IEEE Standards Terms, 7.sup.th Ed. (2000).
Ientilucci, "Synthetic Simulation and Modeling of Image Intensified CCDs (IICCD)", Master Thesis for Rochester Inst. of Tech., Mar. 31, 2000.
Ishida et al., "Development of a Driver Assistance System", No. 2003-01-0279. SAE Technical Paper, 2002, Abstract.

Ishihara et al., "Interline CCD Image Sensor with an Anti Blooming Structure," IEEE International Solid-State Circuits Conference, Session XIII: Optoelectronic Circuits, THPM 13.6, Feb. 11, 1982.
Ishikawa et al., "Visual Navigation of an Autonomous Vehicle Using White Line Recognition", IEEE Transactions on Pattern Analysis and Machine Intelligence, 1988, Abst.
Jaguar Press Releases Autumn 1991 "Jaguar Displays 21st Century Car Technologies", Jaguar Communications & Public Affairs Dept.
Janssen et al., "Hybrid Approach for Traffic Sign Recognition", Program for a European Traffic with Highest Efficiency and Unprecendented Safety, Nov. 28, 1993.
Japanese Article "Television Image Engineering Handbook, The Institute of Television Engineers of Japan", Jan. 17, 1981.
Jochem et al., "PANS: a portable navigation platform", 1995 IEEE Symposium on Intelligent Vehicles, Detroit, MI, Sep. 25-26, 1995.
Jochem et al., "Life in the Fast Lane", AI Magazine, vol. 17, No. 2, pp. 11-50, Summer 1996.
Johannes, "A New Microchip Ushers in Cheaper Digital Cameras", The Wall Street Journal, Aug. 21, 1998, p. B1.
Johnson, "Georgia State Patrol's In-Car Video System", Council of State Governments, 1992, Abstract.
Juberts et al., "Development and Test Results for a Vision-Based Approach to AVCS." in Proceedings of the 26th International Symposium on Automotive Technology and Automation, Aachen, Germany, Sep. 1993, pp. 1-9.
Kakinami et al., "Autonomous Vehicle Control System Using an Image Processing Sensor", No. 950470. SAE Technical Paper, Feb. 1, 1995, Abstract.
Kan et al., "Model-based vehicle tracking from image sequences with an application to road surveillance," Purdue University, XP000630885, vol. 35, No. 6, Jun. 1996.
Kang et al., "High Dynamic Range Video", ACM Transactions on Graphics, vol. 22, No. 3, 2003.
Kassel, "Lunokhod-1 Soviet Lunar Surface Vehicle", Advanced Research Projects Agency, ARPA Order No. 189-1, Dec. 9, 1971.
Kastrinaki et al., "A survey of video processing techniques for traffic applications", Image and Computing 21, 2003.
Kehtarnavaz et al., "Traffic sign recognition in noisy outdoor scenes", 1995.
Kehtarnavaz, "Visual control of an autonomous vehicle (BART)—the vehicle-following problem", IEEE Transactions on Vehicular Technology, Aug. 31, 1991, Abstract.
Kemeny et al., "Multiresolution Image Sensor," IEEE Transactions on Circuits and Systems for Video Technology, vol. 7, No. 4, Aug. 1997.
Kenue et al., "LaneLok: Robust Line and Curve Fitting of Lane Boundaries", Applications in Optical Science and Engineering, International Society for Optics and Photonics, 1993, Abstract.
Kenue, "Lanelok: Detection of Lane Boundaries and Vehicle Tracking Using Image-Processing Techniques," SPIE Conference on Mobile Robots IV, 1989.
Kidd et al., "Speed Over Ground Measurement", SAE Technical Paper Series, No. 910272, pp. 29-36, Feb.-Mar. 1991.
Kiencke et al., "Automotive Serial controller Area Network," SAE Technical Paper 860391, 1986, retrieved from http://papers.sae.org/860391/, accessed Mar. 20, 2015.
Klassen et al., "Sensor Development for Agricultural Vehicle Guidance", No. 932427. SAE Technical Paper, 1993, Abstract.
Kluge et al., "Representation and Recovery of Road Geometry in YARF," Carnegie Mellon University, Proceedings of the IEEE, pp. 114-119, 1992.
Knipling, "IVHS Technologies Applied to Collision Avoidance: Perspectives on Six Target Crash Types and Countermeasures," Technical Paper presented at Safety & Human Factors session of 1993 IVHS America Annual Meeting, Apr. 14-17, 1993, pp. 1-22.
Knipling et al., "Vehicle-Based Drowsy Driver Detection: Current Status and Future Prospects," IVHS America Fourth Annual Meeting, Atlanta, GA, Apr. 17-20, 1994, pp. 1-24.
Koller et al., "Binocular Stereopsis and Lane Marker Flow for Vehicle Navigation: Lateral and Longitudinal Control," University of California, Mar. 24, 1994.
Kowalick, "Proactive use of highway recorded data via an event data recorder (EDR) to achieve nationwide seat belt usage in the

(56) References Cited

OTHER PUBLICATIONS

90th percentile by 2002" "Seat belt event data recorder (SB-EDR)" Transportation Recording: 2000 and Beyond., May 3-5, 1999, pp. 173-198, 369.

Kozlowski et al., "Comparison of Passive and Active Pixel Schemes for CMOS Visible Imagers," Proceedings of SPIE Conference on Infrared Readout Electronics IV, vol. 3360, Apr. 1998.

Krotkov, "An agile stereo camera system for flexible image acquisition", IEEE Journal on Robotics and Automation, Feb. 18, 1988.

Kuan et al., "Autonomous Robotic Vehicle Road Following", IEEE Transactions on Pattern Analysis and Machine Intelligence, vol. 10, No. 5, Sep. 1988, pp. 648-658, Abstract.

Kuehnle, "Symmetry-based recognition of vehicle rears", Pattern Recognition Letters 12, North-Holland, 1991.

Kuhnert, "A vision system for real time road and object recognition for vehicle guidance," in Proc. SPIE Mobile Robot Conf, Cambridge, MA, Oct. 1986, pp. 267-272.

Kweon et al., "Behavior-Based Intelligent Robot in Dynamic Indoor Environments", Proceedings of the 1992 IEEE/RSJ International Conference on Intelligent Robots and Systems, Jul. 7-10, 1992.

\* cited by examiner

VEHICULAR FORWARD VIEWING IMAGE CAPTURE SYSTEM

CROSS REFERENCE TO RELATED APPLICATIONS

The present application is a continuation of U.S. patent application Ser. No. 16/125,891, filed Sep. 10, 2018, now U.S. Pat. No. 10,787,116, which is a continuation of U.S. patent application Ser. No. 15/262,479, filed Sep. 12, 2016, now U.S. Pat. No. 10,071,676, which is a continuation of U.S. patent application Ser. No. 14/164,682, filed Jan. 27, 2014, now U.S. Pat. No. 9,440,535, which is a continuation of U.S. patent application Ser. No. 13/887,727, filed May 6, 2013, now U.S. Pat. No. 8,636,393, which is a continuation of U.S. patent application Ser. No. 13/452,130, filed Apr. 20, 2012, now U.S. Pat. No. 8,434,919, which is a continuation of U.S. patent application Ser. No. 13/173,039, filed Jun. 30, 2011, now U.S. Pat. No. 8,162,518, which is a continuation of U.S. patent application Ser. No. 12/377,054, filed Feb. 10, 2009, now U.S. Pat. No. 7,972,045, which is a 371 of PCT Application No. PCT/US2007/075702, filed Aug. 10, 2007, which claims the benefit of U.S. provisional applications, Ser. No. 60/845,381, filed Sep. 18, 2006; and Ser. No. 60/837,408, filed Aug. 11, 2006, which are hereby incorporated herein by reference in their entireties.

FIELD OF THE INVENTION

The present invention relates to automatic headlamp control systems for vehicles and, more particularly, to automatic headlamp control systems that automatically adjust the high and low beam states of a vehicle headlamp.

BACKGROUND OF THE INVENTION

Automotive forward lighting systems are evolving in several areas including the use of image-based sensors, typically referred to as Automatic High Beam (AHB) control systems, to maximize the use of high beam road illumination when appropriate, the use of steerable beam systems, typically referred to as Adaptive Front Lighting (AFL) systems, to provide a greater range of beam pattern options particularly for driving on curved roads or during turn maneuvers wherein the beam pattern may be biased or supplemented in the direction of the curve or turn, and the combination of such AHB and AFL systems.

U.S. Pat. No. 6,097,023 (which is hereby incorporated herein by reference in its entirety) describes an automatic high beam control system which utilizes an optical system, an image sensor, and signal processing including spectral, spatial and temporal techniques to determine ambient lighting conditions, the road environment, and the presence of other road users in order to automatically control the selection of the appropriate forward lighting state such that user forward vision is optimized while minimizing the impact of headlamp caused glare on other road users in all lighting conditions.

While AHB systems that utilize the features and concepts described within the above identified U.S. patent have achieved performance levels that have resulted in considerable commercial success, it is desired to provide additional features and techniques, which may increase the utility, improve the performance, facilitate the manufacture, and simplify the installation of such systems.

SUMMARY OF THE INVENTION

The present invention provides an automatic headlamp control system that is operable to automatically control or adjust the high beam state of a vehicle's headlamps. The headlamp control system is operable to spread out or defocus a captured image to spread out the imaging of a light source so that an image of a distant light source is captured by at least two pixels of an image array sensor. The image array sensor thus may receive at least a portion of the light source (which may be a red tail light of a leading vehicle) on a red sensing pixel to enhance early detection of the distance tail light. The headlamp control system may provide enhanced control of the headlamps when the vehicle is driven around curves or bends in the road and may be operable in response to a steering wheel angle of the vehicle. The headlamp control system may be adjustable to align the optical axis of the imaging system with a vehicle axis in response to detection of light sources and tracking of movement of the light sources as the vehicle travels along the road.

These and other objects, advantages, purposes and features of the present invention will become apparent upon review of the following specification in conjunction with the drawings.

DESCRIPTION OF THE PREFERRED EMBODIMENTS

In order to facilitate the description of features and enhancements, some specific configurations, to be reviewed in conjunction with the drawings, is described below. It will be understood that the components and values described are for illustrative purposes and do not limit the scope of the disclosed invention.

Figure 1:
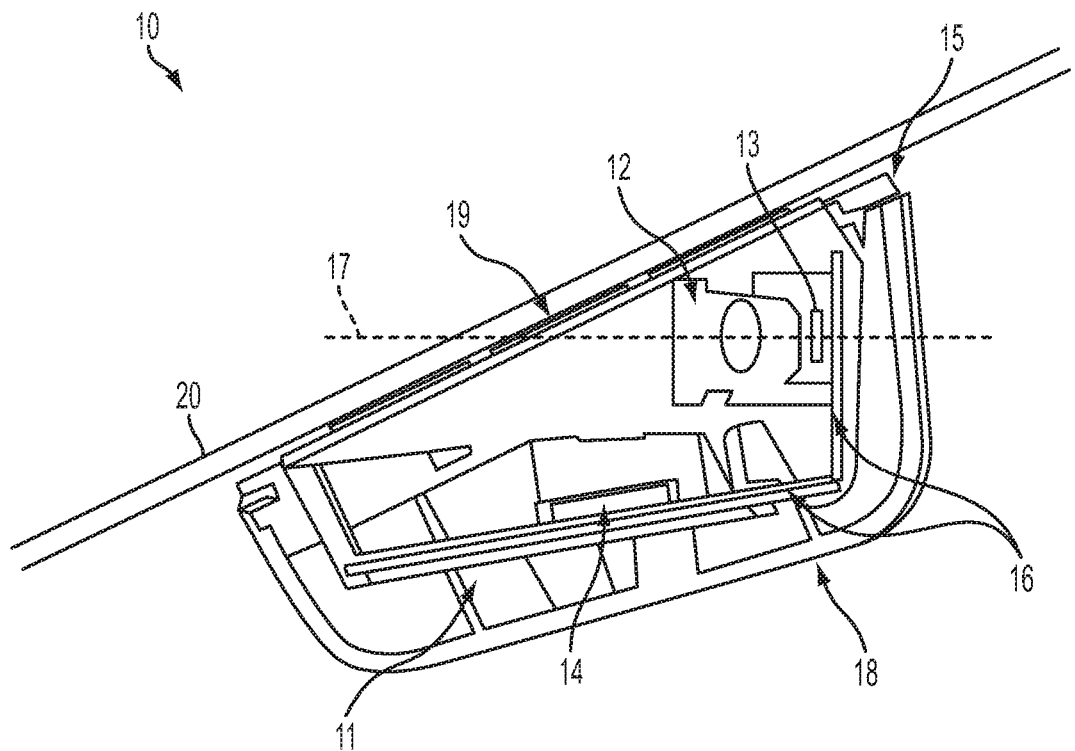
FIG. 1 is a sectional view of an accessory module and image sensing device and processor in accordance with the present invention.
Figure 2:
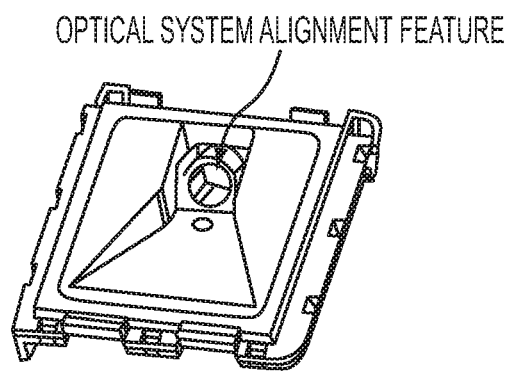
FIG. 2 is a perspective view of the accessory module as seen through the windshield of a vehicle.

With reference to FIG. 1, a vehicle 10 includes an automatic high beam control system 11 made up of an optical system 12, an image sensor 13, a digital processor 14, a printed circuit board assembly 15, which contains all the necessary electronic components and interconnections to support operation of the image sensor 13 and digital processor 14, a connection 16 to the vehicle wiring system, and a housing assembly or accessory module or windshield electronics module 18.

The optical system 12 is held by features of the housing assembly 18 in a constrained spatial relationship with the image sensor 13, such that an optical system axis 17 is perpendicular to the active plane of the image sensor 13 and passes generally through its center point, and such that the distance between the optical system 12 and the image sensor 13 may be adjusted to bring the optical system focal plane into a predetermined relationship with the active plane of the image sensor 13 during the manufacturing process and thereafter locked in position. The housing assembly may utilize aspects of the modules or assemblies described in U.S. Pat. Nos. 6,968,736; 6,877,888; 6,824,281; 6,690,268; 6,672,744; 6,593,565; 6,516,664; 6,501,387; 6,428,172; 6,386,742; 6,341,523; 6,329,925; 6,326,613; 6,250,148 and 6,124,886, and/or U.S. patent applications, Ser. No. 10/456,599, filed Jun. 6, 2003, now U.S. Pat. No. 7,004,593; Ser. No. 10/538,724, filed Jun. 13, 2005 and published Mar. 9, 2006 as U.S. Publication No. US-2006-0050018, and/or Ser. No. 11/201,661, filed Aug. 11, 2005, now U.S. Pat. No. 7,480,149, and/or PCT Application No. PCT/US03/40611, filed Dec. 19, 2003; PCT Application No. PCT/US03/03012, filed Jan. 31, 2003, and/or PCT Application No. PCT/US04/15424, filed May 18, 2004, and/or Ireland patent applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

The accessory module or housing assembly 18 includes an outer housing 18a that is removably attached to an attachment plate 19, which is fixedly attached to the upper central region of the inside surface of the vehicle's windshield 20 such that the optical system axis 17 is substantially horizontal and substantially parallel to the vehicle's principal central axis. Preferably, the housing assembly 18 is positioned at the windshield such that the light rays that pass through the optical system 12 to the image sensor 13 also pass through a portion of the vehicle's windshield swept by the vehicle's windshield wiper system.

Figures 3, 4:
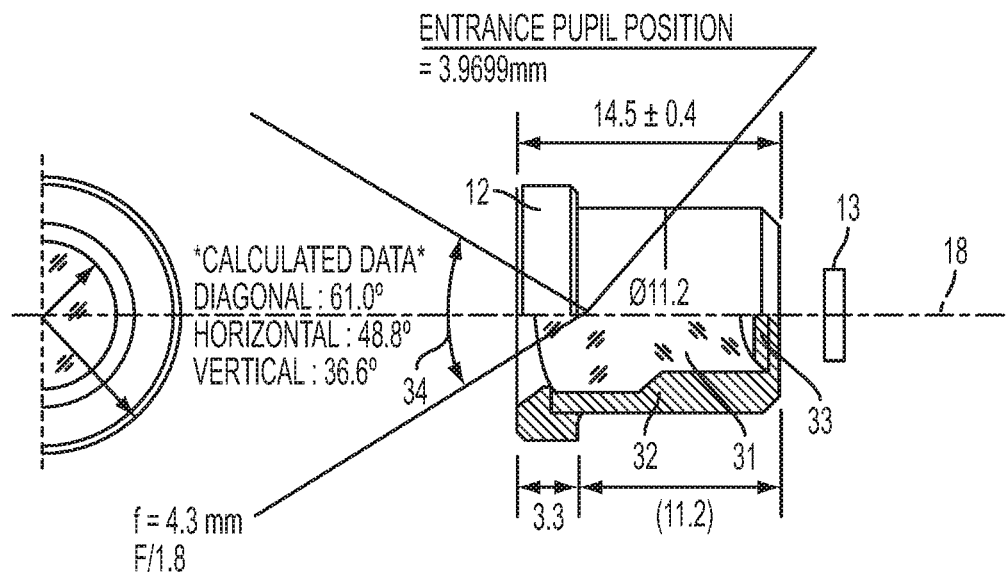
FIG. 3 is a side elevation and partial sectional view of an image sensing device useful with the present invention.
FIG. 4 is a plan view of an array of photo sensors of an image sensing device of the present invention.

As shown in FIG. 3, optical system 12 includes a lens 31, or combination of lenses or optical elements, with a focal length f (such as a focal length of, for example, about 4.5 mm), an optical stop, N (such as an optical stop of, for example, about 1.8) and a spherical field of view (FOV) 34 (such as about 60 degrees). Optical system 12 also includes a cylindrical lens holder 32, an infrared filter 33, and an image sensor 13 positioned with its active surface perpendicular to optical axis 17. The infrared filter 33 facilitates the determination of color attributes within the visible light spectrum of objects within the monitored scene by preventing near infrared energy, with a wavelength above about 750 nm, from reaching the image sensor 13, and may be optionally placed at the front (object side) or back (image side) of the optical system 12, between the optical system 12 and image sensor 13, or on the surface of the image sensor 13. The optical system and lens holder and sensor may be located at an imaging sensor module, such as by utilizing aspects of the modules described in U.S. patent applications, Ser. No. 10/534,632, filed May 11, 2005, now U.S. Pat. No. 7,965,336, and/or U.S. provisional application, Ser. No. 60/731,183, filed Oct. 28, 2005, which are hereby incorporated herein by reference in their entireties.

The image sensor 13 is preferably, but not limited to, a CMOS photosensor array, such as part number MT9V125 produced by Micron Corporation, with 640 rows and 480 columns of 5.6 micron square photosensor elements and circuitry to measure the quantity of photons that impinge each photosensor element during a controllable period of time. In the described configuration, the image sensor is oriented such that the 640 photosensor rows are horizontal and the 480 columns are vertical. Thus, in combination with the optical system 12, the image sensor 13 has about a 48 degree horizontal field of view and about a 36 degree vertical field of view.

In order to extract color information from the image or image data, one of a number of filter types, each able to transmit a particular band of wavelength, covers the active surface of each of the photosensor elements of the array. The most commonly used color filter pattern, and therefore the most economically available as a standard feature of a commercially available image sensor, is the Bayer pattern in which either a blue, green or red pass filter is applied to the surface of each of the image sensor photosensor elements, such as shown in FIG. 4. Alternate rows of the photosensor elements may be covered by alternating red and green filters and alternating blue and green filters such that every 2 by 2 block of photosensors within the array contains one red filter, one blue filter and two diagonally opposite green filters. Since each photosensor is filtered to measure only the blue, green or red light energy content of the portion of the image formed by the optical system at its active surface, it is necessary to combine the measured values of filtered light from each of the photosensors of a 2 by 2 block such that an interpolated red, green and blue color value (RGB) may be assigned to the center point of the block. The color value for each of the 2 by 2 blocks of the array is calculated, thus creating a 639 by 479 array of color values with the same spacing as the photosensor array. This array of color picture elements is commonly termed a pixel array. A variety of algorithms may be used to perform this interpolation, commonly termed demosaicing, and the particular algorithm may be selected depending on the particular the application, the desired final image quality and available computing power. For the AHB control system described herein, each pixel RGB value is derived by combining the red value, the average of the two green values, and the blue value of its associated four photosensor elements.

Figure 15A:
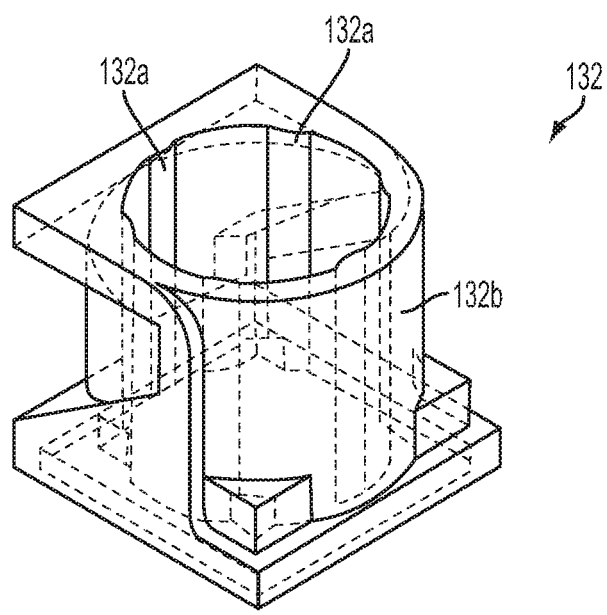
FIG. 15A is a perspective view of a lens holder in accordance with the present invention.
Figure 15B:
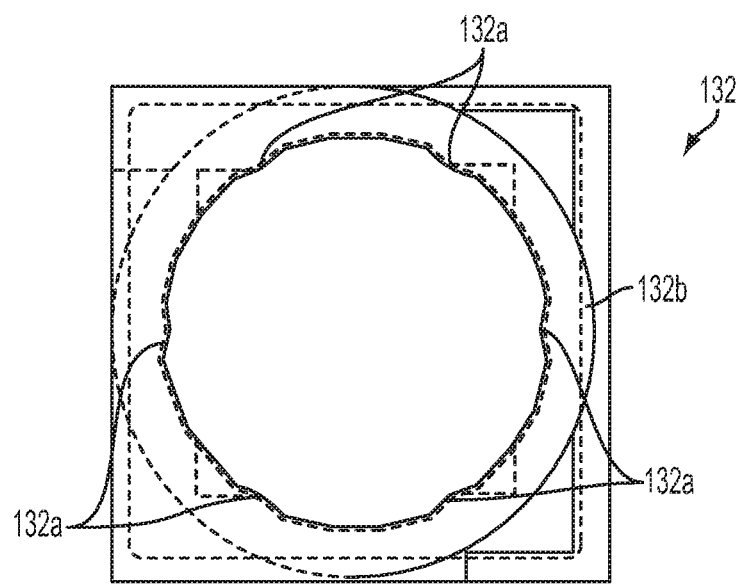
FIG. 15B is a plan view of the lens holder of FIG. 15A.

Optionally, the imaging device or module may comprise an imaging or intelligent headlamp control (IHC) module. For example, an intelligent headlamp control module may have a dimensionally small cavity around a lens holder 132 (FIGS. 15A and 15B), thus making threaded lens insertion very difficult in an automated lens insertion situation. In order to manufacture such an IHC module or lens holder 132, crush ribs 132a may be disposed or established at an interior surface of the barrel 132b of the lens holder. By introducing vertical crush ribs to the barrel, the axes of motion are decreased to one. In a threaded lens situation, the automated lens insertion procedure could have as many as four axis of motion, thus increasing the cost of the module or system.

In order to accommodate the crush ribs, several lens modifications may be needed, since a typical existing lens often has threads which may bind in the crush ribs. Thus, in order to accommodate the crush ribs, the lens may be manufactured or modified to have a smooth bore in order to engage the control surfaces of the ribs evenly along the barrel of the lens holder.

The crush rib feature of the lens holder secures the lens during manufacture. However, it is desirable to apply an adhesive at the lens holder and lens to substantially permanently attach the lens to the plastic barrel of the lens holder. Lateral grooves around the barrel of the lens may be provided to allow the flow of adhesive around the lens for a more uniform lens attachment or securement. Such grooves do not interfere with the crush ribs during insertion as much as threads would and allow the flow of adhesive greater than a substantially smooth bore.

In order to control alignment and precision of the insertion of the lens down the barrel (toward and away from the imager), a gripper may be provided to isolate the head of the lens between two overlapping control surfaces that would hold the lens and control the toward and away (from the imager) motion during the focusing process.

The control surface of the printed circuit board (PCB) during the lens insertion process preferably facilitates several criteria, both mechanical and electrical, during such an automated process. The nest may secure the imager board and backplate simultaneously in a repeatable orientation for lens insertion. The nest may also allow for electrical attachment to the ECU by way of pogo pins or the like during the focusing process. It may also articulate in order to secure the ECU board to the backplate after the focusing process.

In order to achieve enhanced AHB control system performance, it is desirable to detect the tail lamp of a leading vehicle at about 200 meters. The minimum tail light emitting surface area to meet legal requirements is about 50 cm$^2$, which can be achieved using about an 80 mm diameter circular or about a 71 mm square emitting surface. However, in most cases, tail lamp designs are driven by vehicle styling considerations and a desire on the part of vehicle manufacturers to exceed minimum requirements by a safe margin. Such design and styling constraints often result in tail lamp emitting surfaces with either a horizontal or vertical dimension of at least about 125 mm.

Using the above described optical system 12 and imaging array 13, each photosensor element of the array has an effective horizontal field of view FOVph and an effective vertical field of view FOVpv, where:

FOVph=FOVpv=48 degrees/640 pixels=0.075 degrees/pixel.

Thus, each photosensor element of the array subtends a region of a vertical plane at distance R meters from the imager, which measures ph by pv where:

ph=pv=FOVph×R×1000×PI/180 mm=1.309×R mm.

Thus, at a distance of about 200 m, the portion of the forward scene subtended by each photosensor element of the array measures about 262 mm by about 262 mm, which is approximately twice the dimension of a typical tail lamp of a vehicle. Since the dimension of the image of a tail lamp at about 200 meters is in the order of half that of a photosensor element, it is possible that the tail lamp image will lie entirely on the blue and green detecting photosensor elements of a 2 by 2 block of photosensor elements, and thus may result in a pixel value with no red content. In order to assure that the red content of the image of the tail lamp at about 200 meters is measured and results in a red component of the calculated pixel color value, it is desirable that the tail lamp image dimension be in the order of about one and a half times that of a photosensor element, such that no matter where it lies or is received on the photosensor array it will cover at least a portion of at least one red detecting photosensor.

This could be achieved by reducing the field of view of the optical system by a factor of about three, resulting in a horizontal field of view of about 16 degrees and a significant reduction in other aspects of system performance. It could also be achieved by increasing the number of photosensor elements in each row of the image sensor by a factor of about three, with a corresponding reduction of photosensor element dimension, or by increasing the number of photosensor elements in each row of the image sensor by a factor of about three, maintaining the photosensor element dimension, and changing the optical system specification in order to maintain about a 48 degree horizontal field of view. However, this is typically not a practical solution due to the cost or availability of such image sensors and the cost of the additional processing capacity required to handle the significantly increased amount of image data.

It is thus an aspect of the present invention to increase the effective size of the image at the image sensor of a tail lamp at 200 meters, so that its presence and color may be detected, without changing the optical system or image sensor and while maintaining the ability to perform other object detection tasks to support additional features and functions, such as described below.

The following analysis of the optical system contained within the AHB control system will serve to explain the principles used to establish an optimal configuration.

Figure 5:
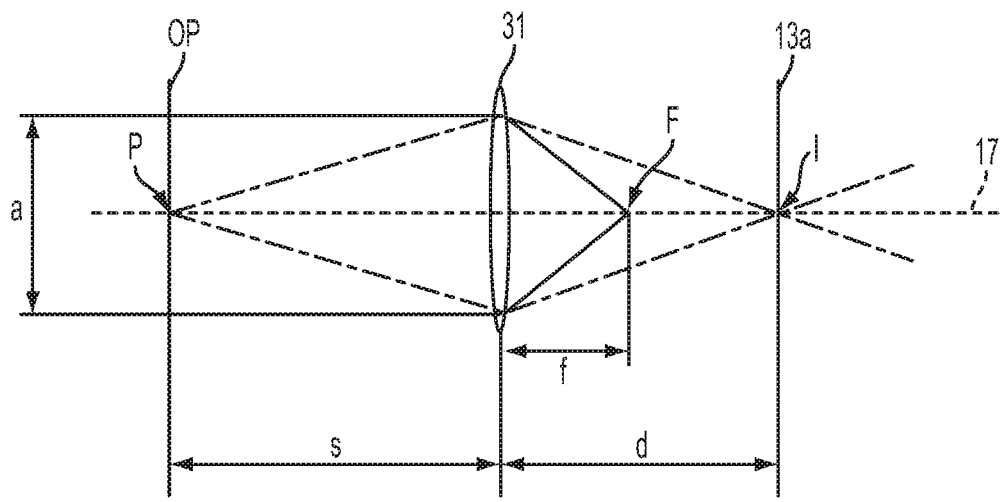
FIG. 5 is a side elevation of a lens and image sensing device of the present invention.

FIG. 5 shows an imaging device having a thin lens 31 with focal length f mm, effective diameter a mm, and optical stop N, where N=f/a. An object plane OP, which is perpendicular to the optical axis of lens 31 and at a distance s mm from its optical center, and an image plane 13a parallel to the object plane at a distanced mm from, and on the opposite side of, the optical center of lens 31. The focal length f is the distance from the optical center of lens 31 to the point at which light rays from a distant point on the optical axis 17 converge. Light rays that pass through lens 31 behave according to the thin lens equation 1/s+1/d=1/f. Thus, an image of the point P on the object plane OP is in focus at point I on the image plane 13a.

Figure 6:
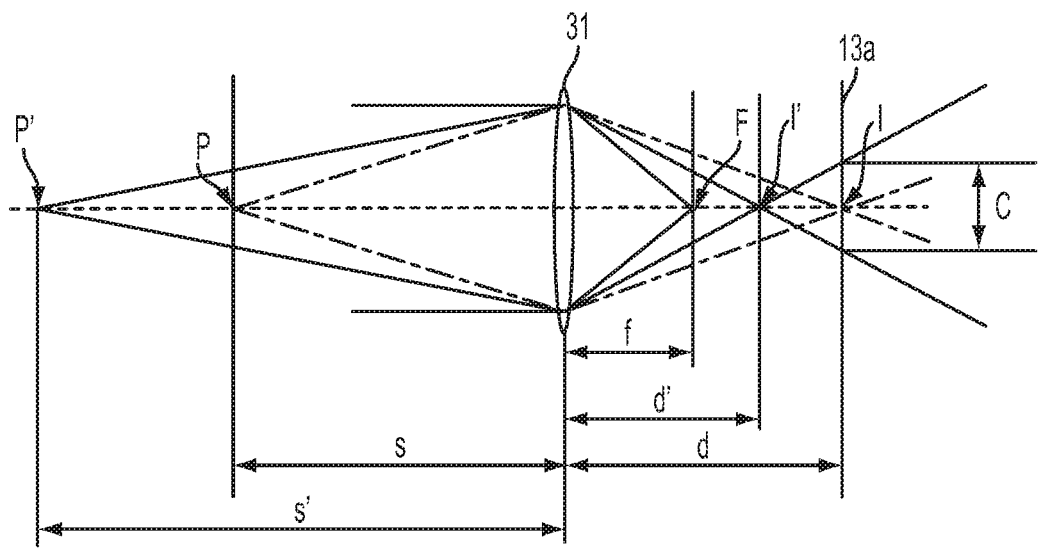
FIG. 6 is another side elevation of a lens and image sensing device similar to FIG. 5.

FIG. 6 shows the same configuration as FIG. 5 with the addition of a point P' at distance s' from the optical center of the lens 31. According to the thin lens equation (1), a focused image of point P' would be formed at point I' which is at distance d' from the optical center of the lens. However, since the image plane 13a has remained at the distance d from the lens, the light rays from point P' continue through point I' and diverge until they reach the image plane 13a resulting in an unfocused image of point P' with diameter C, commonly termed the circle of confusion.

For a thin lens: $1/s+1/d=1/f$     (1)

or: $d=f \times s/(s-f)$ similarly: $d'=f \times s'/(s'-f)$ by similar triangles: $C=a \times (d-d')/d'$ by definition: $a=f/N$ by substitution: $C=f^2 \times (s'-s)/N \times s' \times (s-f)$     (2)

Figure 7:
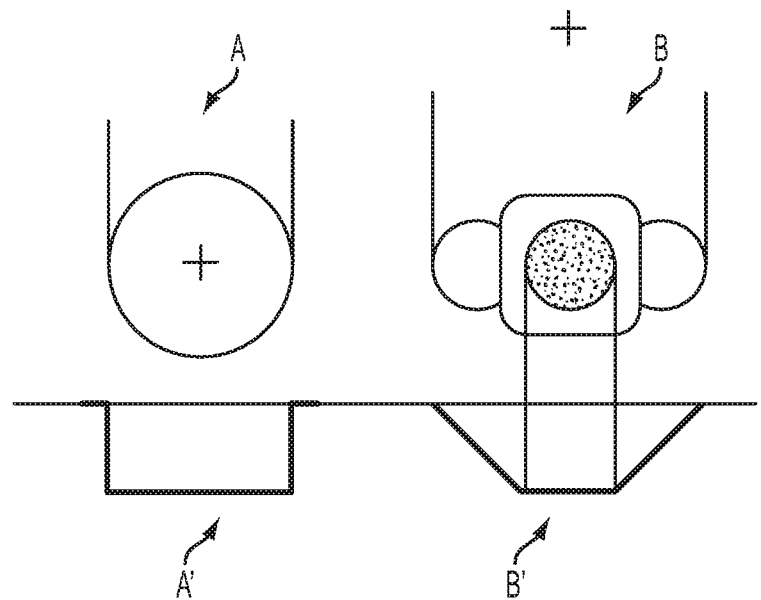
FIG. 7 is a schematic of a focused light source and de-focused light source as captured by pixels of an imaging sensor.
Figure 8:
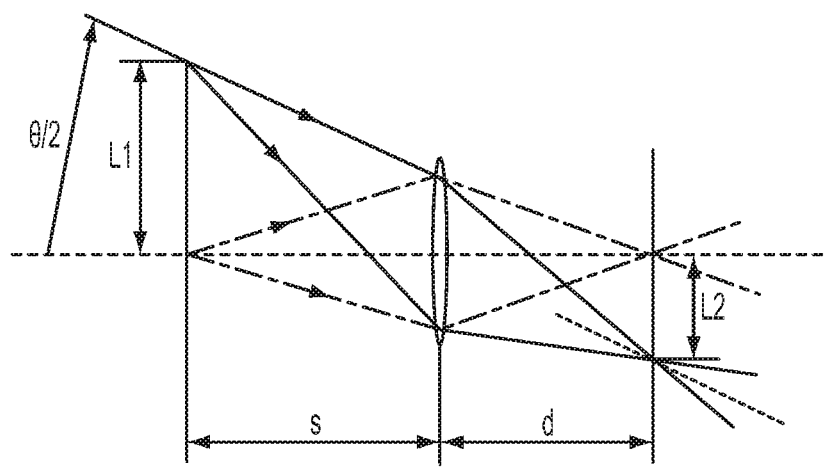
FIG. 8 is a side elevation of a lens and image sensing device of the present invention.

Consider now the object point to be replaced by a circular uniform light source of diameter D. When placed at point P, the image of the disc at the image plane would appear as a focused disc of diameter D' with uniform intensity (such as shown at A in FIG. 7). A plot of image intensity across an extended diametral line would appear as line A' with a step change from background image intensity to disc image intensity. When placed at point P', the previously described circle of confusion, with diameter C, would be created at the image plane 13a for each point on the disc, resulting in an unfocused image of the disc with diameter D", where D"=D'+C (such as shown at B in FIG. 7). A plot of image intensity across an extended diametral line would appear as line B' with gradual change from background intensity to full disc image intensity over a distance equal to the circle of confusion, C.

Rearranging equation (1) to solve for s:

$$s = f \times s' \times (C \times N + f)/(C \times N \times s' + f^2) \quad (3)$$

For the optical system described above, f=4.5 mm and N=1.8. Thus, C=0.0056 mm, s'=200 m, and s=1.933 m. Thus, the same amount of light energy has been distributed over a greater image area. By focusing the lens to focus an image of an object P that is about 1.993 m from the lens, the defocused object P' at about 200 m from the lens will be defocused to have a diameter that will allow the image to be received by more than one pixel of the imaging array sensor or camera. Such an expanded image of the light source (by de-focusing the image of an object at about 200 meters) will be received by more than one pixel and will be at least partially received by a red sensing pixel so that the system can determine whether or not a distant light source is a red light source and thus whether or not the distant light source may be a taillight of a leading vehicle.

Focusing or adjustment of the lens may be performed via any suitable focusing means, such as a linear slide mechanism that has a high resolution motor and controller, such as an MX-80 miniature slide with a Vix 250 IM motion controller commercially available from Parker-Hannifin. Such as slide mechanism and motor may provide a resolution of about 1 μm and a repeatability of about 2 μm or thereabouts. Such characteristics make good resolution possible across the focus range so that the captured image data will illustrate or approximate an enhanced or optimum focus value.

Once an image was loaded by the software, the image may be analyzed by many different means including line profiles and color analysis. For the processing of the image data, a processor system or software, such as Data Translation's DT Vision Foundry©, may be used to analyze the images using software masks or regions of interest (ROI's). The exemplary DT Vision Foundry© software provides an imaging software designed to assist machine vision systems in operation, programming, and data management.

The imaging software was used to process image ROI's using a line profile tool. The line profile tool examines the pixel gain values which the line mask lays. The line profile tool graphically illustrates the gain values across the mask. It also may provide a data export tool which enables the user to view and manipulate the intensity values gathered from the imager.

Figure 11A:
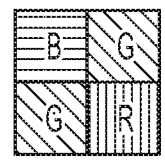
FIGS. 11A-D are schematics of a quad of pixels of an image sensor in accordance with the present invention.

Imager color values are independent to a color pixel. Four pixels in a grid pattern, as shown in FIG. 11A, are often referred to as a "quad". The values taken from the imager are typically intensity or gain values (0 to 255) from the pixels in the quad. There are many different ways in which displays and compilers interpret the intensity values from the imager. The most straight forward way is to collect each pixel's intensity value and compile it into a 64-bit RGGB image. This method of compilation yields enhanced resolution because all of the pixel data is transferred; however, the file sizes may be very large. Many software designers use compression techniques to keep the file sizes lower.

Figure 11B:
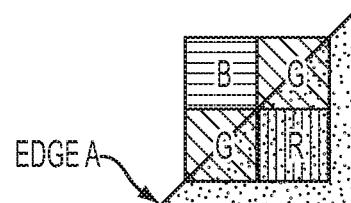
Figure 11C:
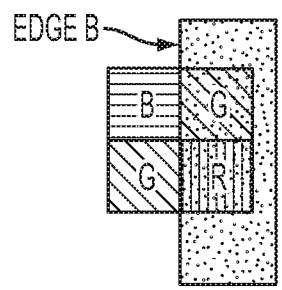
Figure 11D:
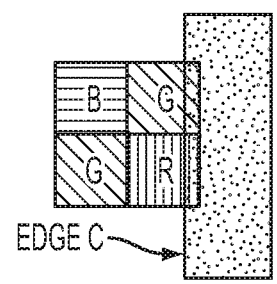

The first method of compression is to get the maximum pixel value from the green pixels in the quad. The second green pixel in the quad is set to the maximum green pixel's value. This method works well in most applications. However, since focus is directly related to the sharpness of the edges of the target in an image, the green pixel values should not be extended to allow the edge to appear sharper than it is. As shown by the edges B and C in FIGS. 11C and 11D, if the edge of the target image lies across the imager in a vertical orientation bisecting the two green pixels of the quad, the second green pixel is then set to the maximum green pixel. This allows for a false edge to be seen by the image processing software. One way that the quad detects the edge correctly is if the edge of a target bisects the green pixels of the quad evenly, as shown by edge A in FIG. 11B. To counter this effect, software designers often average the green pixels together to allow the pixel to take into account the pixel effected by the edge of a target image.

While some visual resolution may be lost by averaging the green pixels, for matters of image processing the data is typically more telling. If the target image edge falls on the imager, such as edge B or C of FIGS. 11C and 11D, the value will be less than the maximum value because the green pixels in the quad are averaged. By examining the difference in intensity value of the quads either side of the averaged edge quad, the edge location within the quad can be approximated.

Focus is directly related to the sharpness of the edges of the target image. Optionally, two image processing tools may be used: a histogram and a line profile. After image data are captured and stored, the automatic focus software processes the image data with a histogram tool. A histogram of a region of interest (ROI) in an image will illustrate, using a bar graph, the number of pixels at their respective intensity value. The theory behind using a histogram is that as a black and white target image is processed, a more focused image would have more pixels in extremes and fewer pixels in the medium intensity range. However, in order to create an algorithm to focus the imager, a more perceivable pattern to predict the focal distance was needed.

Optionally, and desirably, the intelligent headlamp control (IHC) may focus by capturing individual picture frames and measuring a line profile through a target image consisting of several dark bars separated by different spacing. After finding the line profiles across the target, the slope of the line profiles is calculated to find the sharpness of the edges of the target image. If the target image is sharp (in focus), the peak of the slope will be abrupt and large. If the edges of the target image are blurry, the peak of the slope will be smaller and less abrupt (as can be seen with reference to FIG. 13).

Figure 12:
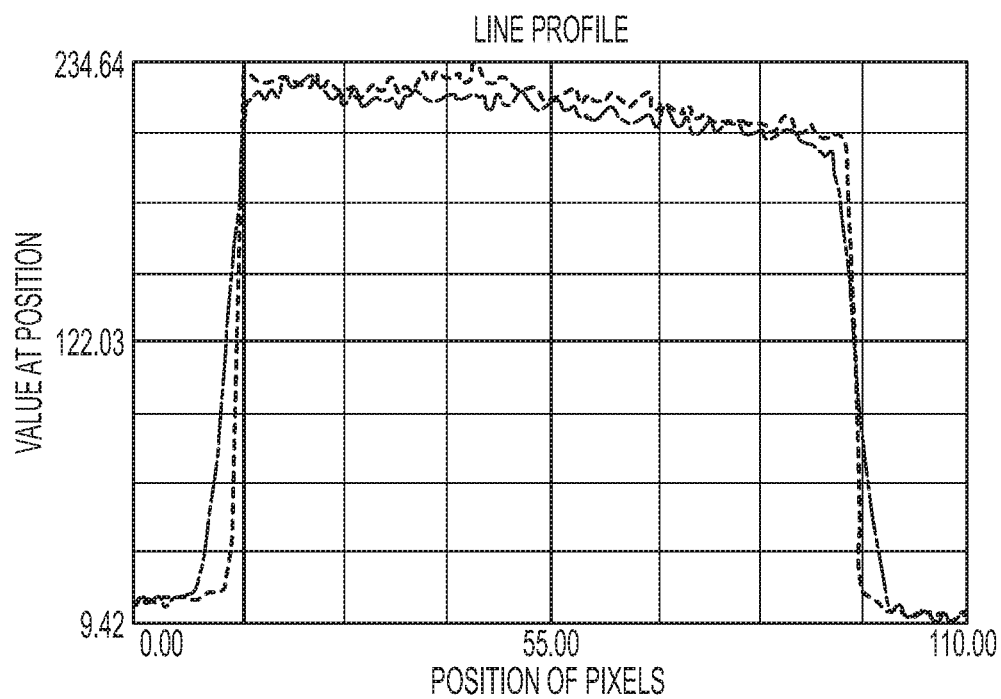
FIG. 12 is a graph of a plurality of line profiles generated in accordance with the present invention.
Figure 13:
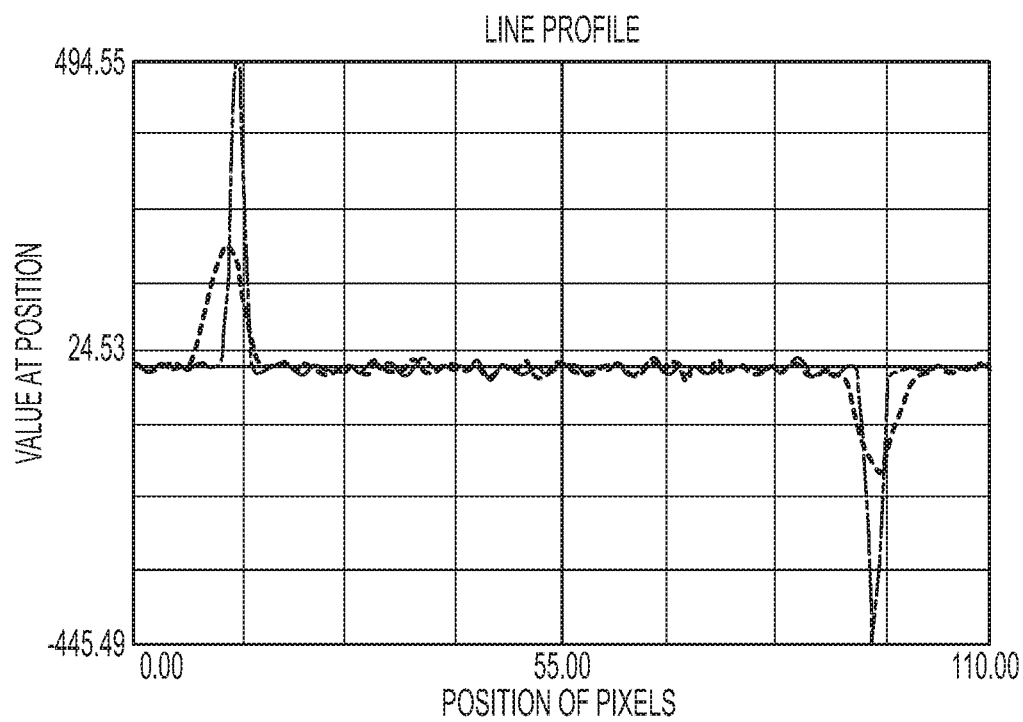
FIG. 13 is a graph of the slope of the line profiles of FIG. 12.

Thus, a line profile tool may be implemented to examine the pixels in a one dimensional mask or line. Such a line profile tool charts the intensity values detected by the imager along the line mask, such as shown in FIG. 12. By using the line profile tool, the edges of the target image are able to be examined. The theory used for the line profile is that as the line mask crossed from a black to white or vice versa target area, the detected intensity value curve would have less of a slope in an unfocused image than a more focused image. The imaging software may include a derivative function to find the slope of the line profile as shown in FIG. 13.

To find the slope, the intensity value of the pixels in the line profile can be calculated in several ways. However, in order to simplify the calculation, the following method to find slope was derived:

$$\frac{Y_n - (Y_{n-1})}{X_n - (X_{n-1})} = S_n;$$

where Y is the intensity value of the pixels 1, 2, 3, 4 ... n, and X is the position of that pixel along the line profile.

Figure 14:
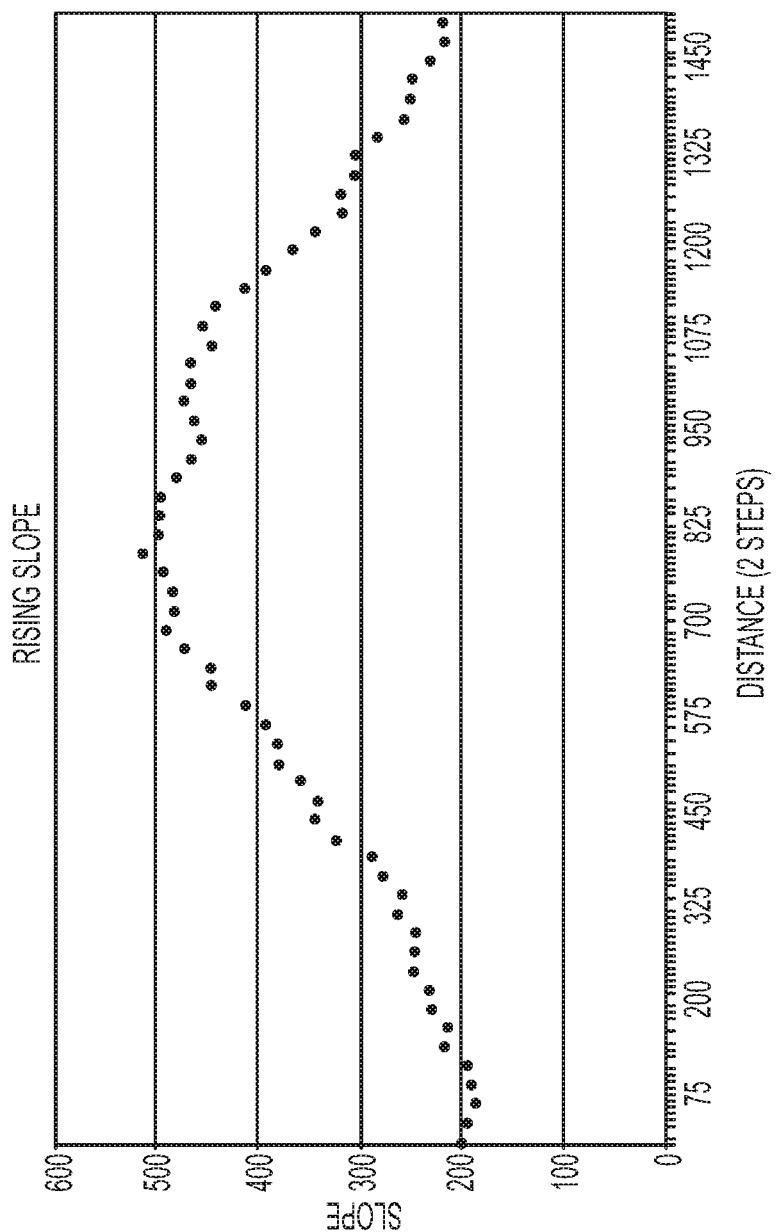
FIG. 14 is a graph of the edge slope vs. focal distance for the focusing algorithm of the present invention.

Once the slope had been determined by the above equation, the maximum and minimum slopes from that image were recorded along with the reference distance away from the starting back focal length as shown in FIG. 14. As the images are processed, a pattern exists that references the maximum and minimum slopes to focal length. This focal length curve is the basis of the software algorithm.

After the slope of the line profile has been plotted, the slope can be plotted against the back focal distance by finding the maximum and minimum slope. As shown in FIG. 14, the correlation between rising edge slopes of several line profiles and back focal distances may be determined. Once near-focus has been achieved, the curve of FIG. 14 provides a reference to the nominal back focal length and creates a quick focus procedure.

After creating several "Slope vs. Distance" curves, the tolerance range for the back focal distance may be approximately ±100 microns from nominal. The tolerance specification given for the lens may be ±210 microns. These tolerance stack-ups require an individual focus for each lens to imager combination.

Using the same line profile slope plot as in FIG. 13, the pixel length of the target image can be found to verify magnification. Since the size of the target is critical in the IHC algorithm, the magnification needs to be verified during focus calculations. To verify the magnification of the lens, the distance, in pixels, is measured between the peak rising edge slope and the peak falling edge slope taken from a target near the center of the field of view. That pixel length is verified against a predetermined value for that target. The production target has not been designed making that pixel length variable to the target.

The software design of the automated focus system is a closed loop software controlled system that utilizes the focus curve as shown in FIG. 14 as a virtual feedback. The design proposal for the focus algorithm created by the author is as follows:

move slide to preset near focus distance (greater than nominal focal distance);
    capture image and process line profiles;
    increment slide toward imager by 25 steps (microns);
    capture image and process line profiles;
    repeat steps 3 and 4 one or more times;
    calculate present focal distance according to pre-calculated focal curve;
    move to nominal focal distance according to pre-calculated focal curve; and
    capture image and verify correct focal distance with line profile and histogram.

Since a single line profile may allow for failure in the above process, many line profiles are preferably examined and averaged in order to effectively focus a lens to an imager in a production setting. However, the single line profile used in experimentation exhibits the predictability and repeatability of the focal length curve.

Thus, the software needed to control the auto-focus system should accomplish three things: (1) control the imager; (2) calculate image data; and (3) control the slide table for adjustment. In order to control the imager, the digital video signal from the imager may be coming in through USB, and the software may capture individual frames for calculation upon command. The software also may be capable of reading and writing exposure and gain values for image capture.

The GUI must be able to interactively place and store multiple line ROI's in order to take measurements across the image. Line profiles that correlate with the line ROI's are calculated to find the measure of focus at that specific position. The derivative of each line profile is taken in order to find the slope of the line profile. After these calculations are complete for one image, the peak slopes from each line profile will be averaged together. This number will be compared to a stored table that the program will be able to access in order to find the approximate distance (number of steps) away from nominal focus. After the nominal focus has been reached by means of line profile, the GUI is able to calculate histograms from multiple rectangular ROI's. These histograms may reveal the percentage of data between the two peaks of the histograms, and the control may average that percentage to give a validation to the line profile. The software and control are further able to either virtually or physically interface to the slide controller package in order to input distances and command operations to the slide controller.

After completing several iterations of the focus experiment, several conclusions were made. The target design should have a white object on a black background with angled edges by which line profiles and histograms may discern a sharp focused edge. The histogram method of detecting focus was adequate for detecting focus. However, this method required the motion control to step through many increments of focal length until the histogram criteria reached acceptable limits. Although this method would be adequate and relatively simple to implement, the line profile method revealed a more calculable and immediate pattern of focus.

The line profile method of measuring focus is readily chartable and predictable across the focal distance range. However, although the boundary region between a white and black target may be readily examined, whereby the sharpness of the target is only measured at that point in the target image, more line profiles may be needed to be performed across the image for real-world or non black and white target applications.

Thus, the mathematical algorithm and the curve data methodology discussed above may be implemented as a focus algorithm for present and future forward facing imager systems (and optionally rearward facing imager systems and/or sideward facing imager systems and the like). Although each imager and lens combination will have its own focus curve data, the initial data collection will be a minimal component to the setup procedure. Preferably, the focus can and should be attained by going directly to a calculated focal distance processed by initial out-of-focus images captured by the imager. By using this procedure, attaining focus in a production scenario can be greatly hastened.

Real lenses do not typically focus all rays perfectly due to spherical or other aberrations, diffraction effects from wave optics and the finite aperture of the lens, resulting in an unfocused image with a circle of confusion CL, which is an essentially constant value dependent on lens quality and independent of the distance of the object or the image from the optical center of the lens. The combined effects result in a total circle of confusion CT for images received by the image sensor. Further, the magnification M of the lens is defined as the ratio of the image dimension LI to the object dimension LO. Thus, M=LI/LO.

High volume component manufacturing and assembly processes used in the production of optical systems at low cost typically result in part to part variations in their optical characteristics. Additionally, dimensional tolerances are associated with the manufacture of the housing assembly components, with the placement of the imaging array die in its package, and with the placement of the imaging array on the printed circuit board assembly.

Forward facing image capture and signal processing components, such as incorporated in the described AHB control system, may be used to obtain information regarding the location, movement and other characteristics of many objects of relevance to the driving task or operation of the vehicle within the image sensor's field of view, in order to provide additional features and functions, such as, but not limited to, traffic lane detection and lane departure warning, traffic sign recognition, traffic light status detection, fog detection, rain sensing, and/or to supplement or complement the use of other sensors or sensing technologies in the provision of other features and functions such as, but not limited to, adaptive cruise control, pre-crash sensing, pedestrian detection, etc., thus increasing the utility and value of the AHB control system and reducing the cost and space requirements associated with providing each of the features and functions as independent stand-alone systems.

In order to provide optimum detection and characterization of the wide range of objects of relevance or interest in support of the above listed features and functions, amongst others, under a wide range of lighting conditions, it is necessary to consider the requirements of each detection task or group of similar detection tasks.

Typical fixed beam forward lighting systems offer two beam patterns, low and high, with low beam preferably providing the maximum forward and lateral road illumination without causing direct glare to other oncoming or leading vehicle operators such that it may be used in all driving conditions, and high beam preferably providing the maximum forward illumination range with reduced lateral coverage to provide improved forward visibility during night driving when other road users are not present within the extended illuminated region, that is, the region in which they would be subject to glare from the vehicle's high beam headlamps.

Optionally, AHB control systems may incorporate a low speed threshold below which high beam selection is inhibited, in order to avoid activation of high beams when unnecessary, such as when driving at a speed which is safe given the forward visibility provided by the low beam lighting, or when undesirable, such as when driving on city roads.

There are, however, circumstances above this low speed threshold in which it is desirable to maintain, or switch to, a low beam state, even in the absence of other road users in the high beam illumination region. One such circumstance occurs when the vehicle is driven round a bend with a short radius of curvature. In this situation the value of the long range illumination resulting from the use of high beams is reduced since it is not aligned with the vehicle trajectory and typically illuminates off road regions. However, the wider short range beam pattern resulting from the use of low beams can provide increased illumination along the left or right hand curving vehicle trajectory.

Thus, an aspect of the present invention is to improve existing AHB control systems by inhibiting high beam selection when improved relevant road illumination may be provided by the use of low beam headlights, and in particular when the radius of curvature of the current, or instantaneous, vehicle trajectory falls below a predetermined threshold value.

The threshold value is ideally determined based on the specific high and low beam patterns generated by the lighting equipment installed on the vehicle. Additionally, since headlight beam patterns are typically asymmetric, and since the distance to the edge of the road is different when driving round a left or right hand curve, the left and right hand vehicle trajectory radius of curvature threshold values may be different.

The current or instantaneous vehicle trajectory radius of curvature may be obtained or derived from several sources, including, but not limited to steering wheel angular position. The correlation between the vehicle trajectory radius of curvature and steering wheel angular position may be readily established with knowledge of the vehicle mechanical configuration. Thus, steering wheel angular position thresholds which are substantially equivalent to vehicle trajectory radius of curvature thresholds may be derived. Typically, the current, or instantaneous, angular position of the vehicle steering wheel is measured by a rotary encoder, or equivalent sensing device, and is made available to other vehicle control systems either directly or via a vehicle communication bus such as a CAN or the like. By accessing this signal or vehicle bus message, and comparing it to a predetermined threshold, high beam activation may be inhibited to achieve the previously described benefits.

If the vehicle is driven round a long steady curve with a radius of curvature which corresponds to the steering wheel angular threshold, it is possible that the instantaneous steering wheel angular value will oscillate about the angular threshold, resulting in a potentially annoying or inappropriate oscillation between high and low beam states. Thus, the AHB control system may incorporate a time based filter, which may be adaptive, and which may be non-symmetrical, to regulate what might otherwise be frequent annoying or inappropriate switching between the low and high beam states. Depending on the characteristics of the time based filtering system, it may be beneficial to incorporate hysteresis in the angular threshold values, such that the values for left and right increasing steering wheel angles are greater than the values for left and right decreasing steering wheel angles.

Automatic image based high beam control systems (such as described in U.S. Pat. No. 6,097,023, which is hereby incorporated herein by reference in its entirety), in which an image of the scene forward of the vehicle is focused by an optical system, may have a horizontal field of view equal to, but not limited to, approximately +/−22.5 degrees about the imaging system centerline. The image may be focused or imaged onto a rectangular array image capture device such as, but not limited to, a 640×480 CMOS color imager, which captures image data and provides sequential frames of data indicative of the light energy reflected or emitted by objects in the region subtended by each element of the array. The image capture rate may be at a rate in the range of about 5 to 120 times per second or more, with processing being performed on the data to determine the presence, location and characteristics of objects within the monitored scene and to determine characteristics of the monitored scene, such as general illumination level, and to utilize several defined regions of the monitored scene for several different purposes. For example, the region of the scene which generally corresponds to the region of influence of the vehicle high beam pattern, may be used to determine the need to inhibit high beam activation if other road users are detected within that region. The regions to the left and right of the first region may be used to anticipate the upcoming entry of other road users into the first region in order to facilitate a rapid and appropriate response upon entry or just prior to entry of the first region. The upper central region of the monitored scene may be used to determine ambient lighting conditions such that a first threshold may be established below which low beam headlights are activated, and a second threshold may be established above which high beam activation may be inhibited, while the lower horizontal portion of the ambient lighting condition detection region may be used to detect urban lighting conditions or the like. Other processing of the captured image data may be implemented depending on the particular application of the image sensor and processor, while remaining within the spirit and scope of the present invention.

While the segmentation of the monitored scene into fixed regions, such as described above, provides many benefits and efficiencies to the image processing routines used to characterize vehicular light sources, ambient lighting conditions, and non-vehicular light sources etc., they only provide optimal performance when they are appropriately aligned with the monitored scene, such as when driving on a flat straight road. Much of the typical driving experience, however, is on curved and undulating roads. It is, therefore, desirable to have dynamic segmentation of the monitored scene such that the various regions employed align appropriately according to the upcoming road topology and geometry.

An additional aspect of the present invention is to improve the performance of AHB control systems by providing a dynamic segmentation of the monitored scene.

When driving on a curved road, it is beneficial to extend the region used to detect and monitor vehicular light sources in the direction of road curvature in order to provide a sufficiently early detection of other road users and thus the inhibition of high beams. This region may be extended in accordance with the vehicle trajectory radius of curvature as determined by the steering wheel angle or other means as previously described. Additionally, the upcoming road condition may be anticipated by other means, such as vehicle pitch as may be monitored by an accelerometer, combination of accelerometers or other means, such as by detection of vehicle roll, visible horizon tilt and/or yaw detection and/or in response to a GPS output or the like.

An additional aspect of the present invention is to improve the performance of AHB control systems, when used in conjunction with adaptive forward lighting (AFL) systems, by actively changing the region of high beam inhibit in response to the vehicle trajectory radius of curvature, in order that it corresponds to the current region of influence of the high beam pattern.

Typical AFL systems are responsive to the vehicle trajectory radius of curvature and provide improved road surface illumination when driving on curved roads by mechanically, or otherwise, adjusting the beam direction or providing supplementary illumination in the direction of the curve. While this provides a solution to the problem addressed above for fixed beam systems, it introduces a shortcoming for a typical fixed beam high beam control system when used to control high beam selection in an AFL system.

While the detection of leading and on-coming/approaching vehicles occurs across a wide field of view, the inhibition of high beam selection occurs in a narrower fixed region which corresponds to the region of influence of the fixed high beam pattern. When driving around a curve with an AFL system, the region of influence of the adaptive high beam pattern is extended in the direction of the curve, thus reducing the effective response time to a vehicle entering the region of high beam inhibit from the direction of the road curvature. It is, therefore advantageous to modify the region of high beam inhibit in correspondence with the modified high beam pattern.

While this may be accomplished through image processing and scene analysis, it is preferable, in order to minimize the complexity, and therefore to minimize the cost of implementation, of the image processing algorithms employed, to use a signal indicative of the vehicle trajectory radius of curvature or the AFL system beam direction control signal. As previously described, the steering wheel angle may be most conveniently used since it correlates to the vehicle trajectory radius of curvature and is commonly available from the vehicle data bus. The region of high beam inhibit may be adjusted in a continuous fashion in correspondence with the instantaneous high beam direction, or it may be adjusted in one or more steps according to one or more steering wheel angle threshold values.

An additional aspect of the present invention is to improve the performance of existing AHB control systems by improving the characterization of non-vehicular light sources when driving on curved roads.

In order to enhance AHB control system performance, it is desirable to provide accurate detection and characterization of other vehicular road users in order to assure the appropriate inhibition of high beam use. Additionally, all other light sources within the monitored scene may be characterized as non-vehicular in order to enhance or maximize forward vision by enabling high beams whenever appropriate and also to avoid the annoyance caused to the user by inappropriate returns to low beams due to the false characterization of non-vehicular light sources as vehicular sources.

Spatial, spectral and temporal techniques are typically used to aid in the appropriate characterization of light sources. It is, however, particularly challenging to correctly characterize light sources when driving round road curves which are provided with reflective signs to indicate road curvature. To achieve the greatest visibility of these signs or reflectors, they are typically located and oriented to provide the maximum possible reflection of light from the host vehicle headlights, that is, at a height above ground level which is similar to that of typical vehicle lights and oriented such that they reflect light from the headlight beams directly back towards the host vehicle as it progresses around the bend. Thus, the spectral and geometric characteristics and locations of these signs or reflectors may be similar to that of other vehicles traveling along the curve or bend in the road.

An additional aspect of the present invention is to improve the performance of existing AHB control systems by providing an automatic repeating alignment of the sensor to the vehicle centerline and the horizontal plane such that the various regions of interest within the scene monitored by the sensor are optimally maintained regardless of vehicle and high beam control system module geometric manufacturing and assembly tolerances, and other sources of misalignment such as vehicle attitude variations due to a wide range of possible vehicle loading conditions.

In order to take advantage of the environmental protection offered by the vehicle cabin, the frequently cleaned optically clear path offered by the vehicle windshield (which is cleaned or wiped by the windshield wipers when the wipers are activated), and the relatively high vantage point offered at the upper region or top of the windshield, AHB control systems are preferably mounted centrally on the upper inside surface of the front windshield of a vehicle and with a forward field of view through the region cleaned or wiped by the windshield wipers.

Typical vehicle body structures, windshields and assembly systems each contribute to the geometric tolerance associated with the surface to which the AHB control system module is attached. The module also has some degree of geometric tolerance associated with its components and assembly methods. It is not unusual to encounter a total stack up of tolerances which result in a potential vertical and horizontal misalignment of +/−2 degrees from the theoretically ideal condition. This is a significant value and may result in errors in determining lane widths and object sizes and distances and the like.

It is known to provide a mechanical adjustment means to allow for the correction of this misalignment at the installation of the AHB control system to the vehicle. This is, however, often undesirable since it often is expensive to apply manual labor to the alignment of components on each vehicle equipped with an AHB control system on the vehicle assembly line. It is additionally undesirable since the alignment procedure is subject to operator error.

Also, during the lifetime of the vehicle the windshield may be damaged and require replacement. In such an event it would be necessary, and likely at an unacceptable cost, to provide the alignment techniques, tools and equipment to every service operation that may be required to replace a windshield and remount the AHB control system module in order to return the vehicle to its original performance level.

Additionally, in normal use, a typical vehicle experiences many different loading conditions which cause it to adopt a wide range of pitch and roll attitudes, causing an AHB control system which is attached to the vehicle to view the forward scene from perspectives different from the ideal, or initially considered design condition, potentially resulting in different headlight actuation decisions than contemplated by the original system specification.

Thus, it is beneficial for an AHB control system to include a feature which automatically compensates for an initial misalignment condition and additionally is capable of correcting for temporary vehicle conditions and re-installation misalignments which may occur during the use of the vehicle.

In order to achieve optimum performance of the AHB control system, it is desirable to determine which of the array elements of the image capture device fall into each of the defined regions. Since the regions are defined relative to the forward scene, it is desirable to determine a particular point within the forward scene and to relate that point to a particular array element of the image capture device.

The particular point in the forward scene may be defined as a particular distant point which lies on the forward extended vehicle centerline on the horizontal plane which passes through the center of the optical system associated with the image capture device. When driving on a substantially flat and substantially straight road, the distant point may be the point within the forward scene at which the headlights of an oncoming vehicle or the tail lamps of a slower leading vehicle are first detected. As the distance between the host and target vehicles decreases, the image of the target vehicle expands within the imaged scene, towards the left if traveling in a leftward lane, centrally if in the same lane, and towards the right if traveling in a rightward lane. Thus the described distant point may be called the focus of expansion or FOE.

In order to determine the imaging array element or pixel which subtends the FOE in the as assembled and as loaded vehicle, it is necessary to identify the array element which first detects a new light source, which has the potential to be a vehicular source, within that region of the monitored scene which could potentially contain the FOE, to continue to track the light source as it expands in the image as the distance between the detected source and the host vehicle decreases until it is confirmed that the source is vehicular, and to monitor the host vehicle trajectory until it reaches the point in the road where the new light source would have been initially detected in order to confirm that the road traveled for the duration of the monitoring period was substantially flat and substantially straight. If it is determined that the point or light source is a vehicle and the host vehicle and approaching vehicle are traveling along a substantially flat and substantially straight road, the location of the initial distant point or FOE may be compared to an expected location and the axis of the imaging system may be adjusted accordingly so that the imaging system is directed at the desired or appropriate or optimal angle relative to the vehicle. Optionally, the imaging system may be adjusted in response to a detection of lane markers along a straight and/or flat road, and/or pitch information from a bus or accelerometer and/or roll information from an accelerometer or bus information. Optionally, the system may only monitor for new light sources when the steering wheel angle or steering angle (SA) is approximately 0 degrees, such as when the steering angle is about 0 degrees+\−0.1 degrees or other threshold angle. Thus, adjustment and/or alignment of the image sensor may occur by tracking movement of light sources through the images when the vehicle is traveling substantially straight, so that the control may compare the tracked light sources to expected locations and paths through the captured images as the vehicle moves along the substantially straight path and may adjust the field of view or viewing angle of the image sensor accordingly.

An additional aspect of the present invention is to improve AHB control systems by providing a detection of left and right hand road systems and an automatic configuration to assure appropriate left or right hand operation. AHB control systems are often installed on both left and right hand drive vehicles and may be configured differently for use on left and right hand drive road systems, preferably having an asymmetric response to activity within the monitored scene. It is possible to configure the system to operate on either a left or right hand drive vehicle and to supply the system to the vehicle assembly plant for installation on a corresponding either left or right hand drive vehicle. In such cases it is desirable to identify the AHB control system module with a particular part number in order to assure the installation of the correct configuration, which results in part number proliferation and the potential for operator error, either at the module manufacturing location where the wrong label may be attached to the product, or at the vehicle assembly plant, particularly if left and right hand drive vehicles are built on the same assembly line, where the wrong part may be selected for installation.

In order to reduce part number proliferation, it is possible to provide a switch on the AHB control system module in order to configure it for operation on a left or right hand drive vehicle. This solution, however, is also subject to operator error and may result in incorrect and inappropriate control of the vehicle high beams during nighttime driving. Additionally, during the normal use of a right hand drive vehicle, it may be driven on a left hand drive road system for a period of time before returning to a right hand drive road system and vice versa, such as when taking a vehicle by ferry or Channel tunnel from the United Kingdom to mainland Europe for vacation or in the course of business. Again it is possible to provide a switch to allow the vehicle operator to configure the system appropriately for the country of use, however, this is inconvenient and may result in inappropriate high beam activation in the event that the operator forgets to, or is unaware of the need to switch to the alternate configuration, or is unaware of the availability of a reconfiguration switch. Thus, there is a need to provide an automatic configuration of AHB control systems such that they analyze the monitored scene, recognize a left or right hand drive road system and self-configure accordingly.

The system may track the light sources and adjust the image sensor only when the steering angle is within a threshold value of straight or substantially straight, in order to avoid misinterpretation of source locations. Also, the system may take into account the environment at which the vehicle is traveling, and may not track and adjust when the vehicle is traveling in high lighting environments, such as cities and the like, and may function when there are limited other light sources in the forward field of view. The system may also take into account the speed of the vehicle and thus the speed of the light moving through the captured images.

Optionally, when the vehicle is being passed on tight curves or the like, the control may determine when to adjust the headlamps of the vehicle in response to the location and departure of the passing vehicle's taillights within the field of view. For example, the control may take into account situations when the forward vehicle departs the field of view while the steering angle of the subject vehicle remains relatively constant, and may adjust the headlamps accordingly. Such tracking may also provide an indication that the road continues to curve ahead of the subject vehicle, and may provide information useful in conjunction with an adaptive cruise control (ACC) system and/or a lane departure warning (LDW) or the like.

Adaptive Front Lighting vehicles can illuminate curved road areas and vehicles that previously were not illuminated very well. The AHBC algorithm could, at significant expense and speed penalties, decide when the vehicle was on a curve and change its operation. If the AHBC system could use steering wheel angle (SWA) from the automobile bus, it could react significantly faster, with fewer mistakes, without the calculation penalties of internal SWA calculation.

Figure 9:
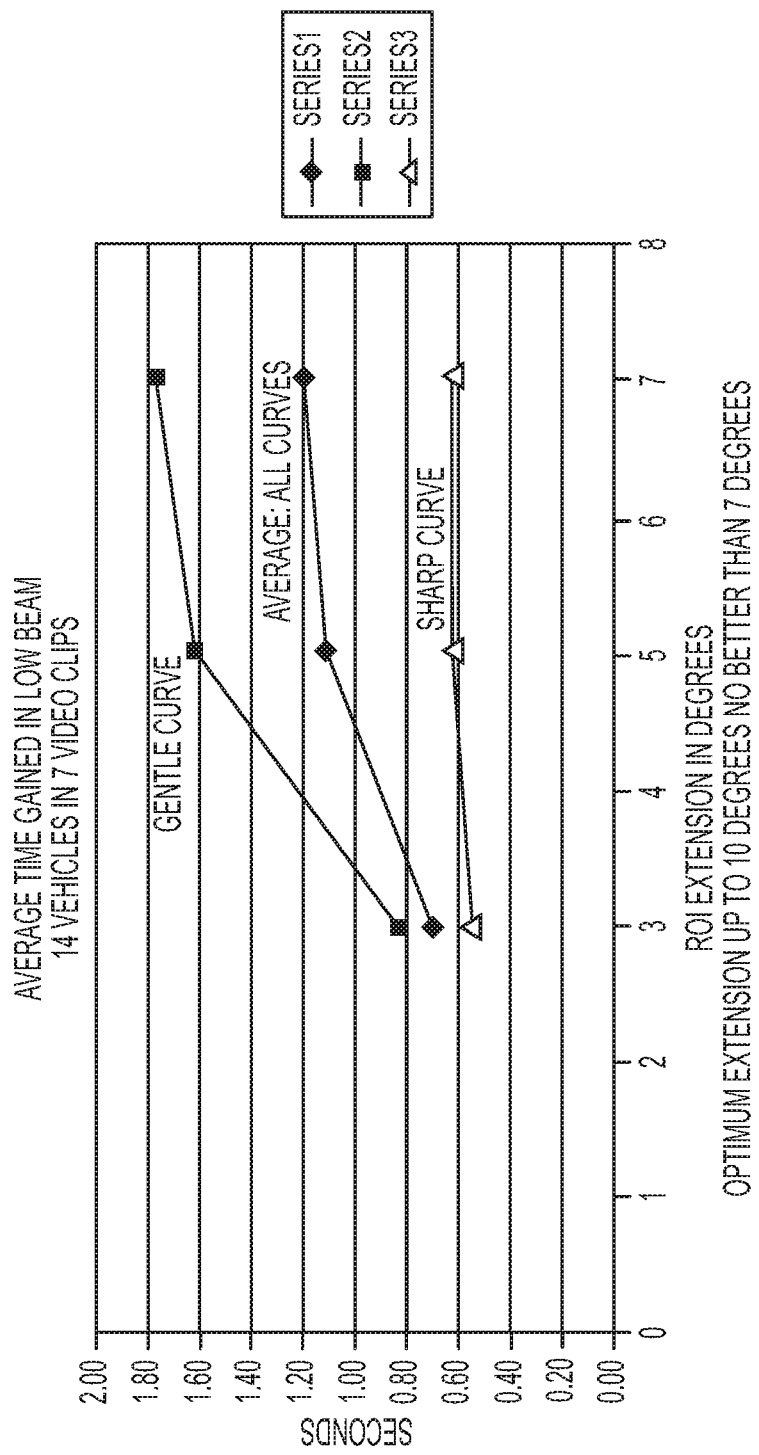
FIG. 9 is a chart showing the region of interest and average time gained in low beam for several vehicles as the vehicles travel around different degrees of curvatures in the road.
Figure 10:
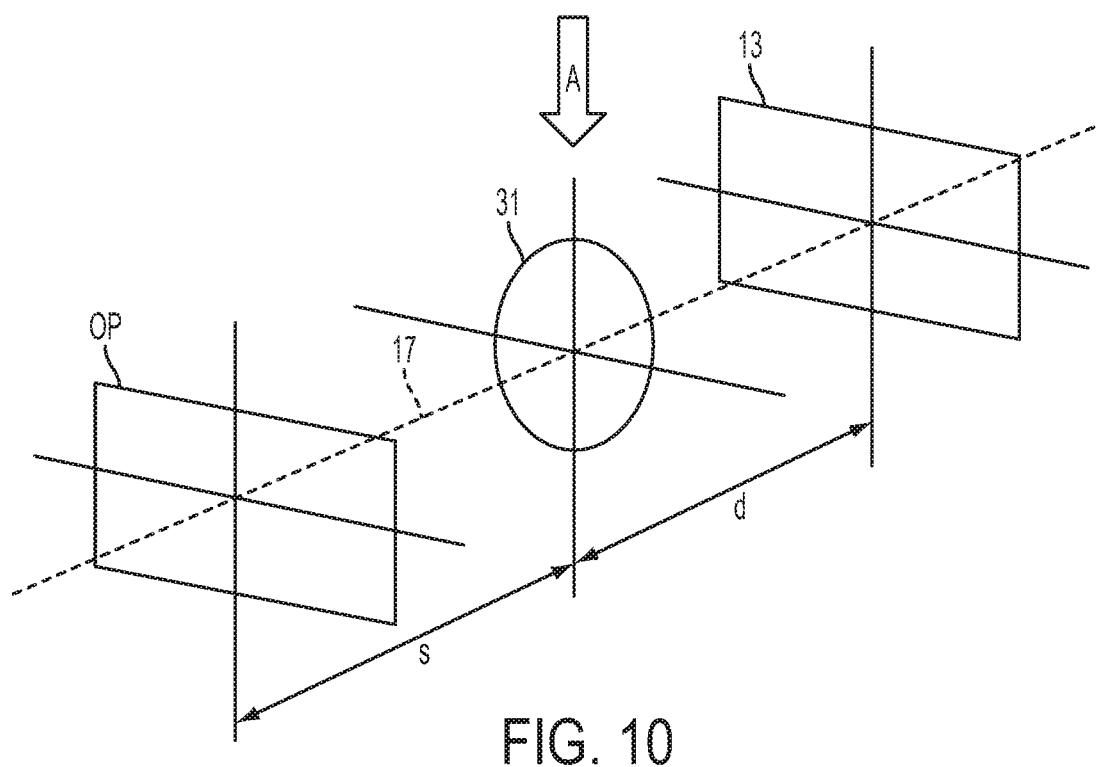
FIG. 10 is a perspective view of a lens and image sensing device of the present invention.

We have done several studies on how the steering wheel angle will improve AHBC functionality when used with AFLS. For example, 14 vehicles in 7 video clips which had both AFLS cars and standard cars were studied. These clips showed vehicles traveling on a curve and were examined to determine how to better detect these vehicles. The region of interest was extended manually in the direction of the curved travel. The SWA was not used during such examination and evaluation, but it is envisioned that the use of steering wheel angle would allow these results to be done automatically. Based on such evaluations, the optimum size and location of the region of interest (ROI) may be found. The ROI is the vehicle processing region. Surprisingly (and as shown in FIG. 9), the optimum ROI change was not a linear function of the SWA size. It was just a simple rule to extend the ROI one amount in the curve direction. During a sharp turn of the vehicle, the vehicle is seen for a short time and for gentle curves the vehicle is seen for a longer time. Results vary with the orientation of the target vehicle with respect to the host vehicle. This is related to the beam intensity pattern.

The smaller amount of gained low beam time on a sharp curve is not to be belittled. The total time that the vehicle was visible in the imaging system on sharp curves averaged around 3-4 seconds. The addition of 0.6 seconds of low beam time is significant since these vehicle detections usually only had a couple seconds of low beam, so the added time is a significant benefit. For the gentle curves the vehicles were visible in the scene for longer, and were detected in low beam for about 1.6 seconds more, thus the added time was significant.

In the future when more target vehicles have adaptive front lighting, this effect may not be so static. Then the ROI may need to be changed as a function of the steering wheel angle. The desired approach was to extend the ROI 5 or 6 degrees in the direction of the curve denoted by the steering wheel angle. With no or small SWA, the ROI is unchanged. This approach is enough to provide significant benefit for the AHBC vehicle with AFLS. The AFLS system does point the headlights in the direction of the curve and this use of SWA will allow the quicker detection of the target vehicle so that the effect of the AFLS is minimized for other drivers. The other vehicles will not get as much unexpected glare at unexpected angles on a curve, because they will be detected sooner by the host AHBC vehicle.

Optionally, the SWA may be used to filter out the false alarm targets from reflectors and house and yard lights on curves. When the vehicle is driven along the road, the system does not know how the road curves ahead and if it did, such as through SWA, the system could better filter out such false targets. This is particularly evident when the false target is straight ahead, while the road curves. In such cases, the false target is in the same position as a real vehicle. With the use of the steering wheel angle, this false alarm can be minimized, and it is estimated that at least about a third of these kinds of false alarms could be eliminated. These also are the most resistant false alarms since they look the most like real car lights.

Finally, the use of SWA could allow us to better filter out the non-straight roads that should be ignored to adapt the focus of expansion. The system can accumulate the focus of expansion data when it detects the lane markers, and may only accumulate when the FOE is close enough to the manufacturing value. The system could better filter out these curved road times and should allow the system to get a better, quicker, measure of the real FOE for a given key cycle.

Therefore, the use of SWA will allow quicker use of low beams on curves where the AFLS system will otherwise glare opposing vehicles more than the non-AFLS vehicle. The detection time, when low beam is on, may preferably increase by about 30 percent or more. The use of SWA will also allow better filtering out of noise sources which falsely trigger low beam, and it will more quickly provide adaptive focus of expansion in general driving.

The imaging sensor for the headlamp control of the present invention may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 6,946,978; 7,004,606; 5,550,677; 5,760,962; 6,097,023; 5,796,094 and/or 5,715, 093; and/or U.S. patent applications, Ser. No. 09/441,341, filed Nov. 16, 1999, now U.S. Pat. No. 7,339,149; and/or Ser. No. 11/105,757, filed Apr. 14, 2005, now U.S. Pat. No.

7,526,103, and/or PCT Application No. PCT/US2003/036177 filed Nov. 14, 2003, published Jun. 3, 2004 as PCT Publication No. WO 2004/047421, which are all hereby incorporated herein by reference in their entireties.

Optionally, the imaging sensor may be suitable for use in connection with other vehicle imaging systems, such as, for example, a blind spot detection system, where a blind spot indicator may be operable to provide an indication to the driver of the host vehicle that an object or other vehicle has been detected in the lane or area adjacent to the side of the host vehicle. In such a blind spot detector/indicator system, the blind spot detection system may include an imaging sensor or sensors, or ultrasonic sensor or sensors, or sonar sensor or sensors or the like. For example, the blind spot detection system may utilize aspects of the blind spot detection and/or imaging systems described in U.S. Pat. Nos. 7,038,577; 6,882,287; 6,198,409; 5,929,786 and/or 5,786,772, and/or U.S. patent applications, Ser. No. 11/315,675, filed Dec. 22, 2005, now U.S. Pat. No. 7,720,580; and/or Ser. No. 11/239,980, filed Sep. 30, 2005, now U.S. Pat. No. 7,881,496, and/or U.S. provisional applications, Ser. No. 60/696,953, filed Jul. 6, 2006; Ser. No. 60/628,709, filed Nov. 17, 2004; Ser. No. 60/614,644, filed Sep. 30, 2004; and/or Ser. No. 60/618,686, filed Oct. 14, 2004, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 6,757,109 and/or 7,005,974, and/or of the rain sensors described in U.S. Pat. Nos. 6,250,148 and 6,341,523, and/or of other imaging systems, such as the types described in U.S. Pat. Nos. 6,353,392 and 6,313,454, and U.S. patent application, Ser. No. 10/422,512, filed Apr. 24, 2003, now U.S. Pat. No. 7,123,168, with all of the above referenced U.S. patents, patent applications and provisional applications and PCT applications being commonly assigned and being hereby incorporated herein by reference.

Optionally, the mirror assembly and/or accessory module or windshield electronics module may include one or more displays, such as for displaying the captured images or video images captured by the imaging sensor or sensors of the vehicle, such as the displays of the types disclosed in U.S. Pat. Nos. 7,004,593; 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent applications, Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 9, 2006 as U.S. Publication No. US-2006-0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Application No. PCT/US03/29776, filed Sep. 9, 2003; and/or PCT Application No. PCT/US03/35381, filed Nov. 5, 2003, and/or PCT Application No. PCT/US03/40611, filed Dec. 19, 2003, which are all hereby incorporated herein by reference, or may include or incorporate video displays or the like, such as the types described in PCT Application No. PCT/US03/40611, filed Dec. 19, 2003, and/or U.S. patent applications, Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370,983, and/or U.S. provisional applications, Ser. No. 60/732,245, filed Nov. 1, 2005; Ser. No. 60/759,992, filed Jan. 18, 2006; and/or Ser. No. 60/836,219, filed Aug. 8, 2006, which are hereby incorporated herein by reference.

The imaging sensor may be incorporated at or in an accessory module or windshield electronics module (such as described above), or may be incorporated at or in an interior rearview mirror assembly of the vehicle, while remaining within the spirit and scope of the present invention. Optionally, the mirror assembly and/or module may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775 and/or 5,669,698, and/or U.S. patent applications, Ser. No. 10/054,633, filed Jan. 22, 2002, now U.S. Pat. No. 7,195,381; and/or Ser. No. 10/933,842, filed Sep. 3, 2004, now U.S. Pat. No. 7,249,860, which are hereby incorporated herein by reference, may be included in the mirror assembly or module. The illumination sources and/or the circuit board may be connected to one or more buttons or inputs for activating and deactivating the illumination sources. Optionally, the mirror assembly or module may also or otherwise include other accessories, such as microphones, such as analog microphones or digital microphones or the like, such as microphones of the types disclosed in U.S. Pat. Nos. 6,243,003; 6,278,377 and/or 6,420,975, and/or in PCT Application No. PCT/US03/308877, filed Oct. 1, 2003. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, transmitters and/or receivers, such as for a garage door opener or a vehicle door unlocking system or the like (such as a remote keyless entry system), a digital network, such as described in U.S. Pat. No. 5,798,575, a memory mirror system, such as disclosed in U.S. Pat. No. 5,796,176, a hands-free phone attachment, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979 and/or 6,731,205; and/or U.S. patent application Ser. No. 11/232,324, filed Sep. 21, 2005, now U.S. Pat. No. 7,423,522, and/or an ONSTAR® system and/or any other accessory or circuitry or the like (with all of the above-referenced patents and PCT and U.S. patent applications being commonly assigned, and with the disclosures of the referenced patents and patent applications being hereby incorporated herein by reference in their entireties).

Optionally, the mirror assembly or module may include one or more user inputs for controlling or activating/deactivating one or more electrical accessories or devices of or associated with the mirror assembly or module or vehicle. The mirror assembly or module may comprise any type of switches or buttons, such as touch or proximity sensing switches, such as touch or proximity switches of the types described in PCT Application No. PCT/US03/40611, filed Dec. 19, 2003; and/or U.S. Pat. Nos. 6,001,486; 6,310,611; 6,320,282 and 6,627,918; and/or U.S. patent applications, Ser. No. 09/817,874, filed Mar. 26, 2001, now U.S. Pat. No. 7,224,324; Ser. No. 10/956,749, filed Oct. 1, 2004, now U.S. Pat. No. 7,446,924; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 11/140,396, filed May 27, 2005, now U.S. Pat. No. 7,360, 932, which are hereby incorporated herein by reference, or the inputs may comprise other types of buttons or switches, such as those described in U.S. patent applications, Ser. No. 11/029,695, filed Jan. 5, 2005, now U.S. Pat. No. 7,253,723; and/or Ser. No. 11/451,639, filed Jun. 13, 2006, now U.S. Pat. No. 7,527,403, which are hereby incorporated herein by reference, or such as fabric-made position detectors, such as those described in U.S. Pat. Nos. 6,504,531; 6,501,465; 6,492,980; 6,452,479; 6,437,258 and 6,369,804, which are hereby incorporated herein by reference. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771 and 5,798,688, and/or U.S. patent application Ser. No. 10/770,736, filed Feb. 3, 2004, now U.S. Pat. No. 7,023,322; and/or U.S. provisional applications, Ser. No. 60/502,806, filed Sep. 12, 2003; and Ser. No. 60/444,726, filed Feb. 4, 2003, which are hereby incorporated herein by reference. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; 6,420,975; 6,946,978; 6,477,464; 6,678,614 and/or 7,004,593, and/or U.S. patent applications, Ser. No. 10/645,762, filed Aug. 20, 2003, now U.S. Pat. No. 7,167, 796; and Ser. No. 10/964,512, filed Oct. 13, 2004, now U.S. Pat. No. 7,308,341; and/or PCT Application No. PCT/US03/ 40611, filed Dec. 19, 2003, and/or PCT Application No. PCT/US03/308877, filed Oct. 1, 2003, which are all hereby incorporated herein by reference.

Optionally, the accessory module may utilize aspects of other accessory modules or windshield electronics modules or the like, such as the types described in U.S. patent applications, Ser. No. 10/958,087, filed Oct. 4, 2004, now U.S. Pat. No. 7,188,963; and/or Ser. No. 11/201,661, filed Aug. 11, 2005, now U.S. Pat. No. 7,480,149, and/or U.S. Pat. Nos. 7,004,593; 6,824,281; 6,690,268; 6,250,148; 6,341,523; 6,593,565; 6,428,172; 6,501,387; 6,329,925 and 6,326,613, and/or in PCT Application No. PCT/US03/ 40611, filed Dec. 19, 2003, and/or Ireland patent applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference.

The reflective element of the rearview mirror assembly of the vehicle may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or U.S. patent applications, Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 11/226,628, filed Sep. 14, 2005 and published Mar. 9, 2006 as U.S. Publication No. US-2006-0061008, and/or PCT Application No. PCT/US2006/018567, filed May 15, 2006, which are all hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003, which are all hereby incorporated herein by reference.

Optionally, use of an elemental semiconductor mirror, such as a silicon metal mirror, such as disclosed in U.S. Pat. Nos. 6,286,965; 6,196,688; 5,535,056; 5,751,489 and 6,065, 840, and/or in U.S. patent application, Ser. No. 10/993,302, filed Nov. 19, 2004, now U.S. Pat. No. 7,338,177, which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in PCT Application No. PCT/US03/29776, filed Sep. 19, 2003; and/or PCT Application No. PCT/US03/35381, filed Nov. 5, 2003; and/ or U.S. patent applications, Ser. No. 11/021,065, filed Dec. 23, 2004, now U.S. Pat. No. 7,255,451; and/or Ser. No. 11/226,628, filed Sep. 14, 2005 and published Mar. 9, 2006 as U.S. Publication No. US-2006-0061008, which are hereby incorporated herein by reference. Optionally, the reflective element may include indicia formed at and viewable at the reflective element, such as by utilizing aspects of the reflective elements described in PCT Application No. PCT/US2006/018567, filed May 15, 2006, which are hereby incorporated herein by reference.

Optionally, the reflective element of the mirror assembly may comprise a single substrate with a reflective coating at its rear surface, without affecting the scope of the present invention. The mirror assembly thus may comprise a prismatic mirror assembly or other mirror having a single substrate reflective element, such as a mirror assembly utilizing aspects described in U.S. Pat. Nos. 6,318,870; 6,598,980; 5,327,288; 4,948,242; 4,826,289; 4,436,371 and 4,435,042; and PCT Application No. PCT/US04/015424, filed May 18, 2004; and U.S. patent application, Ser. No. 10/933,842, filed Sep. 3, 2004, now U.S. Pat. No. 7,249,860, which are hereby incorporated herein by reference. Optionally, the reflective element may comprise a conventional prismatic or flat reflective element or prism, or may comprise a prismatic or flat reflective element of the types described in PCT Application No. PCT/US03/29776, filed Sep. 19, 2003; U.S. patent applications, Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177, and/or PCT Application No. PCT/US2004/015424, filed May 18, 2004, which are all hereby incorporated herein by reference, without affecting the scope of the present invention.

Changes and modifications to the specifically described embodiments may be carried out without departing from the principles of the present invention, which is intended to be limited by the scope of the appended claims, as interpreted in accordance with the principles of patent law.

The invention claimed is:

1. A vehicular forward viewing image capture system, said vehicular forward viewing image capture system comprising:

an accessory module configured for attachment at an in-cabin side of a windshield of a vehicle equipped with said vehicular forward viewing image capture system;

wherein said accessory module comprises a camera, said camera comprising a lens and an imaging sensor, said imaging sensor comprising a two-dimensional array of photosensor elements;

wherein an optical axis of said lens is perpendicular to an image plane of said imaging sensor;

wherein, with said accessory module attached at the in-cabin side of the windshield of the equipped vehicle, said imaging sensor has a field of view through the windshield forward of the equipped vehicle;

a control, said control comprising a digital processor for processing image data captured by said imaging sensor;

wherein, with said accessory module attached at the in-cabin side of the windshield of the equipped vehicle, and while the equipped vehicle is traveling along a road, said control processes captured image data to determine (i) presence of an object of interest in the forward field of view of said imaging sensor and (ii) location of the object of interest in the forward field of view of said imaging sensor;

wherein, with said accessory module attached at the in-cabin side of the windshield of the equipped vehicle, and responsive to the processing of captured image data, said control determines presence of a taillight of another vehicle ahead of the equipped vehicle, and wherein said control is operable to determine presence of a taillight that is 200 meters ahead of the equipped vehicle;

wherein said control receives vehicle data via a vehicle communication bus; and wherein the received vehicle data comprises vehicle speed data; and wherein, with said accessory module attached at the in-cabin side of the windshield of the equipped vehicle, and responsive to the processing of captured image data and responsive to the received vehicle data, said control at least in part provides at least one selected from the group consisting of (a) traffic sign recognition, (b) traffic light status detection, (c) adaptive cruise control and (d) pedestrian detection.

2. The vehicular forward viewing image capture system of claim 1, wherein the received vehicle speed data at least comprises a speed signal indicative of speed of the equipped vehicle.

3. The vehicular forward viewing image capture system of claim 2, wherein an output of said control when the speed signal is indicative of the speed of the equipped vehicle being above a threshold speed level is different than the output of said control when the speed signal is indicative of the speed of the equipped vehicle being below a threshold speed level.

4. The vehicular forward viewing image capture system of claim 1, wherein said vehicle communication bus comprises a CAN vehicle communication bus.

5. The vehicular forward viewing image capture system of claim 1, wherein captured image data is processed at said control to determine a characteristic of the object of interest present in the forward field of view of said imaging sensor.

6. The vehicular forward viewing image capture system of claim 1, wherein multiple frames of captured image data are processed at said control in determining the location of the object of interest present in the forward field of view of said imaging sensor.

7. The vehicular forward viewing image capture system of claim 1, wherein multiple frames of captured image data are processed at said control to determine movement of the object of interest present in the forward field of view of said imaging sensor.

8. The vehicular forward viewing image capture system of claim 1, wherein, with said accessory module attached at the in-cabin side of the windshield of the equipped vehicle, captured image data is processed at said control to determine a general illumination level at the equipped vehicle in the forward field of view of said imaging sensor.

9. The vehicular forward viewing image capture system of claim 1, wherein, with said accessory module attached at the in-cabin side of the windshield of the equipped vehicle, captured image data is processed at said control to determine a road condition of the road ahead of the equipped vehicle.

10. The vehicular forward viewing image capture system of claim 1, wherein, with said accessory module attached at the in-cabin side of the windshield of the equipped vehicle, captured image data is processed at said control to determine an incline of the road ahead of the equipped vehicle.

11. The vehicular forward viewing image capture system of claim 1, wherein, with said accessory module attached at the in-cabin side of the windshield of the equipped vehicle, and responsive to processing of captured image data, said control determines presence of other road users in a region of influence of a vehicle headlamp of the equipped vehicle, and wherein said control is operable to inhibit adjustment of a beam pattern of the vehicle headlamp of the equipped vehicle if other road users are detected within the region of influence of the vehicle headlamp of the equipped vehicle.

12. The vehicular forward viewing image capture system of claim 1, wherein said vehicular forward viewing image capture system automatically compensates for misalignment of said imaging sensor.

13. The vehicular forward viewing image capture system of claim 12, wherein said vehicular forward viewing image capture system determines misalignment of said imaging sensor responsive at least in part to a focus of expansion ahead of the vehicle.

14. The vehicular forward viewing image capture system of claim 13, wherein said vehicular forward viewing image capture system determines misalignment of said imaging sensor responsive to determination of location and movement of another vehicle relative to the focus of expansion as the equipped vehicle travels along a straight section of the road.

15. The vehicular forward viewing image capture system of claim 13, wherein said vehicular forward viewing image capture system determines misalignment of said imaging sensor responsive to tracking movement of light sources through multiple frames of captured image data when the equipped vehicle travels along a straight section of the road.

16. The vehicular forward viewing image capture system of claim 1, wherein the received vehicle data comprises vehicle trajectory data.

17. The vehicular forward viewing image capture system of claim 1, wherein the received vehicle data comprises vehicle GPS data.

18. The vehicular forward viewing image capture system of claim 1, wherein the received vehicle data comprises vehicle pitch data.

19. The vehicular forward viewing image capture system of claim 1, wherein the received vehicle data comprises vehicle yaw data.

20. The vehicular forward viewing image capture system of claim 1, wherein, with said accessory module attached at the in-cabin side of the windshield of the equipped vehicle, said imaging sensor views through a portion of the windshield that is swept by a windshield wiper of the equipped vehicle.

21. The vehicular forward viewing image capture system of claim 1, wherein said accessory module comprises said control and an electrical connector for electrically connecting to a vehicle wiring system when said accessory module is attached at the in-cabin side of the windshield of the equipped vehicle.

22. The vehicular forward viewing image capture system of claim 1, wherein said accessory module is configured to removably attach at an attachment plate that is fixedly attached at the in-cabin side of the windshield of the equipped vehicle.

23. The vehicular forward viewing image capture system of claim 22, wherein, with said accessory module removably attached at the attachment plate that is fixedly attached at the in-cabin side of the windshield of the equipped vehicle, the principal viewing axis of said imaging sensor is parallel to the principal central axis of the equipped vehicle.

24. The vehicular forward viewing image capture system of claim 1, wherein said control at least in part provides at least one selected from the group consisting of (a) traffic sign recognition, (b) traffic light status detection, (c) adaptive cruise control and (d) pedestrian detection responsive to processing of multiple frames of captured image data.

25. The vehicular forward viewing image capture system of claim 24, wherein the imaging sensor captures multiple frames of image data at an image capture rate of greater than or equal to five frames per second and less than or equal to 120 frames per second.

26. A vehicular forward viewing image capture system, said vehicular forward viewing image capture system comprising:
    an accessory module configured for attachment at an in-cabin side of a windshield of a vehicle equipped with said vehicular forward viewing image capture system;
    wherein said accessory module comprises a camera, said camera comprising a lens and an imaging sensor, said imaging sensor comprising a two-dimensional array of photosensor elements;
    wherein an optical axis of said lens is perpendicular to an image plane of said imaging sensor;
    wherein, with said accessory module attached at the in-cabin side of the windshield of the equipped vehicle, said imaging sensor has a field of view through the windshield forward of the equipped vehicle;
    wherein, with said accessory module attached at the in-cabin side of the windshield of the equipped vehicle, said imaging sensor views through a portion of the windshield that is swept by a windshield wiper of the equipped vehicle;
    a control, said control comprising a digital processor for processing multiple frames of image data captured by said imaging sensor;
    wherein, with said accessory module attached at the in-cabin side of the windshield of the equipped vehicle, and while the equipped vehicle is traveling along a road, said control processes multiple frames of captured image data to determine (i) presence of an object of interest in the forward field of view of said imaging sensor, (ii) location of the object of interest in the forward field of view of said imaging sensor and (iii) movement of the object of interest present in the forward field of view of said imaging sensor;
    wherein, with said accessory module attached at the in-cabin side of the windshield of the equipped vehicle, and responsive to the processing of captured image data, said control determines presence of a taillight of another vehicle ahead of the equipped vehicle, and wherein said control is operable to determine presence of a taillight that is 200 meters ahead of the equipped vehicle;
    wherein said control receives vehicle data via a vehicle communication bus;
    wherein the received vehicle data comprises vehicle speed data; and
    wherein, with said accessory module attached at the in-cabin side of the windshield of the equipped vehicle, and responsive to the processing of multiple frames of captured image data and responsive to the received vehicle data, said control at least in part provides at least one selected from the group consisting of (a) traffic sign recognition, (b) traffic light status detection, (c) adaptive cruise control and (d) pedestrian detection.

27. The vehicular forward viewing image capture system of claim 26, wherein the received vehicle speed data at least comprises a speed signal indicative of speed of the equipped vehicle.

28. The vehicular forward viewing image capture system of claim 27, wherein an output of said control when the speed signal is indicative of the speed of the equipped vehicle being above a threshold speed level is different than the output of said control when the speed signal is indicative of the speed of the equipped vehicle being below a threshold speed level.

29. The vehicular forward viewing image capture system of claim 26, wherein, with said accessory module attached at the in-cabin side of the windshield of the equipped vehicle, captured image data is processed at said control to determine a road condition of the road ahead of the equipped vehicle.

30. The vehicular forward viewing image capture system of claim 26, wherein said vehicular forward viewing image capture system automatically compensates for misalignment of said imaging sensor.

31. The vehicular forward viewing image capture system of claim 30, wherein said vehicular forward viewing image capture system determines misalignment of said imaging sensor responsive at least in part to a focus of expansion ahead of the vehicle.

32. The vehicular forward viewing image capture system of claim 31, wherein said vehicular forward viewing image capture system determines misalignment of said imaging sensor responsive to determination of location and movement of another vehicle relative to the focus of expansion as the equipped vehicle travels along a straight section of the road.

33. The vehicular forward viewing image capture system of claim 31, wherein said vehicular forward viewing image capture system determines misalignment of said imaging sensor responsive to tracking movement of light sources through multiple frames of captured image data when the equipped vehicle travels along a straight section of the road.

34. The vehicular forward viewing image capture system of claim 26, wherein the received vehicle data comprises vehicle trajectory data.

35. The vehicular forward viewing image capture system of claim 26, wherein the received vehicle data comprises vehicle GPS data.

36. The vehicular forward viewing image capture system of claim 26, wherein the received vehicle data comprises vehicle pitch data.

37. The vehicular forward viewing image capture system of claim 26, wherein the received vehicle data comprises vehicle yaw data.

38. The vehicular forward viewing image capture system of claim 26, wherein said accessory module comprises said control and an electrical connector for electrically connecting to a vehicle wiring system when said accessory module is attached at the in-cabin side of the windshield of the equipped vehicle.

39. The vehicular forward viewing image capture system of claim 26, wherein said accessory module is configured to removably attach at an attachment plate that is fixedly attached at the in-cabin side of the windshield of the equipped vehicle.

40. A vehicular forward viewing image capture system, said vehicular forward viewing image capture system comprising:
an accessory module configured for attachment at an in-cabin side of a windshield of a vehicle equipped with said vehicular forward viewing image capture system;
wherein said accessory module comprises a camera, said camera comprising a lens and an imaging sensor, said imaging sensor comprising a two-dimensional array of photosensor elements;
wherein an optical axis of said lens is perpendicular to an image plane of said imaging sensor;
wherein, with said accessory module attached at the in-cabin side of the windshield of the equipped vehicle, said imaging sensor has a field of view through the windshield forward of the equipped vehicle;
a control, said control comprising a digital processor for processing multiple frames of image data captured by said imaging sensor;
wherein, with said accessory module attached at the in-cabin side of the windshield of the equipped vehicle, and while the equipped vehicle is traveling along a road, said control processes multiple frames of captured image data to determine (i) presence of an object of interest in the forward field of view of said imaging sensor and (ii) movement of the object of interest present in the forward field of view of said imaging sensor;
wherein, with said accessory module attached at the in-cabin side of the windshield of the equipped vehicle, and responsive to the processing of captured image data, said control determines presence of a taillight of another vehicle ahead of the equipped vehicle, and wherein said control is operable to determine presence of a taillight that is 200 meters ahead of the equipped vehicle;
wherein said control receives vehicle data via a vehicle communication bus;
wherein the received vehicle data comprises (i) vehicle speed data and (ii) vehicle trajectory data; and
wherein, with said accessory module attached at the in-cabin side of the windshield of the equipped vehicle, and responsive to the processing of multiple frames of captured image data and responsive to the received vehicle data, said control at least in part provides at least one selected from the group consisting of (a) traffic sign recognition, (b) traffic light status detection, (c) adaptive cruise control and (d) pedestrian detection.

41. The vehicular forward viewing image capture system of claim 40, wherein, with said accessory module attached at the in-cabin side of the windshield of the equipped vehicle, captured image data is processed at said control to determine a road condition of the road ahead of the equipped vehicle.

42. The vehicular forward viewing image capture system of claim 40, wherein said vehicular forward viewing image capture system automatically compensates for misalignment of said imaging sensor.

43. The vehicular forward viewing image capture system of claim 42, wherein said vehicular forward viewing image capture system determines misalignment of said imaging sensor responsive at least in part to a focus of expansion ahead of the vehicle.

44. The vehicular forward viewing image capture system of claim 43, wherein said vehicular forward viewing image capture system determines misalignment of said imaging sensor responsive to determination of location and movement of another vehicle relative to the focus of expansion as the equipped vehicle travels along a straight section of the road.

45. The vehicular forward viewing image capture system of claim 43, wherein said vehicular forward viewing image capture system determines misalignment of said imaging sensor responsive to tracking movement of light sources through multiple frames of captured image data when the equipped vehicle travels along a straight section of the road.

46. The vehicular forward viewing image capture system of claim 40, wherein the received vehicle data comprises vehicle GPS data.

47. The vehicular forward viewing image capture system of claim 40, wherein the received vehicle data comprises vehicle pitch data.

48. The vehicular forward viewing image capture system of claim 40, wherein the received vehicle data comprises vehicle yaw data.

49. The vehicular forward viewing image capture system of claim 40, wherein said accessory module comprises said control and an electrical connector for electrically connecting to a vehicle wiring system when said accessory module is attached at the in-cabin side of the windshield of the equipped vehicle.

50. The vehicular forward viewing image capture system of claim 40, wherein said accessory module is configured to removably attach at an attachment plate that is fixedly attached at the in-cabin side of the windshield of the equipped vehicle.

\* \* \* \* \*

UNITED STATES PATENT AND TRADEMARK OFFICE
CERTIFICATE OF CORRECTION

PATENT NO. : 11,148,583 B2
APPLICATION NO. : 16/948656
DATED : October 19, 2021
INVENTOR(S) : Kenneth Schofield Page 1 of 1

It is certified that error appears in the above-identified patent and that said Letters Patent is hereby corrected as shown below:

In the Specification

Column 6
Line 37, "distanced mm" should be --distance d mm--

In the Claims

Column 23
Line 67, Claim 1, "bus; and" should be --bus;--

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*